United States Patent
Alex et al.

(10) Patent No.: US 11,434,900 B1
(45) Date of Patent: Sep. 6, 2022

(54) SPRING CONTROLLING VALVE

(71) Applicant: Vulcan Industrial Holdings, LLC, Houston, TX (US)

(72) Inventors: Akhil Alex, Houston, TX (US); Chance Ray Mullins, Spring, TX (US); Kyle Matthew Ellisor, Katy, TX (US); Seth Sprowls, St. Croix Falls, WI (US)

(73) Assignee: Vulcan Industrial Holdings, LLC, Houston, TX (US)

( * ) Notice: Subject to any disclaimer, the term of this patent is extended or adjusted under 35 U.S.C. 154(b) by 0 days.

(21) Appl. No.: 17/728,568

(22) Filed: Apr. 25, 2022

(51) Int. Cl.
*F04B 53/10* (2006.01)
*F16K 1/42* (2006.01)

(52) U.S. Cl.
CPC ........ *F04B 53/1027* (2013.01); *F04B 53/103* (2013.01); *F04B 53/1087* (2013.01); *F16K 1/42* (2013.01); *F16K 2200/30* (2021.08); *Y10T 137/7904* (2015.04); *Y10T 137/7922* (2015.04); *Y10T 137/7925* (2015.04); *Y10T 137/7929* (2015.04); *Y10T 137/7939* (2015.04); *Y10T 137/86019* (2015.04)

(58) Field of Classification Search
CPC ......... Y10T 137/7904; Y10T 137/7922; Y10T 137/7925; Y10T 137/7929; Y10T 137/7939; Y10T 137/86019; F04B 53/1027; F04B 53/103; F04B 53/1087; F16K 1/42; F16K 2200/30
See application file for complete search history.

(56) References Cited

U.S. PATENT DOCUMENTS

| | | | |
|---|---|---|---|
| 1,576,269 | A | 3/1926 | Durant |
| 1,595,459 | A | 8/1926 | Durant |
| 1,671,139 | A | 5/1928 | Wilson |
| 1,873,318 | A | 8/1932 | Eason |
| 1,914,737 | A | 6/1933 | Elms |

(Continued)

FOREIGN PATENT DOCUMENTS

| | | |
|---|---|---|
| CN | 201149099 | 11/2008 |
| CN | 102748483 | 10/2012 |

(Continued)

OTHER PUBLICATIONS

Declaration of Duncan Hall from Internet Archive/Wayback Machine, Feb. 3, 2021, Kerr Plunger Pump Manuals, 20 pages.

(Continued)

*Primary Examiner* — Daphne M Barry
*Assistant Examiner* — Frederick D Soski
(74) *Attorney, Agent, or Firm* — Hogan Lovells US LLP

(57) ABSTRACT

A valve member for a spring-loaded valve assembly includes a top portion having a spring retaining recess, the spring retaining recess extending into the top portion to form a void space, the void space to receive at least one coil of a spring, the spring retaining recess having a recess diameter that is smaller than a top portion diameter, wherein the recess diameter is larger than a rest diameter of a spring base including the coil, the spring retaining recess blocking expansion of the at least one coil when the spring is compressed. The valve member also includes a bottom portion coupled to the top portion. The valve member further includes a sealing element positioned axially below a shoulder of the top portion and legs coupled to the bottom portion.

19 Claims, 26 Drawing Sheets

(56) References Cited

U.S. PATENT DOCUMENTS

| | | |
|---|---|---|
| 1,948,628 A | 2/1934 | Penick |
| 1,963,684 A | 6/1934 | Shimer |
| 1,963,685 A | 6/1934 | Shimer |
| 2,011,547 A | 8/1935 | Campbell |
| 2,069,443 A | 2/1937 | Hill |
| 2,103,504 A | 12/1937 | White |
| 2,143,399 A | 1/1939 | Abercrombie |
| 2,304,991 A | 12/1942 | Foster |
| 2,506,128 A | 5/1950 | Ashton |
| 2,547,831 A | 4/1951 | Mueller |
| 2,713,522 A | 7/1955 | Lorenz |
| 2,719,737 A | 10/1955 | Fletcher |
| 2,745,631 A | 5/1956 | Shellman |
| 2,756,960 A | 7/1956 | Church |
| 2,898,082 A | 8/1959 | Almen |
| 2,969,951 A | 1/1961 | Walton |
| 2,982,515 A | 5/1961 | Clinton |
| 2,983,281 A | 5/1961 | Bynum |
| 3,049,082 A | 8/1962 | Barry |
| 3,053,500 A | 9/1962 | Atkinson |
| 3,063,467 A | 11/1962 | Roberts, Jr. |
| 3,224,817 A | 12/1965 | Carter |
| 3,276,390 A | 10/1966 | Bloudoff |
| 3,288,475 A | 11/1966 | Benoit |
| 3,459,363 A | 8/1969 | Miller |
| 3,474,808 A | 10/1969 | Elliott |
| 3,483,885 A | 12/1969 | Leathers |
| 3,489,098 A | 1/1970 | Roth |
| 3,489,170 A | 1/1970 | Leman |
| 3,512,787 A | 5/1970 | Kennedy |
| 3,809,508 A | 5/1974 | Uchiyama |
| 3,907,307 A | 9/1975 | Maurer |
| 3,931,755 A | 1/1976 | Hatridge |
| 4,044,834 A | 8/1977 | Perkins |
| 4,057,095 A * | 11/1977 | Hirota ............ F16B 2/248 160/395 |
| 4,076,212 A | 2/1978 | Leman |
| 4,184,814 A | 1/1980 | Parker |
| 4,219,204 A | 8/1980 | Pippert |
| 4,277,229 A | 7/1981 | Pacht |
| 4,331,741 A | 5/1982 | Wilson |
| 4,395,050 A | 7/1983 | Wirz |
| 4,398,731 A | 8/1983 | Gorman |
| 4,412,145 A * | 10/1983 | Voss ............... H02K 1/17 310/40 MM |
| 4,423,751 A * | 1/1984 | Roettgen ........ F16K 17/0413 210/90 |
| 4,440,404 A | 4/1984 | Roach |
| 4,508,133 A | 4/1985 | Hamid |
| 4,518,329 A * | 5/1985 | Weaver ........... F04B 53/1037 137/516.25 |
| 4,518,359 A | 5/1985 | Yao-Psong |
| 4,527,806 A | 7/1985 | Ungchusri |
| 4,662,392 A | 5/1987 | Vadasz |
| 4,687,421 A * | 8/1987 | Cameron ........ F04B 49/10 137/71 |
| 4,754,950 A | 7/1988 | Tada |
| 4,763,876 A | 8/1988 | Oda |
| 4,770,206 A | 9/1988 | Sjoberg |
| 4,807,890 A | 2/1989 | Gorman |
| 4,811,758 A | 3/1989 | Piper |
| 4,860,995 A * | 8/1989 | Rogers ............ F04B 53/1027 137/543.13 |
| 4,861,241 A * | 8/1989 | Gamboa ......... F04B 53/1027 417/454 |
| 4,919,719 A | 4/1990 | Abe |
| 4,951,707 A | 8/1990 | Johnson |
| 5,020,490 A | 6/1991 | Seko |
| 5,052,435 A * | 10/1991 | Crudup ........... F16K 15/063 251/332 |
| 5,061,159 A | 10/1991 | Pryor |
| 5,062,450 A | 11/1991 | Bailey |
| 5,080,713 A | 1/1992 | Ishibashi |
| 5,088,521 A | 2/1992 | Johnson |
| 5,127,807 A | 7/1992 | Eslinger |
| 5,131,666 A | 7/1992 | Hutchens |
| 5,149,107 A | 9/1992 | Maringer |
| 5,161,572 A * | 11/1992 | Oberl ............. F01M 1/16 137/516.27 |
| 5,209,495 A | 5/1993 | Palmour |
| 5,249,600 A | 10/1993 | Blume |
| 5,267,736 A | 12/1993 | Pietsch |
| 5,273,570 A | 12/1993 | Sato |
| 5,314,659 A | 5/1994 | Hidaka |
| 5,478,048 A | 12/1995 | Salesky |
| 5,533,245 A | 7/1996 | Stanton |
| 5,540,570 A | 7/1996 | Schuller |
| 5,572,920 A | 11/1996 | Kennedy |
| 5,626,345 A | 5/1997 | Wallace |
| 5,636,688 A | 6/1997 | Bassinger |
| 5,674,449 A | 10/1997 | Liang |
| 5,834,664 A | 11/1998 | Aonuma |
| 5,859,376 A | 1/1999 | Ishibashi |
| 5,895,517 A | 4/1999 | Kawamura |
| 5,949,003 A | 9/1999 | Aoki |
| 6,139,599 A | 10/2000 | Takahashi |
| 6,200,688 B1 | 3/2001 | Liang |
| 6,209,445 B1 | 4/2001 | Roberts, Jr |
| 6,328,312 B1 | 12/2001 | Schmitz |
| 6,340,377 B1 | 1/2002 | Kawata |
| 6,382,940 B1 | 5/2002 | Blume |
| 6,436,338 B1 | 8/2002 | Qiao |
| 6,460,620 B1 | 10/2002 | LaFleur |
| 6,464,749 B1 | 10/2002 | Kawase |
| 6,482,275 B1 | 11/2002 | Qiao |
| 6,485,678 B1 | 11/2002 | Liang |
| 6,544,012 B1 | 4/2003 | Blume |
| 6,623,259 B1 * | 9/2003 | Blume ............ F04B 53/164 417/454 |
| 6,641,112 B2 | 11/2003 | Antoff |
| 6,695,007 B2 | 2/2004 | Vicars |
| 6,702,905 B1 | 3/2004 | Qiao |
| 6,880,802 B2 | 4/2005 | Hara |
| 6,910,871 B1 | 6/2005 | Blume |
| 6,916,444 B1 | 7/2005 | Liang |
| 6,951,165 B2 | 10/2005 | Kuhn |
| 6,951,579 B2 | 10/2005 | Koyama |
| 6,955,181 B1 | 10/2005 | Blume |
| 6,959,916 B2 | 11/2005 | Chigasaki |
| 7,000,632 B2 | 2/2006 | McIntire |
| 7,036,824 B2 | 5/2006 | Kunz |
| 7,144,440 B2 | 12/2006 | Ando |
| 7,168,440 B1 | 1/2007 | Blume |
| 7,186,097 B1 | 3/2007 | Blume |
| 7,222,837 B1 | 5/2007 | Blume |
| 7,290,560 B2 | 11/2007 | Orr |
| 7,296,591 B2 | 11/2007 | Moe |
| 7,335,002 B2 | 2/2008 | Vicars |
| 7,341,435 B2 | 3/2008 | Vicars |
| 7,506,574 B2 | 3/2009 | Jensen |
| 7,513,483 B1 | 4/2009 | Blume |
| 7,513,759 B1 | 4/2009 | Blume |
| 7,611,590 B2 | 11/2009 | Liang |
| 7,681,589 B2 | 3/2010 | Schwegman |
| 7,682,471 B2 | 3/2010 | Levin |
| 7,726,026 B1 | 6/2010 | Blume |
| 7,748,310 B2 | 7/2010 | Kennedy |
| 7,754,142 B2 | 7/2010 | Liang |
| 7,754,143 B2 | 7/2010 | Qiao |
| 7,757,396 B2 | 7/2010 | Sawada |
| 7,789,133 B2 | 9/2010 | McGuire |
| 7,793,913 B2 | 9/2010 | Hara |
| 7,828,053 B2 | 11/2010 | McGuire |
| 7,845,413 B2 | 12/2010 | Shampine |
| 7,861,738 B2 | 1/2011 | Erbes |
| 7,866,346 B1 | 1/2011 | Walters |
| 7,891,374 B2 | 2/2011 | Vicars |
| 7,954,510 B2 | 6/2011 | Schwegman |
| 7,992,635 B2 | 8/2011 | Cherewyk |
| 8,069,923 B2 | 12/2011 | Blanco |
| 8,075,661 B2 | 12/2011 | Chen |
| 8,083,506 B2 | 12/2011 | Maki |
| 8,100,407 B2 | 1/2012 | Stanton |

(56) References Cited

U.S. PATENT DOCUMENTS

| | | | |
|---|---|---|---|
| 8,141,849 B1 | 3/2012 | Blume | |
| 8,147,227 B1 | 4/2012 | Blume | |
| 8,181,970 B2 | 5/2012 | Smith | |
| 8,261,771 B2 | 9/2012 | Witkowski | |
| 8,287,256 B2 | 10/2012 | Shafer | |
| 8,291,927 B2 | 10/2012 | Johnson | |
| 8,317,498 B2 | 11/2012 | Gambier | |
| 8,336,864 B2 * | 12/2012 | Noh | B21F 3/02 267/167 |
| 8,375,980 B2 | 2/2013 | Higashiyama | |
| 8,376,723 B2 | 2/2013 | Kugelev | |
| 8,402,880 B2 | 3/2013 | Patel | |
| 8,430,075 B2 | 4/2013 | Qiao | |
| D687,125 S | 7/2013 | Hawes | |
| 8,479,700 B2 | 7/2013 | Qiao | |
| 8,511,218 B2 | 8/2013 | Cordes | |
| 8,522,667 B2 | 9/2013 | Clemens | |
| 8,528,585 B2 | 9/2013 | McGuire | |
| 8,534,691 B2 | 9/2013 | Schaffer | |
| 8,613,886 B2 | 12/2013 | Qiao | |
| 8,662,864 B2 | 3/2014 | Bayyouk | |
| 8,662,865 B2 | 3/2014 | Bayyouk | |
| 8,668,470 B2 | 3/2014 | Bayyouk | |
| 8,707,853 B1 | 4/2014 | Dille | |
| 8,733,313 B2 | 5/2014 | Sato | |
| 8,784,081 B1 | 7/2014 | Blume | |
| 8,828,312 B2 | 9/2014 | Yao | |
| 8,870,554 B2 | 10/2014 | Kent | |
| 8,893,806 B2 | 11/2014 | Williamson | |
| 8,894,392 B1 | 11/2014 | Blume | |
| 8,915,722 B1 * | 12/2014 | Blume | F04B 53/1032 417/454 |
| 8,940,110 B2 | 1/2015 | Qiao | |
| 8,978,695 B2 | 3/2015 | Witkowski | |
| 8,998,593 B2 | 4/2015 | Vicars | |
| 9,010,412 B2 | 4/2015 | McGuire | |
| 9,103,448 B2 | 8/2015 | Witkowski | |
| 9,150,945 B2 | 10/2015 | Bei | |
| 9,157,136 B2 | 10/2015 | Chou | |
| 9,157,468 B2 | 10/2015 | Dille | |
| 9,206,910 B2 | 12/2015 | Kahn | |
| D748,228 S | 1/2016 | Bayyouk | |
| 9,260,933 B2 | 2/2016 | Artherholt | |
| 9,261,195 B2 | 2/2016 | Toynbee | |
| 9,273,543 B2 | 3/2016 | Baca | |
| 9,284,631 B2 | 3/2016 | Radon | |
| 9,284,953 B2 | 3/2016 | Blume | |
| 9,285,040 B2 | 3/2016 | Forrest | |
| 9,291,274 B1 | 3/2016 | Blume | |
| 9,322,243 B2 | 4/2016 | Baca | |
| 9,334,547 B2 | 5/2016 | Qiao | |
| 9,340,856 B2 | 5/2016 | Otobe | |
| 9,359,921 B2 | 6/2016 | Hashimoto | |
| 9,365,913 B2 | 6/2016 | Imaizumi | |
| 9,371,919 B2 | 6/2016 | Forrest | |
| 9,376,930 B2 | 6/2016 | Kim | |
| 9,377,019 B1 | 6/2016 | Blume | |
| 9,382,940 B2 | 7/2016 | Lee | |
| 9,416,887 B2 | 8/2016 | Blume | |
| 9,435,454 B2 | 9/2016 | Blume | |
| 9,441,776 B2 | 9/2016 | Bryne | |
| 9,458,743 B2 | 10/2016 | Qiao | |
| 9,464,730 B2 | 10/2016 | Bihlet | |
| 9,500,195 B2 | 11/2016 | Blume | |
| 9,506,382 B2 | 11/2016 | Yeager | |
| 9,528,508 B2 | 12/2016 | Thomeer | |
| 9,528,631 B2 | 12/2016 | McCarty | |
| 9,534,473 B2 | 1/2017 | Morris | |
| 9,534,691 B2 | 1/2017 | Miller | |
| 9,556,761 B2 | 1/2017 | Koyama | |
| 9,568,138 B2 | 2/2017 | Arizpe | |
| 9,605,767 B2 | 3/2017 | Chhabra | |
| 9,631,739 B2 | 4/2017 | Belshan | |
| D787,029 S | 5/2017 | Bayyouk | |
| 9,638,075 B2 | 5/2017 | Qiao | |
| 9,638,337 B2 | 5/2017 | Witkowski | |
| 9,650,882 B2 | 5/2017 | Zhang | |
| 9,651,067 B2 | 5/2017 | Beschorner | |
| 9,689,364 B2 | 6/2017 | Mack | |
| 9,695,812 B2 | 7/2017 | Dille | |
| 9,732,746 B2 | 8/2017 | Chandrasekaran | |
| 9,732,880 B2 | 8/2017 | Haines | |
| 9,745,968 B2 | 8/2017 | Kotapish | |
| 9,784,262 B2 | 10/2017 | Bayyouk | |
| 9,822,894 B2 | 11/2017 | Bayyouk | |
| 9,845,801 B1 | 12/2017 | Shek | |
| 9,857,807 B2 | 1/2018 | Baca | |
| 9,915,250 B2 | 3/2018 | Brasche | |
| 9,920,615 B2 | 3/2018 | Zhang | |
| 9,927,036 B2 | 3/2018 | Dille | |
| 9,945,362 B2 | 4/2018 | Skurdalsvold | |
| 9,945,375 B2 | 4/2018 | Zhang | |
| 9,989,044 B2 | 6/2018 | Bayyouk | |
| 10,029,540 B2 | 7/2018 | Seeger | |
| 10,041,490 B1 | 8/2018 | Jahnke | |
| 10,082,137 B2 | 9/2018 | Graham | |
| 10,094,478 B2 | 10/2018 | Iijima | |
| 10,113,679 B2 | 10/2018 | Shuck | |
| 10,184,470 B2 | 1/2019 | Barnett, Jr. | |
| 10,190,197 B2 | 1/2019 | Baker | |
| 10,197,172 B2 | 2/2019 | Fuller | |
| 10,215,172 B2 | 2/2019 | Wood | |
| 10,221,848 B2 | 3/2019 | Bayyouk | |
| 10,240,594 B2 | 3/2019 | Bamhouse, Jr. | |
| 10,240,597 B2 | 3/2019 | Bayyouk | |
| 10,247,182 B2 | 4/2019 | Zhang | |
| 10,247,184 B2 | 4/2019 | Chunn | |
| 10,273,954 B2 | 4/2019 | Brown | |
| 10,288,178 B2 | 5/2019 | Nowell | |
| 10,316,832 B2 | 6/2019 | Byrne | |
| 10,330,097 B2 | 6/2019 | Skurdalsvold | |
| 10,344,757 B1 | 7/2019 | Stark | |
| 10,364,487 B2 | 7/2019 | Park | |
| D856,498 S | 8/2019 | Bayyouk | |
| 10,378,535 B2 | 8/2019 | Mahmood | |
| 10,378,538 B2 | 8/2019 | Blume | |
| 10,393,113 B2 | 8/2019 | Wagner | |
| 10,400,764 B2 | 9/2019 | Wagner | |
| 10,415,348 B2 | 9/2019 | Zhang | |
| 10,428,406 B2 | 10/2019 | Yao | |
| 10,428,949 B2 | 10/2019 | Miller | |
| 10,436,193 B1 | 10/2019 | Jahnke | |
| 10,443,456 B2 | 10/2019 | Hoeg | |
| 10,465,680 B1 | 11/2019 | Guerra | |
| 10,472,702 B2 | 11/2019 | Yeh | |
| 10,487,528 B2 | 11/2019 | Pozybill | |
| 10,519,070 B2 | 12/2019 | Sanders | |
| 10,519,950 B2 | 12/2019 | Foster | |
| 10,526,862 B2 | 1/2020 | Witkowski | |
| 10,527,036 B2 | 1/2020 | Blume | |
| 10,557,446 B2 | 2/2020 | Stecklein | |
| 10,557,576 B2 | 2/2020 | Witkowski | |
| 10,557,580 B2 | 2/2020 | Mendyk | |
| 10,563,494 B2 | 2/2020 | Graham | |
| 10,563,649 B2 | 2/2020 | Zhang | |
| 10,570,491 B2 | 2/2020 | Hong | |
| 10,576,538 B2 | 3/2020 | Kato | |
| 10,577,580 B2 | 3/2020 | Abbas | |
| 10,577,850 B2 | 3/2020 | Ozkan | |
| 10,591,070 B2 | 3/2020 | Nowell | |
| 10,605,374 B2 | 3/2020 | Takaki | |
| 10,626,856 B2 | 4/2020 | Coldren | |
| 10,633,925 B2 | 4/2020 | Panda | |
| 10,634,260 B2 | 4/2020 | Said | |
| 10,640,854 B2 | 5/2020 | Hu | |
| 10,655,623 B2 | 5/2020 | Blume | |
| 10,663,071 B2 | 5/2020 | Bayyouk | |
| 10,670,013 B2 | 6/2020 | Foster | |
| 10,670,153 B2 | 6/2020 | Filipow | |
| 10,670,176 B2 | 6/2020 | Byrne | |
| 10,677,109 B2 | 6/2020 | Qiao | |
| 10,677,240 B2 | 6/2020 | Graham | |
| 10,677,365 B2 | 6/2020 | Said | |
| 10,711,754 B2 | 7/2020 | Nelson | |

(56) References Cited

U.S. PATENT DOCUMENTS

| | | |
|---|---|---|
| 10,711,778 B2 | 7/2020 | Buckley |
| 10,718,441 B2 | 7/2020 | Myers |
| 10,731,523 B2 | 8/2020 | Qu |
| 10,731,643 B2 | 8/2020 | DeLeon |
| 10,738,928 B2 | 8/2020 | Arizpe |
| 10,753,490 B2 | 8/2020 | Fuller |
| 10,753,495 B2 | 8/2020 | Bayyouk |
| 10,767,520 B1 | 9/2020 | Hattiangadi |
| 10,774,828 B1* | 9/2020 | Smith ............... F04B 53/1022 |
| 10,781,803 B2 | 9/2020 | Kumar |
| 10,787,725 B2 | 9/2020 | Fujieda |
| 10,801,627 B2 | 10/2020 | Warbey |
| 10,808,488 B2 | 10/2020 | Witkowski |
| 10,815,988 B2 | 10/2020 | Buckley |
| 10,830,360 B2 | 11/2020 | Frank |
| 10,851,775 B2 | 12/2020 | Stark |
| 10,865,325 B2 | 12/2020 | Nakao |
| 10,907,738 B2 | 2/2021 | Nowell |
| 10,914,171 B2 | 2/2021 | Foster |
| 10,934,899 B2 | 3/2021 | Hattiangadi |
| 10,941,866 B2 | 3/2021 | Nowell |
| 10,954,938 B2 | 3/2021 | Stark |
| 10,961,607 B2 | 3/2021 | Oshima |
| 10,962,001 B2* | 3/2021 | Nowell ............... F04B 53/16 |
| D916,240 S | 4/2021 | Nowell |
| 10,968,717 B2 | 4/2021 | Tran |
| 10,988,834 B2 | 4/2021 | Lee |
| 10,989,321 B2 | 4/2021 | Hattiangadi |
| 10,995,738 B2 | 5/2021 | Blume |
| 11,028,662 B2 | 6/2021 | Rhodes |
| 11,041,570 B1 | 6/2021 | Buckley |
| 11,078,903 B2 | 8/2021 | Nowell |
| 11,104,981 B2 | 8/2021 | Chen |
| 11,105,185 B2 | 8/2021 | Spencer |
| 11,105,327 B2 | 8/2021 | Hurst |
| 11,105,328 B2 | 8/2021 | Bryne |
| 11,105,428 B2 | 8/2021 | Warbey |
| 11,111,915 B2 | 9/2021 | Bayyouk |
| 11,131,397 B2 | 9/2021 | Yan |
| D933,104 S | 10/2021 | Ellisor |
| D933,105 S | 10/2021 | Ellisor |
| D933,106 S | 10/2021 | Mullins |
| D933,107 S | 10/2021 | Mullins |
| 11,149,514 B2 | 10/2021 | Witkowski |
| 11,162,859 B2 | 11/2021 | Lei |
| 11,181,101 B2 | 11/2021 | Byrne |
| 11,181,108 B2 | 11/2021 | Brooks |
| 11,225,861 B1* | 1/2022 | Dille ............... F04B 19/22 |
| 11,231,111 B2 | 1/2022 | Hurst |
| 11,242,849 B1 | 2/2022 | Smith |
| 11,363,882 B2* | 6/2022 | Zhang ............... A47B 23/06 |
| 11,364,619 B1* | 6/2022 | Bolton ............... B25H 5/00 |
| 11,365,838 B1* | 6/2022 | Lane ............... F16L 33/16 |
| 11,365,845 B1* | 6/2022 | Carpenter ............... F16M 11/22 |
| 11,365,929 B1* | 6/2022 | Marinelli ............... F25D 29/00 |
| 2001/0032426 A1* | 10/2001 | VanderWerf ............... B28B 19/0061 |
| | | 52/796.1 |
| 2002/0084004 A1 | 7/2002 | Takahashi |
| 2002/0124961 A1 | 9/2002 | Porter |
| 2002/0159914 A1 | 10/2002 | Yeh |
| 2002/0195147 A1* | 12/2002 | Nixon ............... F04D 9/007 |
| | | 137/541 |
| 2003/0205864 A1 | 11/2003 | Dietle |
| 2003/0233910 A1 | 12/2003 | Jeong |
| 2004/0170507 A1 | 9/2004 | Vicars |
| 2004/0194576 A1 | 10/2004 | Ando |
| 2004/0234404 A1 | 11/2004 | Vicars |
| 2004/0255410 A1 | 12/2004 | Schonewille |
| 2004/0258557 A1 | 12/2004 | Shun |
| 2005/0095156 A1 | 5/2005 | Wolters |
| 2005/0200081 A1 | 9/2005 | Stanton |
| 2005/0226754 A1 | 10/2005 | Orr |
| 2006/0002806 A1 | 1/2006 | Baxter |
| 2006/0027779 A1 | 2/2006 | McGuire |
| 2006/0045782 A1 | 3/2006 | Kretzinger |
| 2007/0039652 A1* | 2/2007 | Staggs ............... F04B 53/1027 |
| | | 137/540 |
| 2007/0086910 A1 | 4/2007 | Liang |
| 2007/0154342 A1 | 7/2007 | Tu |
| 2007/0273105 A1 | 11/2007 | Stanton |
| 2007/0295411 A1* | 12/2007 | Schwegman ......... F16K 15/063 |
| | | 137/542 |
| 2008/0031769 A1 | 2/2008 | Yeh |
| 2008/0092384 A1 | 4/2008 | Schaake |
| 2008/0279706 A1 | 11/2008 | Gambier |
| 2009/0041611 A1 | 2/2009 | Sathian |
| 2009/0217989 A1* | 9/2009 | Magnaval ........... F02M 63/0043 |
| | | 137/535 |
| 2009/0278069 A1 | 11/2009 | Blanco |
| 2009/0261575 A1 | 12/2009 | Bull |
| 2010/0037965 A1* | 2/2010 | Hefler ................. F02M 59/462 |
| | | 137/538 |
| 2010/0272597 A1 | 12/2010 | Qiao |
| 2011/0079302 A1 | 4/2011 | Hawes |
| 2011/0142701 A1 | 6/2011 | Small |
| 2011/0189040 A1 | 8/2011 | Vicars |
| 2011/0255993 A1 | 10/2011 | Ochoa |
| 2012/0097268 A1* | 4/2012 | Laukemann ............. F16H 61/64 |
| | | 137/528 |
| 2012/0141308 A1 | 6/2012 | Saini |
| 2012/0163969 A1 | 6/2012 | Ongole |
| 2012/0304821 A1 | 12/2012 | Ando |
| 2013/0020521 A1 | 1/2013 | Byrne |
| 2013/0202457 A1* | 8/2013 | Bayyouk ............... F16K 15/063 |
| | | 417/279 |
| 2013/0202458 A1 | 8/2013 | Byrne |
| 2013/0319220 A1 | 12/2013 | Luharuka |
| 2014/0070127 A1* | 3/2014 | Blume .................. F16K 15/063 |
| | | 251/359 |
| 2014/0083541 A1 | 3/2014 | Chandrasekaran |
| 2014/0083547 A1 | 3/2014 | Hwang |
| 2014/0196883 A1 | 7/2014 | Artherholt |
| 2014/0230928 A1* | 8/2014 | Gilstad .................. F04B 53/001 |
| | | 137/528 |
| 2014/0260954 A1 | 9/2014 | Young |
| 2014/0286805 A1 | 9/2014 | Dyer |
| 2014/0322034 A1 | 10/2014 | Bayyouk |
| 2014/0348677 A1* | 11/2014 | Moeller ............... F04B 39/1046 |
| | | 417/559 |
| 2015/0040998 A1* | 2/2015 | Gilstad ............... F04B 53/1087 |
| | | 137/514 |
| 2015/0132157 A1 | 5/2015 | Whaley |
| 2015/0144826 A1* | 5/2015 | Bayyouk ............... F04B 53/1087 |
| | | 251/359 |
| 2015/0147194 A1 | 5/2015 | Foote |
| 2015/0219096 A1 | 8/2015 | Jain |
| 2015/0300332 A1 | 10/2015 | Kotapish |
| 2015/0362113 A1* | 12/2015 | Chhabra ............... F16K 27/02 |
| | | 137/315.27 |
| 2015/0368775 A1 | 12/2015 | Baker |
| 2016/0201169 A1 | 7/2016 | Vecchio |
| 2016/0215588 A1 | 7/2016 | Belshan |
| 2016/0238156 A1 | 8/2016 | Hubenschmidt |
| 2016/0245280 A1 | 8/2016 | Todorov |
| 2016/0312903 A1* | 10/2016 | Dille ................. F16K 1/42 |
| 2016/0319626 A1 | 11/2016 | Dille |
| 2016/0319805 A1 | 11/2016 | Dille |
| 2017/0002947 A1* | 1/2017 | Bayyouk ............... F16K 17/162 |
| 2017/0067459 A1 | 3/2017 | Bayyouk |
| 2017/0089473 A1 | 3/2017 | Nowell |
| 2017/0097107 A1 | 4/2017 | Hotz |
| 2017/0159655 A1* | 6/2017 | Morreale ............. F04B 53/1087 |
| 2017/0218951 A1 | 8/2017 | Graham |
| 2017/0218993 A1 | 8/2017 | Freed |
| 2017/0297149 A1 | 10/2017 | Shinohara |
| 2017/0298932 A1* | 10/2017 | Wagner ............... F04B 53/1087 |
| 2017/0314097 A1 | 11/2017 | Hong |
| 2017/0342776 A1 | 11/2017 | Bullock |
| 2017/0342976 A1 | 11/2017 | Reddy |
| 2018/0017173 A1 | 1/2018 | Nowell |
| 2018/0058431 A1 | 3/2018 | Blume |
| 2018/0202434 A1 | 7/2018 | Barnhouse, Jr. |
| 2018/0298894 A1 | 10/2018 | Wagner |

(56) References Cited

U.S. PATENT DOCUMENTS

| | | | |
|---|---|---|---|
| 2018/0312946 A1 | 11/2018 | Gigliotti, Jr | |
| 2018/0320258 A1 | 11/2018 | Stewart | |
| 2018/0340245 A1 | 11/2018 | Kernion | |
| 2018/0354081 A1 | 12/2018 | Kalyani | |
| 2018/0363642 A1* | 12/2018 | Salih | F04B 53/1027 |
| 2019/0011051 A1* | 1/2019 | Yeung | F04B 53/10 |
| 2019/0017503 A1 | 1/2019 | Foster | |
| 2019/0024198 A1 | 1/2019 | Hong | |
| 2019/0024225 A1 | 1/2019 | Tang | |
| 2019/0032685 A1 | 1/2019 | Foster | |
| 2019/0032720 A1 | 1/2019 | Bayyouk | |
| 2019/0040966 A1* | 2/2019 | Myers | F16K 15/026 |
| 2019/0047049 A1 | 2/2019 | Fujieda | |
| 2019/0049052 A1 | 2/2019 | Shuck | |
| 2019/0063427 A1* | 2/2019 | Nowell | F16K 1/427 |
| 2019/0071755 A1 | 3/2019 | Lee | |
| 2019/0072088 A1 | 3/2019 | DeLeon | |
| 2019/0072089 A1* | 3/2019 | Buckley | F04B 1/0461 |
| 2019/0085806 A1 | 3/2019 | Meibgeier | |
| 2019/0085978 A1 | 3/2019 | Chase | |
| 2019/0101109 A1 | 4/2019 | Cortes | |
| 2019/0101114 A1* | 4/2019 | DeLeon, II | F04B 53/1087 |
| 2019/0107226 A1* | 4/2019 | Bayyouk | F04B 53/1027 |
| 2019/0120389 A1* | 4/2019 | Foster | F16K 1/385 |
| 2019/0136842 A1 | 5/2019 | Nowell | |
| 2019/0145400 A1 | 5/2019 | Graham | |
| 2019/0145403 A1* | 5/2019 | Blume | F04B 1/0448 |
| | | | 417/437 |
| 2019/0145568 A1 | 5/2019 | Nick | |
| 2019/0154033 A1 | 5/2019 | Brooks | |
| 2019/0170137 A1 | 6/2019 | Chase | |
| 2019/0170138 A1 | 6/2019 | Bayyouk | |
| 2019/0194786 A1 | 6/2019 | Chuang | |
| 2019/0226058 A1 | 7/2019 | Fujieda | |
| 2019/0063430 A1 | 8/2019 | Byrne | |
| 2019/0242373 A1 | 8/2019 | Wernig | |
| 2019/0264683 A1* | 8/2019 | Smith | F04B 1/0538 |
| 2019/0292633 A1 | 9/2019 | Porret | |
| 2019/0301314 A1 | 10/2019 | Kamo | |
| 2019/0301447 A1 | 10/2019 | Skurdalsvold | |
| 2019/0316685 A1 | 10/2019 | Wang | |
| 2019/0376508 A1 | 12/2019 | Wagner | |
| 2020/0056272 A1 | 2/2020 | Hong | |
| 2020/0063899 A1 | 2/2020 | Witkowkski | |
| 2020/0080660 A1 | 3/2020 | Dyer | |
| 2020/0080661 A1 | 3/2020 | Mullins | |
| 2020/0157663 A1 | 5/2020 | Yang | |
| 2020/0158123 A1 | 5/2020 | Chen | |
| 2020/0173317 A1 | 6/2020 | Keating | |
| 2020/0191286 A1* | 6/2020 | Iannetti | F16K 15/028 |
| 2020/0023245 A1 | 7/2020 | Blume | |
| 2020/0208776 A1 | 7/2020 | Bayyouk | |
| 2020/0217424 A1 | 7/2020 | Rasmussen | |
| 2020/0240407 A1* | 7/2020 | Naedler | F04B 53/1087 |
| 2020/0240531 A1 | 7/2020 | Nowell | |
| 2020/0256149 A1 | 8/2020 | Witkowski | |
| 2020/0284253 A1 | 9/2020 | Foster | |
| 2020/0284365 A1 | 9/2020 | Bayyouk | |
| 2020/0290118 A1 | 9/2020 | Chen | |
| 2020/0291731 A1 | 9/2020 | Haiderer | |
| 2020/0300240 A1 | 9/2020 | Nowell | |
| 2020/0308683 A1 | 10/2020 | Xue | |
| 2020/0347843 A1 | 11/2020 | Mullins | |
| 2020/0355182 A1 | 11/2020 | DeLeon | |
| 2020/0370657 A1* | 11/2020 | Haeusser | F04B 49/225 |
| 2020/0392613 A1 | 12/2020 | Won | |
| 2020/0393054 A1 | 12/2020 | Fuller | |
| 2020/0399979 A1 | 12/2020 | Webster | |
| 2020/0400003 A1 | 12/2020 | Webster | |
| 2020/0400130 A1 | 12/2020 | Poehls | |
| 2020/0400132 A1 | 12/2020 | Kumar | |
| 2020/0400140 A1* | 12/2020 | Bayyouk | F16K 15/026 |
| 2020/0400242 A1 | 12/2020 | Spencer | |
| 2021/0010113 A1 | 1/2021 | Qiao | |
| 2021/0010470 A1 | 1/2021 | Blume | |
| 2021/0017830 A1 | 1/2021 | Witkowski | |
| 2021/0017982 A1 | 1/2021 | Bayyouk | |
| 2021/0017983 A1 | 1/2021 | Myers | |
| 2021/0040836 A1 | 2/2021 | Baskin | |
| 2021/0054486 A1 | 2/2021 | Kim | |
| 2021/0102630 A1 | 4/2021 | Nowell | |
| 2021/0108734 A1 | 4/2021 | Nowell | |
| 2021/0130936 A1 | 5/2021 | Wu | |
| 2021/0148471 A1 | 5/2021 | Murugesan | |
| 2021/0180156 A1 | 6/2021 | Kim | |
| 2021/0180589 A1* | 6/2021 | Aono | F04B 53/14 |
| 2021/0190051 A1* | 6/2021 | Sardet | F04B 17/04 |
| 2021/0190053 A1 | 6/2021 | Wagner | |
| 2021/0190223 A1* | 6/2021 | Bayyouk | F16K 1/42 |
| 2021/0197524 A1 | 7/2021 | Maroli | |
| 2021/0215071 A1 | 7/2021 | Oikawa | |
| 2021/0215154 A1 | 7/2021 | Nowell | |
| 2021/0230987 A1 | 7/2021 | Tanner | |
| 2021/0239111 A1 | 8/2021 | Zitting | |
| 2021/0239229 A1* | 8/2021 | Kelton | F04B 9/045 |
| 2021/0246537 A1 | 8/2021 | Maroli | |
| 2021/0260704 A1 | 8/2021 | Hu | |
| 2021/0270261 A1 | 9/2021 | Zhang | |
| 2021/0285551 A1 | 9/2021 | Renollett | |
| 2021/0310484 A1 | 10/2021 | Myers | |
| 2021/0372529 A1* | 12/2021 | Krohmer | F16K 15/066 |
| 2021/0381504 A1 | 12/2021 | Wagner | |
| 2021/0381615 A1 | 12/2021 | Riedel | |
| 2021/0388832 A1 | 12/2021 | Byrne | |
| 2022/0081949 A1* | 3/2022 | Scalf | E05F 7/06 |
| 2022/0082221 A1* | 3/2022 | Paredes | F21V 23/06 |
| 2022/0169495 A1* | 6/2022 | Carder | B67D 7/3209 |

FOREIGN PATENT DOCUMENTS

| | | |
|---|---|---|
| CN | 102410194 | 4/2021 |
| EP | 0 414 955 | 3/1991 |

OTHER PUBLICATIONS

Michael Agnes, Editor, Webster's New World College Dictionary, Fourth Edition, 1999, 5 pages.
Weir SPM Oil & Gas, Grooveless Fluid End, 2008, 1 page.
Weir SPM Oil & Gas, Weir SPM General Catalog, 2009, 40 pages.
Weir SPM Oil & Gas, Well Service Pump Reference Guide, 2008, 55 pages.
*Intellectual Ventures I LLC v VMWare, Inc.*, Case No. 1:19-CV-01075-ADA, Document 91 (W.D. Tex Jun. 3, 2020), Defendant VMWare, Inc.'s Stipulation of Invalidity Contentions for U.S. Pat. No. 7,949,752, Jun. 3, 2020, 5 pages.
*Vulcan Industrial Holding, LLC et al. v. Kerr Machine Co.* Case No. 4:21-cv-433, Document 1, Complaint for Declaratory Judgment of Patent Non-Infringement, Feb. 9, 2021, 17 pages.
*Trilogy Enterprises, Inc., v. Trilogy Education Services, LLC*, Case. No. 6:19-cv-199-ADA-JCM, Document 35, Fifth Amended Scheduling Order, Sep. 8, 2020, 4 pages.
*Dr. Corneliu Bolbocean v Baylor University*, Case No. 6:19-CV-00465-ADA-JCM, Document 34, Scheduling Order, Apr. 6, 2020, 4 pages.
*Kerr Machine Co., v Vulcan Energy Services, LLC, Vulcan Industrial Holdings, LLC, and Cizion, LLC d/b/a/ Vulcan Industrial Manufacturing*, Case No. 6:21-CV-00044-ADA, Document 4, Plaintiff's Amended Complaint for Patent Infringement and Jury Demand, Jan. 19, 2021, 30 pages.
*Kerr Machine Co., v Vulcan Energy Services, LLC, Vulcan Industrial Holdings, LLC, and Cizion, LLC d/b/a/ Vulcan Industrial Manufacturing*, Case No. 6:21-CV-00044, Document 1, Plaintiff's Original Complaint for Patent Infringement and Jury Demand, Jan. 19, 2021, 47 pages.
*Kerr Machine Co., v Vulcan Energy Services, LLC, Vulcan Industrial Holdings, LLC, and Cizion, LLC d/b/a/ Vulcan Industrial Manufacturing*, Case No. 6:21-CV-00044-ADA, Document 10, Plaintiff's Second Amended Complaint for Patent Infringement and Jury Demand, Feb. 1, 2021, 88 pages.

(56) References Cited

OTHER PUBLICATIONS

*Kerr Machine Co.*, v *Vulcan Industrial Holdings, LLC, Vulcan Energy Services, LLC, Cizion, LLC*, Case No. W-20-CV-00200-ADA-24, Order Setting Trial Date, Jun. 14, 2020, 1 page.
*Kerr Machine Co.*, v *Vulcan Industrial Holdings, LLC, Vulcan Energy Services, LLC, Cizion, LLC*, Case No. W-20-CV-00200-ADA-29, Order Setting Trial Date, Aug. 2, 2020, 1 page.
*Kerr Machine Co.*, v. *Vulcan Industrial Holdings, LLC*, Case. No. 6:20-CV-00200-ADA, Affidavit of Service, Apr. 7, 2020, 1 page.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Plaintiff's First Amended Complaint for Patent Infringement and Jury Demand, Jun. 4, 2020, 11 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 26, Defendant Cizion, LLC d/b/a Vulcan Industrial Manufacturing, LLC's Motion to Dismiss or Transfer, Jul. 22, 2020, 10 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Defendants' Opposed Motion to Stay Litigation Pending the Outcome of the Pending Post-Grant Review Proceeding Before the Patent Trial and Appeal Board, Jul. 31, 2020, 14 pages.
*Kerr Machine Co.*, v *Vulcan Industrial Holdings, LLC*, Case No. 6:20-CV-00200-ADA, Plaintiff's Preliminary Infringement Contentions, May 22, 2020, 50 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Defendants' Preliminary Invalidity Contentions, Aug. 13, 2020, 29 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 34, Scheduling Order, Aug. 11, 2020, 3 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 38, Plaintiff's Second Amended Complaint for Patent Infringement and Jury Demand, Sep. 25, 2020, 11 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 5, Standing Order regarding Scheduled Hearings in Civil Cases in Light of Chief Judge Garcia's 24 Amended Order, Mar. 24, 2020, 4 pages.
*Kerr Machine Co.*, v *Vulcan Industrial Holdings, LLC, Vulcan Energy Services, LLC, and Cizion, LLC d/b/a/ Vulcan Industrial Manufacturing*, Civil Docket for Case No. 6:20-cv-00200-ADA, accessed Sep. 11, 2020, 7 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 54, Claim Construction Order, Dec. 3, 2020, 3 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Docket Entry, Aug. 2, 2020, 1 page.
*Kerr Machine Co.*, v *Vulcan Industrial Holdings, LLC*, Case No. 6:20-CV-00200, Document 1, Plaintiff's Original Complaint for Patent Infringement and Jury Demand, Mar. 19, 2020, 39 pages.
*Adriana del Rocio Barberena-Rovira, et al.*, v *Kuiper Dairy, LLC, et al.*, Case No. 6:20-CV-00250-ADA-JCM, Document 20, Scheduling Order, Jul. 22, 2020, 4 pages.
*Acquanlan Deonshay Harris* v. *Cenlar, FSB*, Case No. 6:20-CV-00271-ADA-JCM, Document 13, Scheduling Order, Aug. 20, 2020, 4 pages.
*Senior Living Properties, LLC c. Ironshore Speciality, Insurance Company*, Case No. 6:20-CV-00282-ADA-JCM, Document 12, Scheduling Order, Jul. 7, 2020, 4 pages.
*Dionne Bracken, Individually and as Next Friend of A.M.B.*, v *Michael D. Ashcraft and Envirovac Waste Transport Systems, Inc.*, Case No. 6:20-CV-00308-ADA-JCM, Document 17, Scheduling Order, Jul. 28, 2020, 4 pages.
*Kendra Coufal* v. *Roger Lee Thomas and Apple Logistics, Inc.*, Case No. 6:20-CV-00356-ADA-JCM, Document 12, Scheduling Order, Jul. 28, 2020, 4 pages.
*Tipton International, Inc.*, v. *Vetbizcorp, LLC and Samuel Cody*, Case No. 6:20-CV-00554-ADA-JCM, Document 8, Scheduling Order, Aug. 20, 2020, 4 pages.
*Dynaenergetics GmbH & Co. KG and Dynaenergetics US, Inc.*, v. *Hunting Titan, Ltd.; Hunting Titan, Inc.; and Hunting Energy Services, Inc.*, Case No. H-17-3784, Order, Sep. 4, 2020, 2 pages.
Slip Opinion, In re Sand Revolution LLC, Case No. 2020-00145 (Fed. Cir. Sep. 28, 2020), 3 pages, Document 15.
In re Vulcan Industrial Holdings, LLC, Case No. 2020-00151 (Fed. Cir. Sep. 29, 2020), Petition for Writ of Mandamus, 43 pages.
*Densys Ltd.*, v. *3Shape Trios A/S and 3Shape A/S*, Case No. WA:19-CV-00680-ADA, Document 27, Scheduling Order, Apr. 8, 2020, 4 pages.
*Kerr Machine Co.* vs. *Vulcan Industrial Holdings, LLC*, Case No. WA:20-CV-00200-ADA, Order Setting Markman Hearing, May 29, 2020, 1 page.
Sur-Lock Liner Retention System—Product Brochure (p. 16) (Year: 2017), Premium Oilfield Technologies 24 pages.
Sur-Lock Liner Retention System—Video (https://premiumoilfield.com/performance-enhancements/sur-lock/sur-lock-liner-retention-system.html) (https://www.youtube.com/watch?v=6NZGeD5NkF8) (Year: 2017).
U.S. Appl. No. 17/241,680 titled "Fluid End and Center Feed Suction Manifold" filed Apr. 27, 2021.
U.S. Appl. No. 16/814,267, 194 pages.
U.S. Appl. No. 17/120,121, 110 pages.
U.S. Appl. No. 62/234,483, 45 pages.
U.S. Appl. No. 62/315,343, 41 pages.
U.S. Appl. No. 62/318,542, 44 pages.
U.S. Appl. No. 62/346,915, 41 pages.
U.S. Appl. No. 62/379,462, 24 pages.
"Flush Free Sealing Benefits," Oct. 3, 2011, http://empoweringpumps.com/flush-free-sealing-benefits/, accessed May 9, 2020, 5 pages.
Gardner Denver, Well Servicing Pump Model GD-3000—Operating and Service Manual, Apr. 2011, 44 pages.
Gardner Denver, Well Servicing Pump Model GD-1000Q—Fluid End Parts List, Sep. 2011, 24 pages.
Gardner Denver, Well Servicing Pump Model HD-2250—Operating and Service Manual, Jan. 2005, 44 pages.
Gardner Denver, GD 2500Q HDF Frac & Well Service Pump, 3 pages.
Cutting Tool Engineering, "Groove milling," Aug. 1, 2012, https://www.ctemag.cojm/news/articles/groove-milling, accessed May 13, 2020, 11 pages.
VargusUSA, "Groovex Innovative Grooving Solutions—Groove Milling," Dec. 12, 2011, http://www.youtube.com/watch?v=vrFxHJUXjvk, 68 pages.
Kerr Pumps, Kerr KA-3500B/KA-3500BCB Plunger Pump Parts and Service Manual, 41 pages.
Kerr Pumps, Kerr KD-1250B/KD-1250BCB Plunger Pump Service Manual, 38 pages.
Kerr Pumps, Kerr KJ-2250B and KJ-2250BCB Plunger Pump Service Manual, 38 pages.
Kerr Pumps, Kerr KM-3250B / KM-3250BCB Plunger Pump Service Manual, 35 pages.
Kerr Pumps, Kerr KP-3300B / KP-3300BCB Plunger Pump Service Manual, 41 pages.
Kerr Pumps, Kerr KT-3350B/BCB KT-3400BCB Plunger Pump Service Manual, 46 pages.
Kerr Pumps, Kerr triplex pump km3250bcb 10,000 psi @ 5.1 gmp, Feb. 2, 2021, http://imged.com/kerr-triplex-pump-km3250bcb-10-000-psi-5-1-gmp-8234739.html, 2 pages.
Lex Machina, 77 Federal district court cases for Alan D Albright of W.D. Tex., http://law.lexmachina.com/court/txwd/udge/5198506/cases?status=open&filed_on-from=2020-02-19&filed_on-to=2020-04-19&pending-, 7 pages.

(56) References Cited

OTHER PUBLICATIONS

Lex Machina, Motion Metrics Report for 834 orders issued by District Judge Alan D Albright (ADA) in 1,603 cases from the Search for federal district court cases before Judge Alan D Albright, https://law.lexmachina.com/motions/motion_metrics?cases_key=yyix9Y8-k2k, generated on Sep. 23, 2020, 1 page.
Lex Machina, 6:20-cv-00200-ADA, *Kerr Machine Co.* v. *Vulcan Industrial Holdings,* LLC Docket Entries, https://law.lexmachina.com/cases/200420645 1#docket-entries, 6 pages.
Jonathan Maes, "Machining Square Inside Corners: Conquer the Nightmare!," accessed Sep. 8, 2020, https://makeitfrommetal.com/machining-square-inside-corners-the-night . . . , 22 pages.
Ross Mackay, "Process Engineering: Properly seal that pump," May 17, 2005, https://www.chemicalprocessing.com/articles/2005/465, 11 pages.
MSI Fluid End Components, https://www.scribd.com/document/421304589/Fluid-End, 1 page.
MSI Dixie Iron Works, Ltd., MSI QI-1000 Technical Manual for 1000 HP Quintuplex MSI QI-1000 Pump, Feb. 21, 2004, 90 pages.
MSI, Product Listing and Pricing, accessed Mar. 8, 2016, 19 pages.
National Oilwell Varco, 267Q-6M Quinuplex Plunger Pump: Parts List, Jul. 21, 2008, 13 pages.
Oil and Gas Well Servicing, Audit Procedures for Oil and Gas Well Servicing, May 2010, Texas Comptroller of Public Accounts, Audit Division, 68 pages.
Tony Atkins and Marcel Escudier, Oxford Dictionary of Mechanical Engineering, Oxford University Press, 2013, 10 pages.
Parker Hannifin Corporation and Autoclave Engineers, Technical Information, 2016, 16 pages.
Girdhar, Moniz and Mackay, "Chapter 5.4 Centrifugal pump design," Plant and Process Engineering 360, 2010, pp. 519-536, 21 pages.
Parker Hannifin Corporation, PolyPak Seals for Hydraulic Applications Catalog EPS 5370_PolyPak, 2015, 38 pages.
Paresh Girdhar and Octo Moniz, "Practical Centrifugal Pumps—Design. Operation and Maintenance," Newnes, 2005, 33 pages.
Reinhard Preiss, "Stress concentration factors of flat end to cylindrical shell connection with a fillet or stress relief groove subjected to internal pressure," 1997, Int. J. Pres. Ves. & Piping, vol. 73, pp. 183-190, 8 pages.
Caterpillar, WS255 Quintuplex Well Stimulation Pump, 2 pages.
Gardner Denver Pumps, Redline Series Brochure, 3 pages.
Eaton Aerospace Group, Resilient Metallic Seals, TF100-35D, Oct. 2013, 60 pages.
Scott McKeown, "District Court Trial Dates Tend to Slip After PTAB Discretionary Denials—Patents Post-Grant," Jul. 24, 2020, Ropes & Gray, accessed Sep. 23, 2020, 3 pages.
Ricky Smith and R. Keith Mobley, "Rules of Thumb for Maintenance and Reliability Engineers—Chapter 14: Packing and Seals," Elsevier, 2008, pp. 239-250, 15 pages.
Schlumberger, Jet Manual 02—Reciprocating Pumps, Aug. 7, 2015, 63 pages.
Schlumberger, Treating Equipment Manual: Fluid Ends, Section 10, Apr. 2000, 87 pages.
SPM Oil & Gas, SPM QEM 3000 Frac Pump, 2021, 4 pages.
Supplemental Declaration of Steven M. Tipton, Ph.D., P.E.—Case PGR2020-00065, U.S. Pat. No. 10,591,070, Mar. 2, 2021, 35 pages.
Servagroup, TPD 600 Triplex Pump Brochure, Mar. 24, 2011, 2 pages.
Utex Industries, Inc., Well Service Products Catalog, Jun. 2017, 51 pages.
Utex Industries, Inc., Well Service Packing—Packing Assemblies Complete & Replacement, May 2013, 40 pages.
Vargus Ltd., Groove Milling High Precision Tools for Groove Milling, Dec. 2012, pp. 2-22, 24 Pages.
Flowserve, "Dynamic Balance Plug Valve and Double DB Plug Valve: Installation, Operation and Maintenance," 2011, https://www.flowserve.com/sites/default/files/2016-07/NVENIM2005-00_0.pdf, 36 pages.
Weir Oil & Gas, "SPM Well Service Pumps & Flow Control Products TWS600S Fluid End Operation Instruction and Service Manual," Feb. 27, 2017, https://www.global.weir/assets/files/oil%20and%20gas%20ebrochures/manuals/tws600s-fluid-end-2p121260.pdf, 41 pages.
White Star Pump Co., "Maintenance Manual: Triplex Pump WS-1300/1600," 2005, http://www.whitestarpump.com/ES/docs/user_t.pdf, 45 pages.
KerrPumps, "Super Stainless Steel Better Than The Best," http://kerrpumps.com/superstainless?gclid=EAlalQobChMlg47o482q-6wlVilTICh2XPA-qEAAYASAAEgKrxPD_BwE, 2013, last accessed: Aug. 21, 2020, 6 pages.
KerrPumps, "Frac One Pumps—Fluid End—Fracing," http://kerrpumps.com/fracone, 2013, last accessed: Aug. 21, 2020, 3 pages.
Kerrpumps, "KerrPumps—Frac Pump & Mud Pump Fluid End—Fluid End Pump," http://kerrpumps.com/fluidends, 2013, last accessed: Aug. 21, 2020, 6 pages.
Vulcan Industrial, "Vulcan," http://www.vulcanindustrial.com/, 2019, last accessed: Aug. 21, 2020, 3 pages.
Vulcan Industrial, "Vulcan," http://www.vulcanindustrial.com/fluid-ends/, 2019, last accessed: Aug. 21, 2020, 3 pages.
COVERT Manufacturing, Inc., "Fluid End Block: Covert Manufacturing", (site visited Jul. 30, 2021), covertmfg.com, URL: <http://www.covertmfg.com/our-capabilities/fluid-end-block/> (Year: 2021), 2 pages.
Kerr Pumps, "the most advanced fluid ends", (site visited Aug. 5, 2021), Kerrpumps.com, URL: <http://kerrpumps.com/fluidends> (Year: 2021), 7 pages.
Shandong Baorun, 2250 Triplex Plunger Pump Fluid End Exchangeable with Spm, (site visited Aug. 5, 2021), made-in-china.com, URL: <https://sdbaorun.en.made-in-china.com/product/wNixIDXYrshL/China-2250-Triplex-Plunger-Pump-Fluid-End-Exchangeable-with-Spm.html (Year: 2021), 17 pages.
John Miller, "The Reciprocating Pump, Theory, Design and Use," 1995, 2nd Edition, Krieger Publishing Company, Malabar, Florida, 1 page.
Technical Manual MSI Hybrid Well Service Pump Triplex and Quintuplex Models, Dixie Iron Works, Mar. 12, 2019, 88 pages. https://www.diwmsi.com/pumping/qi-1000/, 2 pages.
Carpenter, "CarTech Ferrium C61 Data Sheet," 2015, 2 pages.
The American Heritage Dictionary, Second College Edition, 1982, 6 pages.
Matthew Bultman, "Judge in West Texas Patent Hot Spot Issues Revised Guidelines," Sep. 23, 2020, Bloomberg Law News, 3 pages.
David L. Taylor, "Machine Trades Blueprint Reading: Second Edition," 2005, 3 pages.
Blume, U.S. Pat. No. 6,544,012, issued Apr. 8, 2003, Fig. 12A, Annotated, 1 page.
Caterpillar, "Cat Fluid Ends For Well Stimulation Pumps," 2015, 2 pages.
Claim Chart for U.S. Pat. No. 6,544,012, 23 pages.
Claim Chart for U.S. Pat. No. 7,186,097, 22 pages.
Claim Chart for U.S. Pat. No. 7,845,413, 8 pages.
Claim Chart for U.S. Pat. No. 9,534,472, 8 pages.
Claim Chart for U.S. Pat. Pub. No. 2013/0319220, 17 pages.
Claim Chart for U.S. Pat. Pub. No. 2014/0348677, 10 pages.
Claim Chart for U.S. Pat. Pub. No. 2015/0132157, 23 pages.
Claim Chart for "GD-3000," 9 pages.
Claim Chart for "NOV-267Q," 14 pages.
Collins English Dictionary, "annular," https://www.collinsdictionary.com/us/dictionary/english/annular, 2021, 4 pages.
Collins English Dictionary, "circumference," https://www.collinsdictionary.com/us/dictionary/english/circumference, 2021, 7 pages.
Collins English Dictionary, "plug," https://www.collinsdictionary.com/us/dictionary/english/plug, 2021, 17 pages.
Collins English Dictionary, "profile," https://www.collinsdictionary.com/us/dictionary/english/profile, 2021, 10 pages.
Collins English Dictionary, "sleeve," "therethrough," "through," "tube," and "tubular," 8 pages.
Collins English Dictionary, "space," https://www.collinsdictionary.com/us/dictionary/english/space, 2021, 13 pages.

(56) References Cited

OTHER PUBLICATIONS

Collins English Dictionary, "stairstep," https://www.collinsdictionary.com/us/dictionary/english/stairstep, 2021, 3 pages.
Congressional Record—Extensions of Remarks, Apr. 18, 2007, pp. E773-E775.
Congressional Record, Mar. 7, 2011, 31 pages.
"Declaration of Steven M. Tipton, Ph.D., P.E., Submitted with Patent Owner's Preliminary Response," Sep. 11, 2020, 155 pages.
"Declaration of William D. Marscher, P.E.—U.S. Pat. No. 10,914,171," Feb. 11, 2021, 308 pages.
"Declaration of William D. Marscher, P.E.—U.S. Pat. No. 10,591,070," May 25, 2020, 209 pages.
Email dated Sep. 22, 2020 in PGR2020-00065, 3 pages.
Email dated Sep. 25, 2020 in Kerr Machine v Vulcan Industrial Holdings, 1 page.
U.S. Pat. No. 10,288,178, 353 pages.
U.S. Pat. No. 10,519,950, 142 pages.
U.S. Pat. No. 10,591,070, 168 pages.
U.S. Appl. No. 16/722,139, 104 pages.
U.S. Appl. No. 13/773,271, 250 pages.
U.S. Appl. No. 15/719,124, 183 pages.

\* cited by examiner

SPRING CONTROLLING VALVE

TECHNICAL FIELD

Embodiments of the subject matter disclosed herein generally relate to pump systems, and in particular to valve assemblies used in pump systems.

BACKGROUND

Pumping systems may be used in a variety of applications, such as industrial applications where pumping systems are used to elevate a working fluid pressure. One such application is hydraulic fracturing systems, where pumps are used to increase a fluid pressure of a working fluid (e.g., fracturing fluid, slurry, etc.) for injection into an underground formation. The working fluid may include particulates, which are injected into fissures of the formation. When the fluid is removed from the formation, the particulates remain and "prop" open the fissures, facilitating flow of oil and gas. In many applications, reciprocating pumps are used where a fluid is introduced into a fluid end inlet passage and out through an outlet passage. A plunger reciprocates within a bore to add energy to the fluid.

SUMMARY

Applicant recognized the problems noted above herein and conceived and developed embodiments of systems and methods, according to the present disclosure, for valve assemblies, and in various embodiments, fluid ends containing one or more valve seats.

In accordance with one or more embodiments, a valve member for a spring-loaded valve assembly includes a top portion having a spring retaining recess, the spring retaining recess extending into the top portion to form a void space, the void space to receive at least one coil of a spring, the spring retaining recess having a recess diameter that is smaller than a top portion diameter, wherein the recess diameter is larger than a rest diameter of a spring base including the coil, the spring retaining recess blocking expansion of the at least one coil when the spring is compressed. The valve member also includes a bottom portion coupled to the top portion. The valve member further includes a sealing element positioned axially below a shoulder of the top portion and legs coupled to the bottom portion.

In accordance with another embodiment, a valve assembly includes a valve seat having a strike face and a valve member configured to reciprocate such that a sealing element of the valve member moves into contact with the strike face and out of contact with the strike face, wherein movement of the valve member is driven, at least in part, by a spring biasing the valve member toward the valve seat. The valve member includes a bottom portion and legs coupled to the bottom portion. The valve member also includes a top portion coupled to the bottom portion, the sealing element being positioned, at least partially, between the top portion and the bottom portion, wherein a spring retaining recess is formed in the top portion along a top surface, the spring retaining recess having a depth that extends axially lower than the top surface to receive at least a portion of the spring such that a contact area between the spring and the top portion is axially lower than the top surface, and a diameter of the spring retaining recess being selected based, at least in part, on a spring base diameter to block expansion of a spring base beyond a predetermined position.

In accordance with another embodiment, a pump assembly includes a fluid end block having a first bore, a second bore, a third bore, and a fourth bore, the first bore extending from an external surface to an internal chamber, and the second bore extending from an opposite external surface to the internal chamber, the third and fourth bore extending independently toward the internal chamber, the internal chamber connecting each of the first bore, the second bore, the third bore, and the fourth bore. The pump assembly also includes a valve assembly arranged in at least one of the first bore or the second bore. The valve assembly includes a valve member having a bottom portion, legs coupled to the bottom portion, and a top portion coupled to the bottom portion, wherein a spring retaining recess is formed in the top portion along a top surface, the spring retaining recess having a depth that extends axially lower than the top surface to receive at least a portion of a spring such that a contact area between the spring and the top portion is axially lower than the top surface, and a diameter of the spring retaining recess being selected based, at least in part, on a spring base diameter to block expansion of a spring base beyond a predetermined position. The valve assembly also includes a valve seat arranged within at least one of the first bore or the second bore and positioned to receive contact from the valve member responsive to movement of the valve member.

In accordance with another embodiment, a valve member for a reciprocating pump assembly includes a valve body comprising a frustoconical surface, the valve body defining an outside annular cavity adjacent to the frustoconical surface and bounded by a top surface of the valve. The valve member also includes a seal arranged in the outside annular cavity, the seal positioned such that the seal is not on the top surface of the valve. The valve member further includes a recessed pocket sitting below the top surface of the valve and a conical spring retained in the recessed pocket.

BRIEF DESCRIPTION OF THE DRAWINGS

The present technology will be better understood on reading the following detailed description of non-limiting embodiments thereof, and on examining the accompanying drawings, in which.

DETAILED DESCRIPTION

Figure 1:
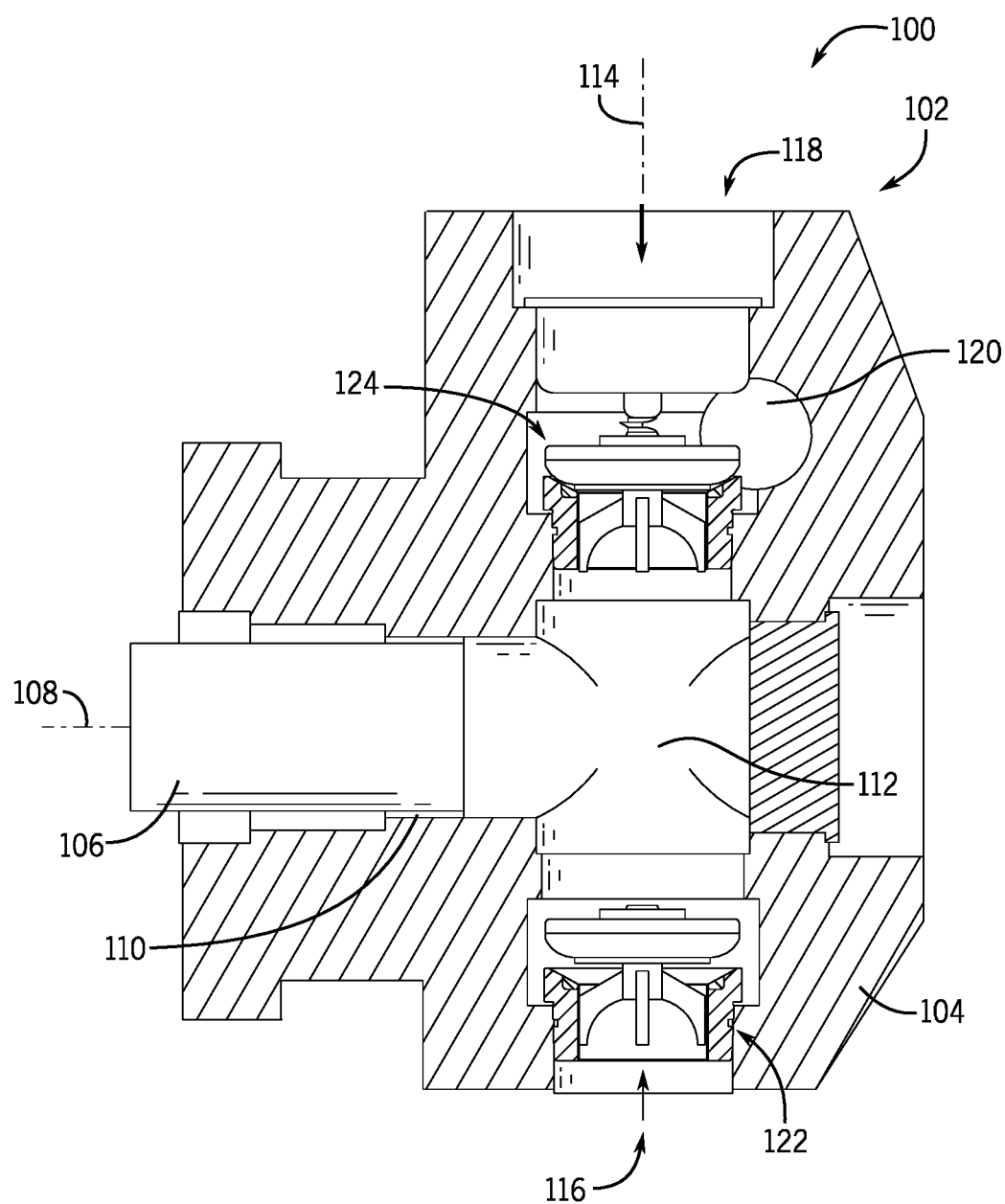
FIG. 1 is a schematic cross-sectional view of a prior art pump assembly, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, like reference numerals may be used for like components, but such use is for convenience purposes and not intended to limit the scope of the present disclosure. Moreover, use of terms such as substantially or approximately may refer to +/−10 percent.

Embodiments of the present disclosure are directed valve assembly configurations to facilitate spring retention and reduce spring fatigue. In at least one embodiment, a top portion of a valve member (e.g., valve, valve body) may include a spring recess (e.g., a pocket, a groove, a spring retainer) to retain at least a portion of a spring within a predefined radial extent, thereby limiting radial expansion/growth of at least a portion of the spring during compression. In at least one embodiment, at least a portion of the spring is positioned within the spring recess, which may lower a contact area of a spring base with respect to a top portion of the valve member. Accordingly, various areas of the top portion of the valve member, such as a shoulder positioned over one or more sealing elements, may be thicker, which may improve sealing element life by providing a larger area for heat dissipation, among other benefits.

In operation, a valve member may reciprocate between an open position and a closed position, where a spring may be arranged to drive the valve body toward the closed position and, when overcome by a fluid pressure, the valve body may move away from a sealing surface to permit flow of a fluid. As fluid pressure decreases, the valve body may be driven back toward the sealing surface via a spring force of the valve. While in the open position (and also at least partially during an installation position and/or a closed position), the spring may be compressed such that at least a portion of the spring "walks out" toward the outer diameter of the valve body. That is, a conical spring may be arranged such that a downward force applied to the spring may, at least in part, include one or more horizontal force elements that drive at least a portion of the spring base radially outward away from an axis extending through a center of the spring. This reduces a closing force of the spring, thereby potentially leading to more frequent maintenance intervals, which increases costs associated with various operations. Various embodiments of the present disclosure address this problem by incorporating a pocket or groove, which may generally be referred to as a recess or a recessed portion, into a top portion of the valve body. At least a portion of the spring may be seated within the pocket or groove. The pocket or groove may have a predetermined diameter that permits a predetermined amount of radial movement of the spring and also permits simplified installation. In at least one embodiment, outward movement of the spring base relative to the axis is restricted due to contact between the spring base and walls of the pocket of groove. Accordingly, various embodiments provide for a valve assembly arrangement to address early spring failures.

Embodiments may further be directed toward an increased shoulder thickness proximate a sealing element. For example, incorporation of the pocket or groove may permit for an increased height at a top portion of the spring, which may be positioned axially above the sealing element, which permits faster heat dissipation, which may further be associated with improved seal life. In at least one embodiment, the sealing element may be a polymer, an ethylene, a fluoropolymer, a tetrafluoroethylene, or any combination thereof. For example, in at least one embodiment, the sealing element is a polytetrafluorethylene (PTFE) that may be particularly selected for various pumping applications.

FIG. 1 is a schematic cross-sectional view of a prior art pump assembly 100, which may also be referred to as a reciprocating pump assembly and/or a reciprocating pump. The pump assembly 100 may be utilized during hydraulic fracturing operations, among other operations, where a working fluid (e.g., fracturing fluid, slurry, etc.) is introduced into the pump and energy is added to the working fluid to increase a pressure of the working fluid. Fracturing fluid, by way of example only, may include corrosives and also particulates, such as sand or ceramics, which are utilized during fracturing operations. These corrosives and particulates cause erosion within the pump assembly 100, which may undesirably affect fracturing operations and lead to down times to replace various components. Additionally, the fracturing fluids may include corrosive acids and the like, which may wear down components of the pump assembly 100.

It should be appreciated that various components of the pump assembly 100 have been removed for clarity with the following discussion. For example, a power end has been removed in favor of focusing on the illustrated fluid end 102 of the pump assembly 100. The power end may include a crankshaft that is driven by an engine or motor to facilitate operations. The fluid end 102 includes a fluid end block 104 that may house one or more components discussed herein. A plunger rod 106 is driven (e.g., via the crankshaft) to reciprocate within the fluid end block 104 along a plunger axis 108. The plunger rod 106 is positioned within a bore 110 extending through at least a portion of the fluid end block 104. The illustrated bore 110 is arranged along the plunger axis 108 (e.g., first axis) and intersects a pressure chamber 112, which is arranged along a pressure chamber axis 114 (e.g., second axis), which is positioned substantially perpendicular to the plunger axis 108. It should be appreciated that the pump assembly 100 may include multiple plunger rod and pressure chamber arrangements, which may be referred to as a plunger throw. For example, the pump assembly 100 may be a triplex pump, quadplex pump, quintuplex pump, and the like.

The illustrated fluid end block 104 includes an inlet passage 116 and an outlet passage 118, which are generally coaxial and arranged along the pressure chamber axis 114. In other words, the inlet passage 116 and the outlet chamber 118 are axially aligned with respect to one another and/or the pressure chamber 112. In various embodiments, fluid enters the pressure chamber 112 via the inlet passage 116, for example on an up stroke of the plunger rod 106, and is driven out of the pressure chamber 112 to an outlet passage 120, for example on a down stroke of the plunger 106.

Respective valve assemblies 122, 124 are arranged within the inlet passage 116 and the outlet chamber 118. These valve assemblies 122, 124 are spring loaded in the illustrated embodiment, but it should be appreciated that such an arrangement is for illustrative purposes only. In operation, a differential pressure may drive movement of the valve assemblies. For example, as the plunger rod 106 is on the upstroke, pressure at the inlet passage 116 may overcome the spring force of the valve assembly 122, thereby driving fluid into the pressure chamber 112. However, on the down stroke, the valve assembly 122 may be driven to a closed position, while the spring force of the valve assembly 124 is overcome, thereby enabling the fluid to exit via the outlet passage 120.

In one or more embodiments, springs utilized within the system may be conical springs that undergo various cycles while valve bodies move between open positions and closed positions. For example, when a valve opens, the valve body may move axially away from the seal sealing surface to a position that is limited and/or controlled by a conical spring arranged at a top portion of the valve. Repeated operation may fatigue the spring, thereby reducing its effectiveness, and as a result, the spring may be scheduled for service or replacement at a same time as its associated valve assembly. However, operators may try to extend a useful life of their equipment, so springs may not be changed during valve assembly maintenance. Additionally, it may be desirable to maintain spring use for as long as the springs are effective to reduce costs. Springs used in these assemblies may have a failure mode in which a diameter of a base of the spring expands, allowing the spring to experience more axial compression and higher stresses than originally designed. These higher stresses in turn reduce the overall life of the spring, which may lead to potential pump failures where valves are no longer closing. Embodiments of the present disclosure may overcome these problems by incorporating a spring recess (e.g., a groove, a pocket, etc.) into a top portion of the valve member to restrict or otherwise block spring diameter increases beyond a predetermined position. Additionally, embodiments may incorporate a boss or knob associated with the spring recesses to facilitate installation and/or centering of the components. Furthermore, various embodiments enable an increased height to one or more top portions of the valve body, such as a shoulder proximate a sealing element, in order to improve heat dissipation and increase seal life.

Figure 2:
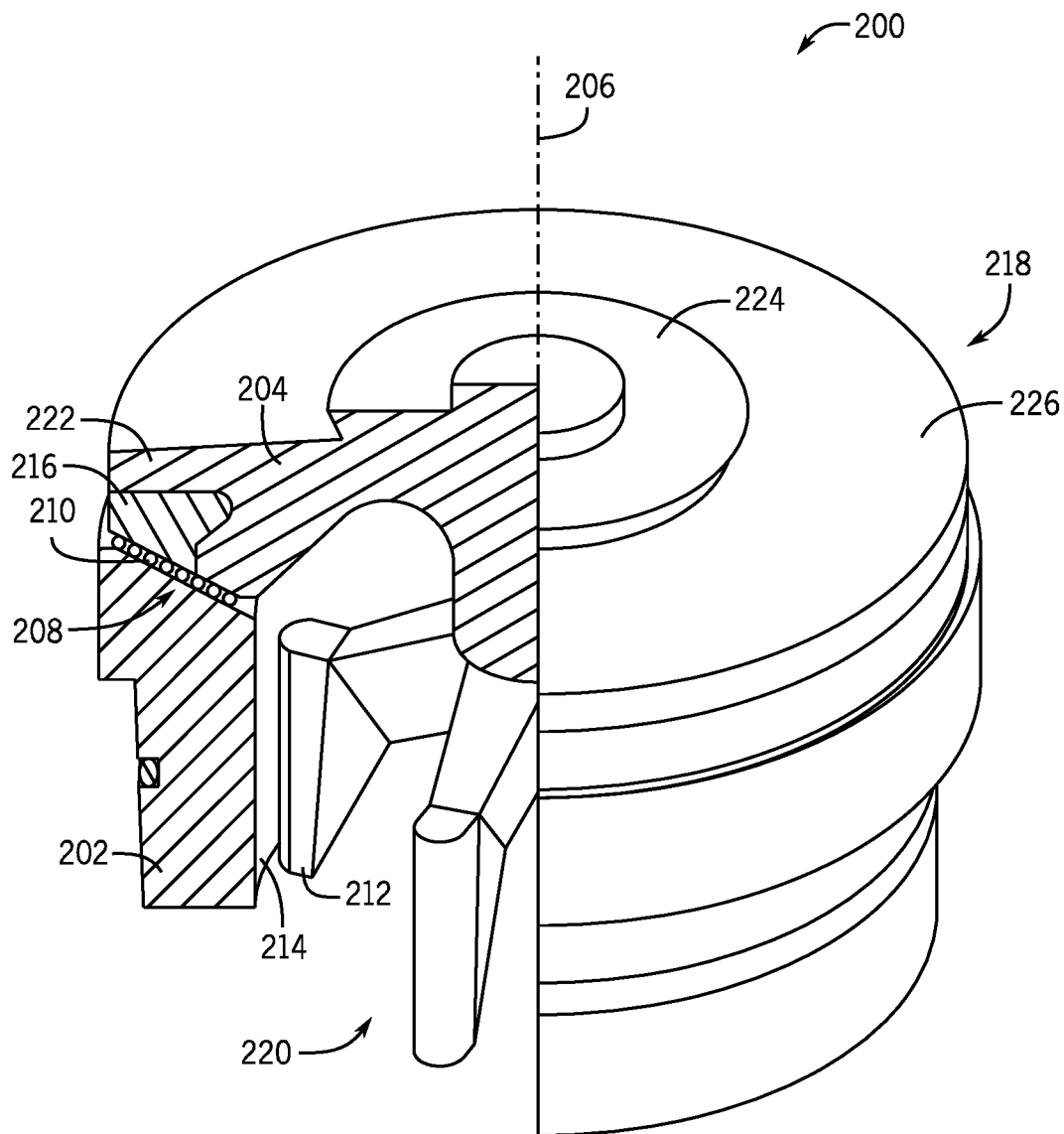
FIG. 2 is a cut-away perspective view of a prior art valve assembly, in accordance with embodiments of the present disclosure.

FIG. 2 is a schematic cut away view of a prior art valve assembly 200, such as the valve assemblies 122, 124, which may be utilized with a pump assembly. The illustrated valve assembly 200 includes a valve seat 202 and a valve member 204 (e.g., a valve body). It should be appreciated that the valve seat 202 may refer to the structure of the seat and may include multiple constituent components, such as a body, a strike face, and the like. In operation, the valve member 204 reciprocates along a valve axis 206, which may correspond to the pressure chamber axis 114, such that the valve member 204 moves into and out of contact with at least a portion of the valve seat 202. In the illustrated embodiment, particulates 208 have accumulated along the valve seat 202, for example at a strike face 210 (e.g., a contact face). Repeated contact from the valve member 204 may drive the particulates 208 into the strike face 210, causing scarring or other damage. Additionally, corrosive fluids may contact other portions of the valve seat 202, in addition to the strike face 210. Damage to the valve seat 202 may cause the sealing capability of the valve assembly 200 to degrade, thereby reducing the effectiveness of the pump assembly.

In various embodiments, guide legs 212 of the valve member 204 may also lead to damage to various portions of the valve seat 202. For example, in the illustrated embodiment, the guide legs 212 extend into a bore 214 of the valve seat 202. Due to the presence of the corrosive fluid and/or the particulates, damage may occur along the bore 214, such as scarring. As a result, the pump assembly may be taken out of service for repairs, which may be expensive and also contribute to non-productive time at the well site.

As noted, operation of the illustrated valve assembly 200 may be, at least partially, spring loaded, where the spring has been removed in FIG. 2, to drive the valve member 204 toward the illustrated closed position where a sealing element 216 is driven toward the valve seat 202. In this example, the valve member 204 may include a top portion 218 and a bottom portion 220, where the top portion 218 may corresponding to the region above a shoulder 222 and the bottom portion 220 may correspond to a region below the shoulder 222. It should be appreciated that this delineation is provided by way of example for clarity and conciseness and that different portions of the valve member 204 may correspond to the top and bottom portions 218, 220. In this example, a boss 224 is included along the top portion 218 that corresponds to a raised area that extends axially away from a top surface 226. The boss 224 may be viewed as an extension or extrusion extending away from the top surface 226 and may be used to center the spring (not pictured) or as a knob or handle for retrieval and placement of the valve member 204. Additionally, the boss 224 may be used as a hard stop to limit total spring compression.

In operation, the spring (not pictured) may be seated on the top surface 226. Over time, various periods of compression and expansion may cause forces to act on the spring base positioned on the top surface 226 to drive the spring base radially outward away from the axis 206. When this occurs, a closing force is reduced, thereby reducing the effectiveness of the valve assembly 200. For example, with a reduced closing force, the sealing element 216 may not be driven against the strike face 210 at the appropriate time, or at all, thereby causing leaks and other inefficiencies. However, the illustrated boss 224 does not overcome this issue at least because it does not affect outward radial movement of the spring base, and is merely positioned to act as either a hard stop to limit movement and/or for installation purposes. Accordingly, prior art valve assemblies cannot address the problems associated with spring base walk out.

In at least one embodiment, systems and methods of the present disclosure address problem associated with various valve members 204 by incorporating a spring recess (e.g., a pocket, a groove, etc.) into the top portion 218 that extends into and below the top surface 226. As will be described below, the spring recess may receive and support at least a portion of a spring and restrict expansion of a spring diameter beyond a predetermined point, thereby increasing a life of the spring. Furthermore, embodiments may include one or more features to facilitate installation and removal of the valve member 204 and/or the spring while also increasing an axial height of the top portion 218 to provide improved heat dissipation for the sealing element 216, thereby increasing seal life.

FIGS. 3A-3D illustrate embodiments of a valve assembly 300 that may be utilized to overcome one or more deficiencies of prior art valve assemblies. As will be described below, one or more embodiments may include a recess (e.g., a pocket, a groove, etc.) to receive at least a portion of a spring base to prevent the spring base from walking out. Furthermore, arrangements may provide for a thicker shoulder over a sealing element for improved heat dissipation, among other benefits. It should be appreciated that various features of the embodiments described herein may be incorporated with one another and are not limited to the arrangements shown. For example, the valve assembly 300 may include features described with other valve assemblies disclosed herein.

Figure 3A:
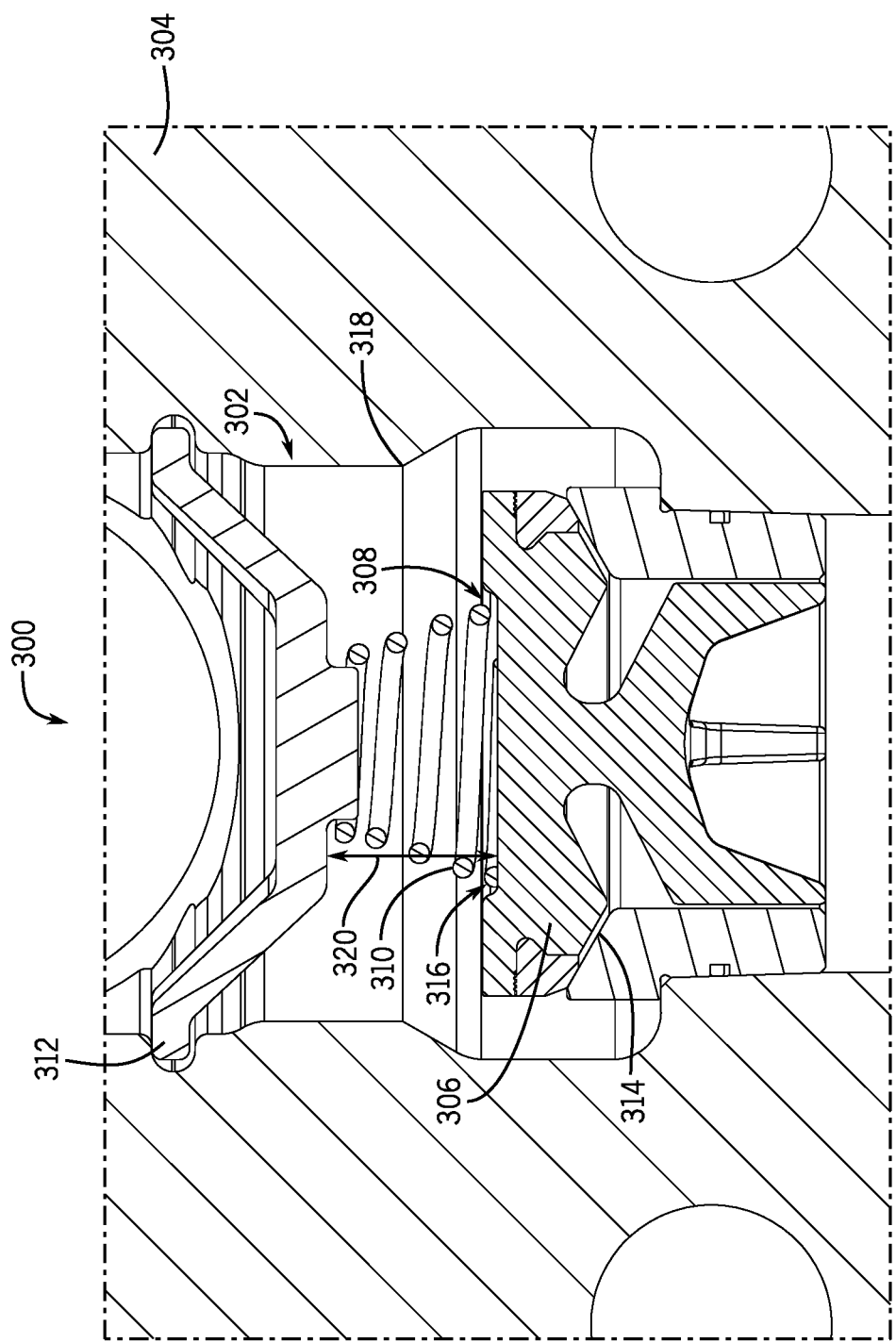
FIG. 3A is a cross-sectional view of an embodiment of a fluid end including a valve assembly, in accordance with embodiments of the present disclosure.

FIG. 3A is a cross-sectional view of the valve assembly 300 arranged within a bore 302 of a fluid end 304, which may share one or more features with the valve assemblies 122, 124, 200 and/or the fluid end 102. This example shows the valve assembly including a valve member 306 that has a spring recess 308, which in this example may be referred to as a spring retaining pocket. The illustrated embodiment includes the valve assembly 300 associated with a suction side of the fluid end 304, but it should be appreciated that various embodiments may also be used with different portions of the fluid end. It should be appreciated that a spring 310 is show in an uncompressed state that is not representative of how it functions when installed. When the spring 310 is installed between a twist in retainer 312 and the valve member 306 the spring 310 has a residual crush force used to keep the valve member 306 in place and to keep the retainer 312 from rotating. As shown, the lowest coils sit in the spring recess 308 of the valve member 306 and are retained in place based upon the geometry of the spring recess 308. It should be appreciated, and will be described below, that a depth of the recess 308 may be particularly selected to accommodate one or more coils of the spring 310. Moreover, while a conical spring 210 is shown in this example, it should be appreciated that other spring or biasing configurations may also be used within the scope of the present disclosure.

As noted above, the fluid end 304 operates based upon a controlled cavity restrained by two check valves (e.g., valve assemblies including valve members and valve seats) with one allowing relatively low pressure fluid (e.g., <200 psi) into the chamber and the second one preventing the water from existing the chamber to the higher pressure discharge chamber (e.g., >6000 psi). This allows the main pressure of the fluid end to fill up between strokes and then when the plunger is driven into the chamber, the fluid pressure increases until the discharge side valve opens, allowing the higher pressure fluid to exit into the discharge chamber and out of the fluid end. When the pressure equalizes over time, the conical spring 310 on the top of the valve member 306 forces the valve member 306 into the closed position and the plunger retracts, causing the volume of the chamber to increase and thereby the pressure of the chamber decreases such that the low-pressure supply valve opens and allows fluid into the main pressure pumping. When the valve member 306 moves to the open position, it moves axially away from a seat sealing surface 314 and is limited in how far it can open based upon the conical spring 310 on top of the valve member 306.

The pressures involved with this process may cause forces to act on the spring 310, where the compression of the spring 310 will drive a spring base 316 radially outward (e.g., toward walls 318 of the bore 302 to increase a base diameter of the spring 310), which may be referred to as the spring "walking out." As the spring base 316 moves outward, a reduced closing force may be produced by the spring 310. For example, a spring height may 320 decrease, which may cause, at least in part, the reduced closing force. This is undesirable in that it may cause the valve member 306 to not fully close or to close at the wrong time. Embodiments of the present disclosure overcome this problem by utilizing the spring recess 308 to restrict radial movement of the spring 310 such that the base 316 cannot move radially outward toward the walls 318, for example due to a blockage via one or more portions of the spring recess 308. In other words, the walking out of the spring base 316 may be blocked due to contact at the walls of the recess 308, which prevents further radial or outward movement of the spring base 316. In at least one embodiment, a base diameter may be known and, based on the springs 310 intended for different operations, a recess diameter may be particularly selected to permit at least some expansion and/or to block expansion entirely, based on the desired or expected operating conditions. Accordingly, spring life may be improved due to the reduced likelihood of a reduction in spring height due to radial movement of the spring base.

Figure 3B:
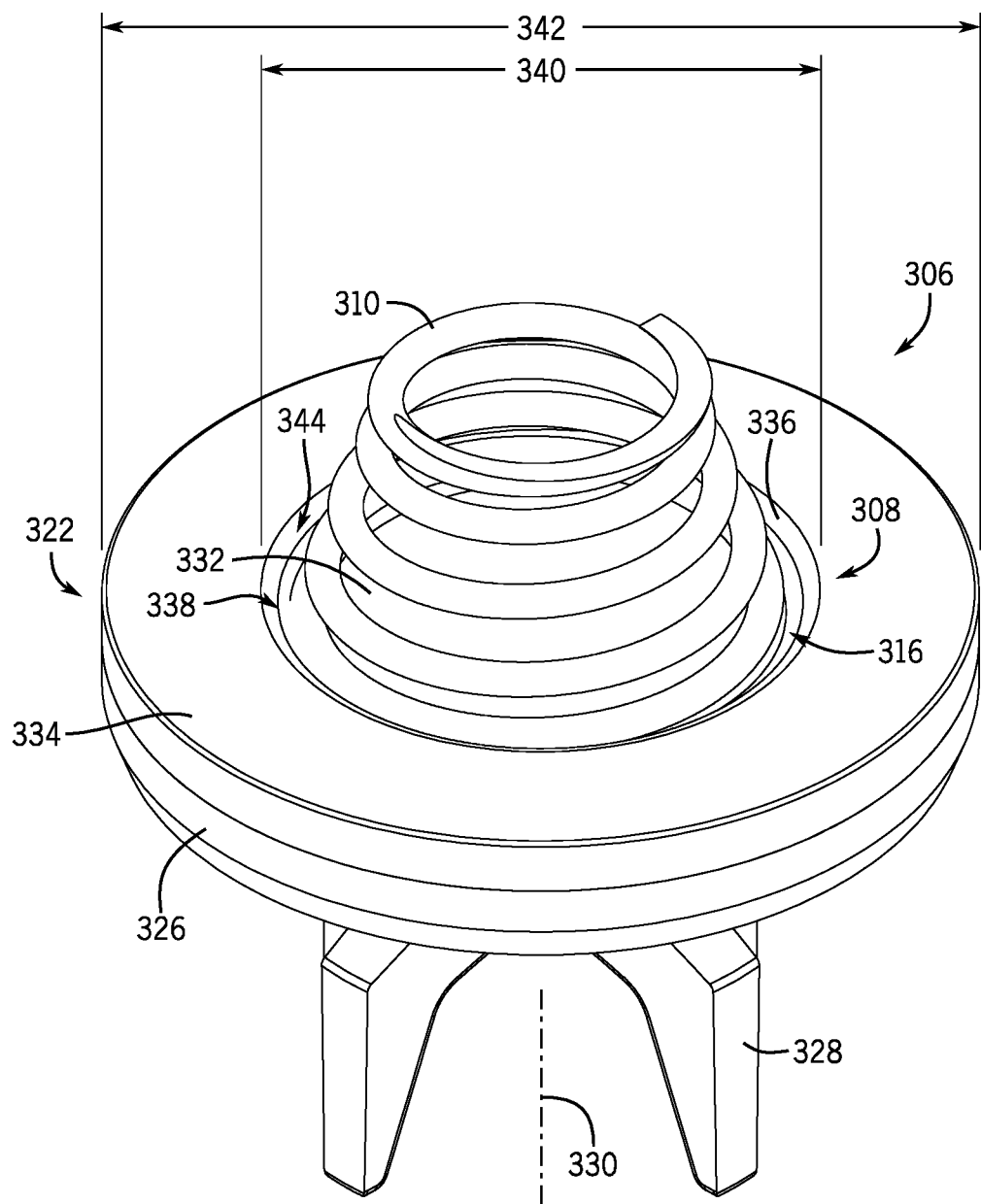
FIG. 3B is a perspective view of an embodiment of a valve member and a spring, in accordance with embodiments of the present disclosure.

FIG. 3B is a perspective view of the valve member 306 including the spring 310 positioned within the spring recess 308, which as noted, may be referred to as a pocket for this configuration. The illustrated valve member 306 includes a top portion 322 and a bottom portion 324 (not visible due to a sealing element 326 (e.g., a valve seal)) which further includes legs 328 extending from the bottom portion 324. Various embodiments may describe at least a portion of the valve member 306, such as the bottom portion 324, as having a frustoconical surface or shape. Moreover, the sealing element 326 may be defined as being positioned within an outside annular cavity (e.g., an annular cavity formed along an outer diameter of the valve member 306) such that the sealing element 326 is positioned, at least partially, adjacent to the frustoconical surface. In this example, the top portion 322 may correspond to the region axially higher than the sealing element 326 along the axis 330. That is, the sealing element 326 may be positioned such that the sealing element 326 is not on a top surface 334 of the top portion 322. At least one embodiment may describe at least a portion of the bottom portion 324 as being axially lower than the sealing element 326, relative to a plane extending along and parallel to the top surface 334.

The spring recess 308 is shown extending into the top portion 322 along the axis 330 such that a recess base 332 is axially lower than the top surface 334 of the top portion 322. That is, the recess base 332 is axially closer to the seal 326 than the top surface 334. In other words, the spring recess 308 may be described as sitting below the top surface 334. The recess 308 includes a continuous wall 336 that has a rounded edge 338, but it should be appreciated that the edge 338 may not be rounded in other embodiments. In this example, a recess diameter 340 is less than a top portion diameter 342. It should be appreciated that the recess diameter 340 may be particularly selected based, at least in part, on one or more spring characteristics. For example, the recess diameter 340 may correspond to approximately a spring resting diameter. In this example, the spring base 316 is positioned within the recess 308 such that a space 344 is shown between the wall 336 and the spring base 316. As such, at least some radial expansion (e.g., movement outward from the axis 330) of the spring base 316 may be permitted. It should be appreciated that adjustments to the recess diameter 340 may control or otherwise limit a permitted expansion. For example, a larger diameter 340 may permit more outward expansion than a smaller diameter 340. Moreover, the space 344 may allow for easier installation by providing some give or degrees of freedom during installation while still restricting movement of the spring base 316 in operation. Furthermore, as noted above, it should be appreciated that the illustrated example is in a non-compressed position and that, at installation, the spring 310 is compressed by the retainer 312. Accordingly, the space 344 may be sized such that the spring base 316 expands upon installation and may reduce a size of or eliminate the space 344 upon installation. Compression of the spring 310 may drive one or more coils into the recess 308, but it should be appreciated that the recess 308 may be sized to receive a reasonable number of coils. In at least one embodiment, the spring recess 308 is centered along the axis 330, but in one or more embodiments, the spring recess 308 may be positioned at a different location or there may be multiple recesses 308 in embodiments where there are multiple springs. In various embodiments, the spring recess 308 may be described as retaining at least a portion of the spring 310, which as noted, may be a conical spring.

Figure 3C:
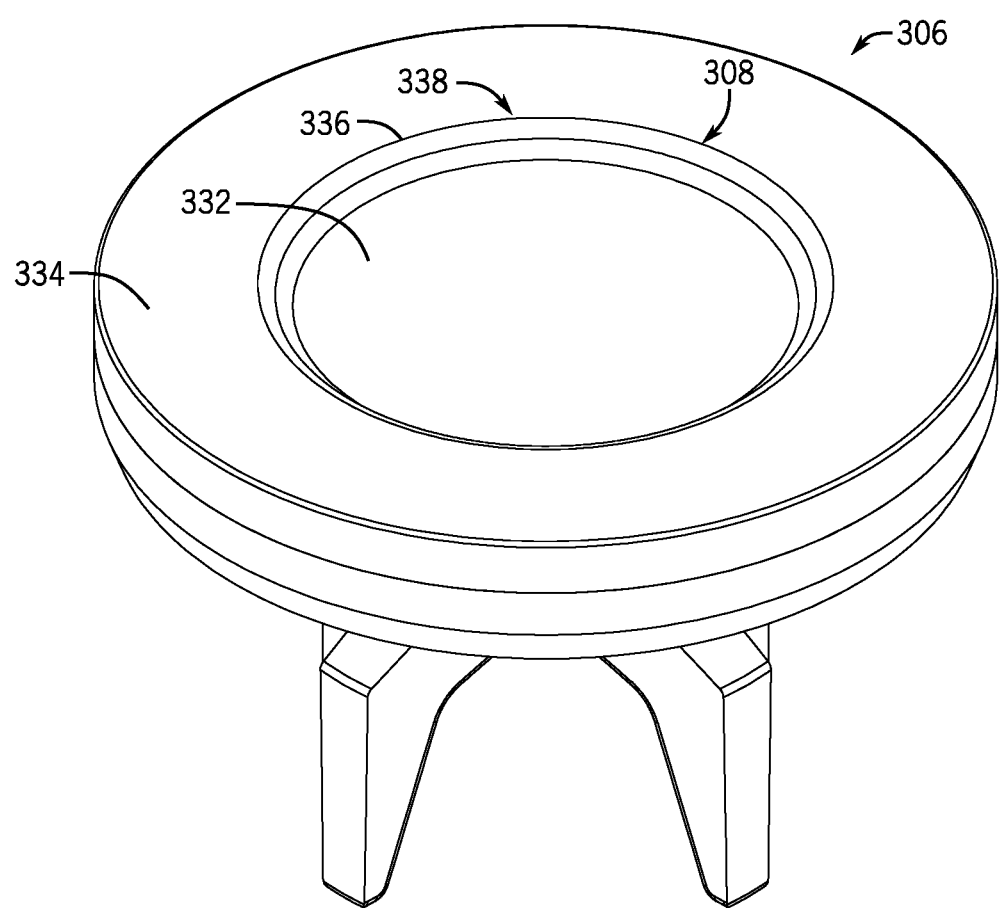
FIG. 3C is a perspective view of an embodiment of a valve member, in accordance with embodiments of the present disclosure.

FIG. 3C is a perspective view of an embodiment of the valve member 306 in which the spring 310 has been removed. This configuration illustrates the centered position of the spring recess 308, which as noted above may be changed based on expected operating conditions. Further illustrated is the continuous wall 336 and the curved edge 338. The curved edge 338 is shown by way of example and may by a squared edge, a sloped edge, or any other reasonable geometry. Furthermore, the curved edge 338 may be an overlap or an overhang such that, when compressed, the spring 310 may extend radially outwardly toward the walls 336 in a position where the edge 338 overhangs the spring 310 (e.g., where axial movement of the spring 310 is blocked by the curved edge 338). As shown, the recess base 332 may be a planar surface that is substantially parallel to the top surface 334. In various embodiments, one or more features may be positioned to extend axially away from the recess base 332.

Figure 3D:
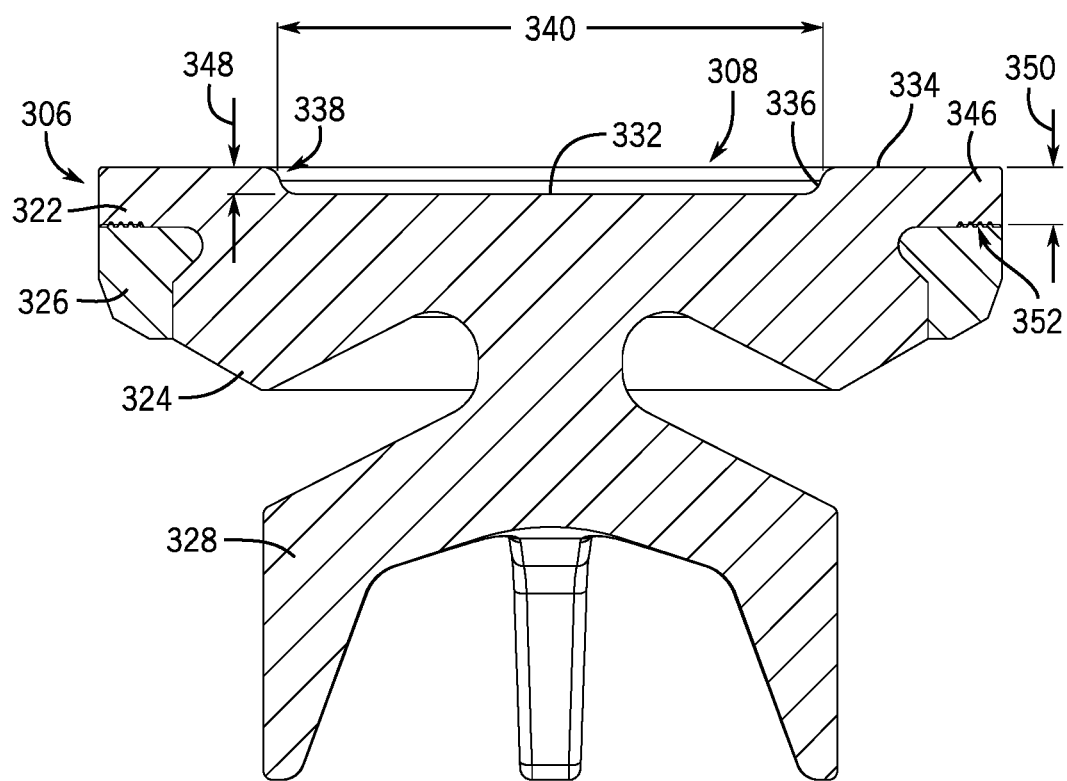
FIG. 3D is a cross-sectional view of an embodiment of a valve member, in accordance with embodiments of the present disclosure.

FIG. 3D is a cross-sectional view of an embodiment of the valve member 306 in which the spring 310 has been removed. This example shows the bottom portion 324 coupled to the top portion 322, which as noted above, may be represented by the area above the seal 326, such as a shoulder 346 positioned over the seal 326. In various embodiments, the top portion 322 may be a planar region extending across a bottom portion of the shoulder 346 at an interface between the seal 326 and the shoulder 346, but it should be appreciated that, in various embodiments, different portions may correspond to the top portion 322. The legs 328 are also illustrated coupled to the bottom portion 324.

The illustrated configuration shows the recess 308, which in this example may be referred to as a pocket due to the lack of additional components or features within an area of the recess 308. That is, the illustrated recess 308 may correspond to a void or a removed portion that extends axially into the top portion 322. This example includes the wall 336 that extends circumferentially to form the recess 308 having the recess diameter 340 and a recess depth 348. The recess depth 348 may correspond to a distance between the recess base 332 and the top surface 334 of the top portion 322. The depth 348 may be approximately equal to a thickness of one coil of the spring, but it should be appreciated that other depths 348 may be used in various embodiments and the coil thickness may be one factor utilized to determine the depth 348. The wall 336 includes the curved edge 338, which as noted above may be a variety of different shapes, such as planar, slanted, or the like. Furthermore, the edge 338 may overhang over the recess 308 such that an edge diameter is less than a recess diameter 340.

Further illustrated is a shoulder thickness 350, which may correspond to a distance between an interface 352 between the seal 326 and the top surface 334. It should be appreciated that various features may be included at the interface 352, such as teeth or the like to facilitate gripping the seal 326, and that the distance described above corresponds to a lowest point of the interface 352. In this example, the thickness 350 may be larger than a thickness of a corresponding valve member that does not include the recess 308. For example, in various embodiments, a top surface of a valve member, or features along the top surface, may act as a hard stop for valve member movement. As a result, an axial height of the top portion may be limited or restricted. This axial height may be measured from a location where the spring contacts the valve member. By adding the depth 348 of the recess, which lowers the contact point of the spring, the thickness 350 may be increased, thereby providing additional support at the seal 326, which is the region that contacts the seat sealing surface 314 (FIG. 3A). Accordingly, heat dissipation from the seal 326 may be improved, thereby increasing the useful life of the seal 326. In this manner, a time may be extended between maintenance intervals due to the improved life of the spring 310 and also the improved life of the seal 326. As a result, systems and methods of the present disclosure may reduce costs for pump operators and provide improved operations.

FIGS. 4A-4D illustrate embodiments of a valve assembly 400 that may be utilized to overcome one or more deficiencies of prior art valve assemblies. As will be described below, one or more embodiments may include a recess (e.g., a pocket, a groove, etc.) to receive at least a portion of a spring base to prevent the spring base from walking out. Furthermore, arrangements may provide for a thicker shoulder over a sealing element for improved heat dissipation, among other benefits. It should be appreciated that various features of the embodiments described herein may be incorporated with one another and are not limited to the arrangements shown. For example, the valve assembly 400 may include features described with other valve assemblies disclosed herein. It should be appreciated that certain like features are referred to with like numerals for convenience purposes and are not intended to limit the scope of the present disclosure.

Figure 4A:
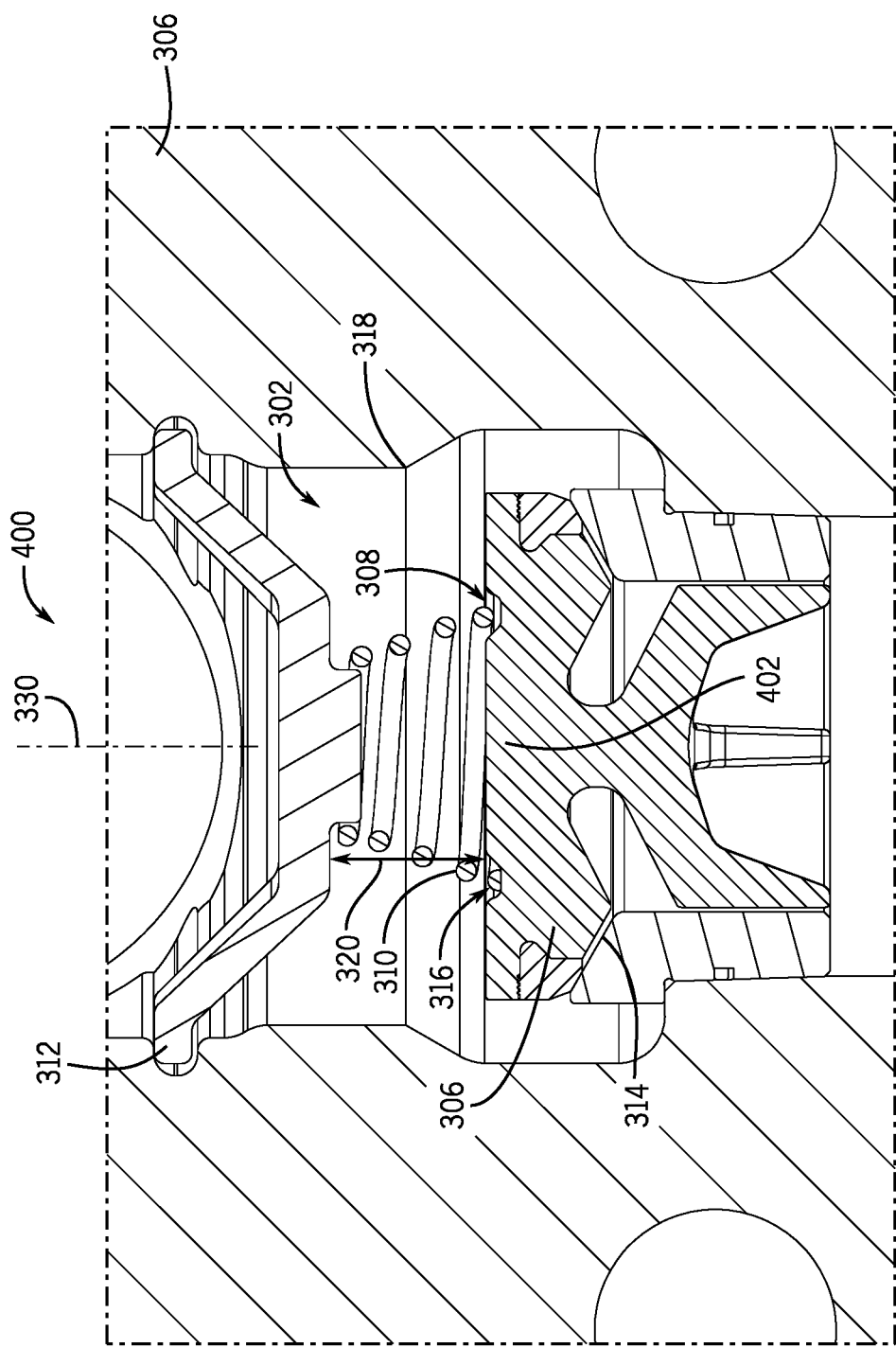
FIG. 4A is a cross-sectional view of an embodiment of a fluid end including a valve assembly, in accordance with embodiments of the present disclosure.

FIG. 4A is a cross-sectional view of the valve assembly 400 arranged within the bore 302 of the fluid end 304, which may share one or more features with the valve assemblies 122, 124, 200 and/or the fluid end 102. Moreover, various aspects of the embodiments of FIGS. 4A-4D may share one or more components with FIGS. 3A-3D. This example shows the valve assembly including the valve member 306 that has the spring recess 308, which in this example may be referred to as a spring retaining groove. The illustrated embodiment includes the valve assembly 400 associated with a suction side of the fluid end 304, but it should be appreciated that various embodiments may also be used with different portions of the fluid end. Moreover, as noted with respect to FIG. 3A, it should be appreciated that the spring 310 is show in an uncompressed state that is not representative of how it functions when installed. When the spring 310 is installed between the twist in retainer 312 and the valve member 306 the spring 310 has a residual crush force used to keep the valve member 306 in place and to keep the retainer 312 from rotating. As shown, the lowest coils sit in the spring recess 308 of the valve member 306 and are retained in place based upon the geometry of the spring recess 308. It should be appreciated, and will be described below, that a depth of the recess 308 may be particularly selected to accommodate one or more coils of the spring 310.

As noted above, as the fluid end 304 operates and the valve member 302 moves in and out of contact with the sealing surface 314, pressures may cause forces to act on the spring 310, where the compression of the spring 310 will drive the spring base 316 radially outward (e.g., toward walls 318 of the bore 302 to increase a base diameter of the spring 310). As the spring base 316 moves outward, or "walks out," a reduced closing force may be produced by the spring 310. For example, the spring height may 320 decrease, which may cause, as least in part, the reduced closing force. This is undesirable in that it may cause the valve member 306 to not fully close or to close at the wrong time. Embodiments of the present disclosure overcome this problem by utilizing the spring recess 308 to restrict radial movement of the spring 310 such that the base 316 cannot move radially outward toward the walls 318. In other words, the walking out of the spring base 316 may be blocked due to contact with one or more portions of the recess 308, which prevents further radial or outward movement of the spring base 316. In at least one embodiment, a base diameter may be known and, based on the springs 310 intended for different operations, a recess diameter may be particularly selected to permit at least some expansion and/or to block expansion entirely, based on the desired or expected operating conditions. Accordingly, spring life may be improved due to the reduced likelihood of a reduction in spring height due to radial movement of the spring base.

In this example, a boss 402 (e.g., extension, protrusion, platform, etc.) is shown within the spring recess 308 and extends in an axially upward direction along the axis 330. The boss 402 may form an inner barrier with respect to the spring base 316 such that the spring base 316 is blocked from both radially inward movement and radially outward movement beyond certain predetermined positions. Additionally, in various embodiments, the boss 402 may be used to center the spring 310 and/or as a handle during installation and removal.

Figure 4B:
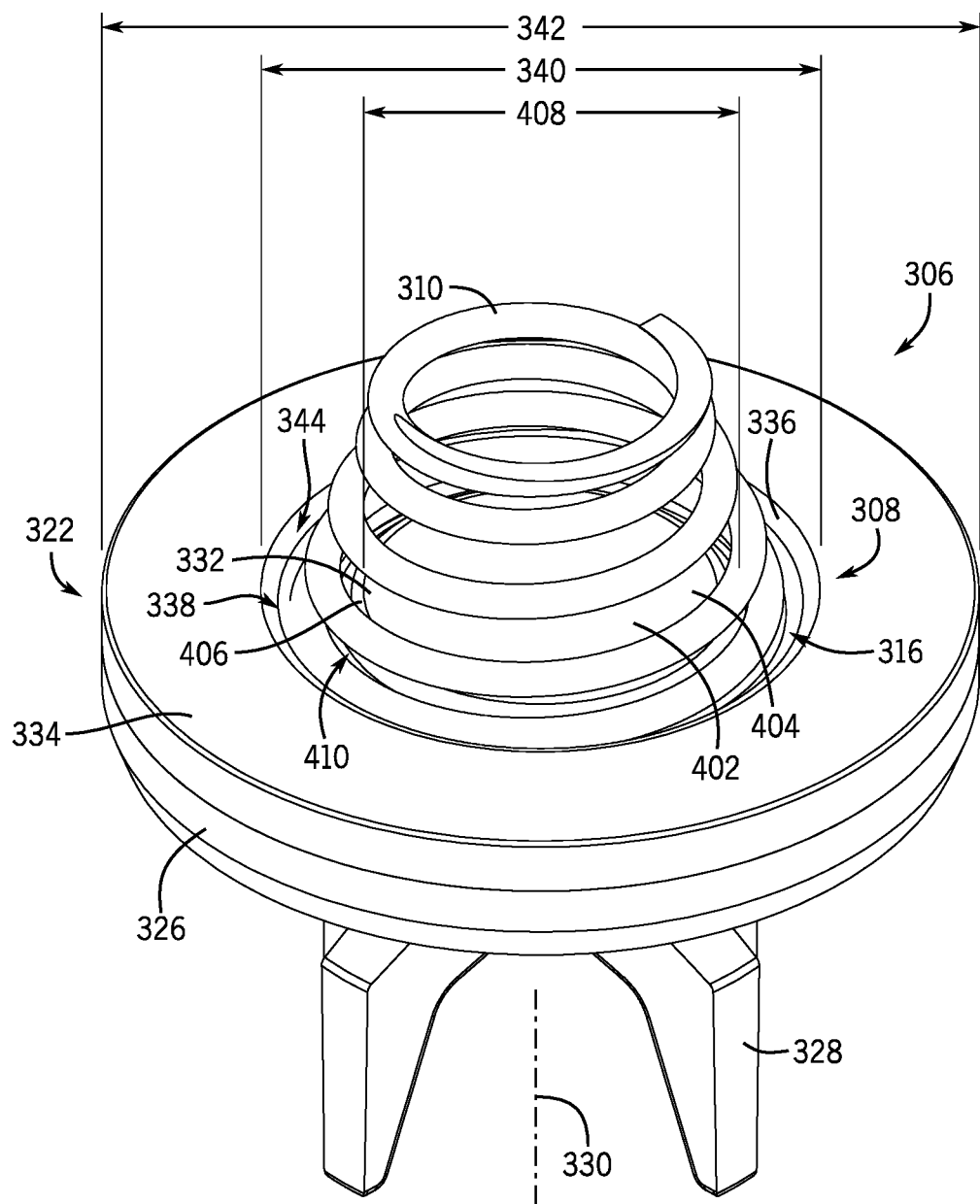
FIG. 4B is a perspective view of an embodiment of a valve member and a spring, in accordance with embodiments of the present disclosure.

FIG. 4B is a perspective view of the valve member 306 including the spring 310 positioned within the spring recess 308. The illustrated valve member 306 includes the top portion 322 and the bottom portion 324 (not visible due to the sealing element 326) which further includes legs 328 extending from the bottom portion 324. In this example, the top portion 322 may correspond to the region axially higher than the seal 326 along the axis 330.

The spring recess 308 is shown extending into the top portion 322 along the axis 330 such that the recess base 332 is axially lower than the top surface 334 of the top portion 322. That is, the recess base 332 is axially closer to the seal 326 than the top surface 334. The recess base 332 is also axially closer to the seal 326 than a boss surface 404, which in this configuration, is substantially flush with the top surface 334. The recess 308 includes the continuous wall 336 (e.g., continuous outer wall) that has the edge 338 (e.g., the rounded edge) and an inner continuous wall 406 formed by the boss 402. As a result, the recess 308 has both the outer diameter 340 (e.g., recess diameter) and an inner diameter 408 to effectively form a cylinder-shaped cutout or void into the top surface 334. As shown, the outer diameter 340 is greater than the inner diameter 408. In this example, the outer diameter 340 is less than the top portion diameter 342. It should be appreciated that the outer diameter 340 may be particularly selected based, at least in part, on one or more spring characteristics. For example, the outer diameter 340 may correspond to approximately a spring resting diameter. In this example, the spring base 316 is positioned within the recess 308 such that the space 344 is shown between the wall 336 and the spring base 316, and moreover, such that an inner space 410 is shown between the spring base 316 and the inner wall 406. As such, at least some radial expansion (e.g., movement outward) and/or radial compression (e.g., movement inward) of the spring base 316 may be permitted. It should be appreciated that adjustments to the outer diameter 340 may control or otherwise limit a permitted expansion. Moreover, the spaces 344, 410 may allow for easier installation by providing some give or degrees of freedom during installation while still restricting movement of the spring base 316 in operation. Furthermore, as noted above, it should be appreciated that the illustrated example is in a non-compressed position and that, at installation, the spring 310 is compressed by the retainer 312. Accordingly, the spaces 344, 410 may be sized such that the spring base 316 expands upon installation and may reduce a size of or eliminate the spaces 344, 410 upon installation. Compression of the spring 310 may drive one or more coils into the recess 308, but it should be appreciated that the recess 308 may be sized to receive a reasonable number of coils. In at least one embodiment, the spring recess 308 is centered along the axis 330, but in one or more embodiments, the spring recess 308 may be positioned at a different location or there may be multiple recesses 308 in embodiments where there are multiple springs.

Figure 4C:
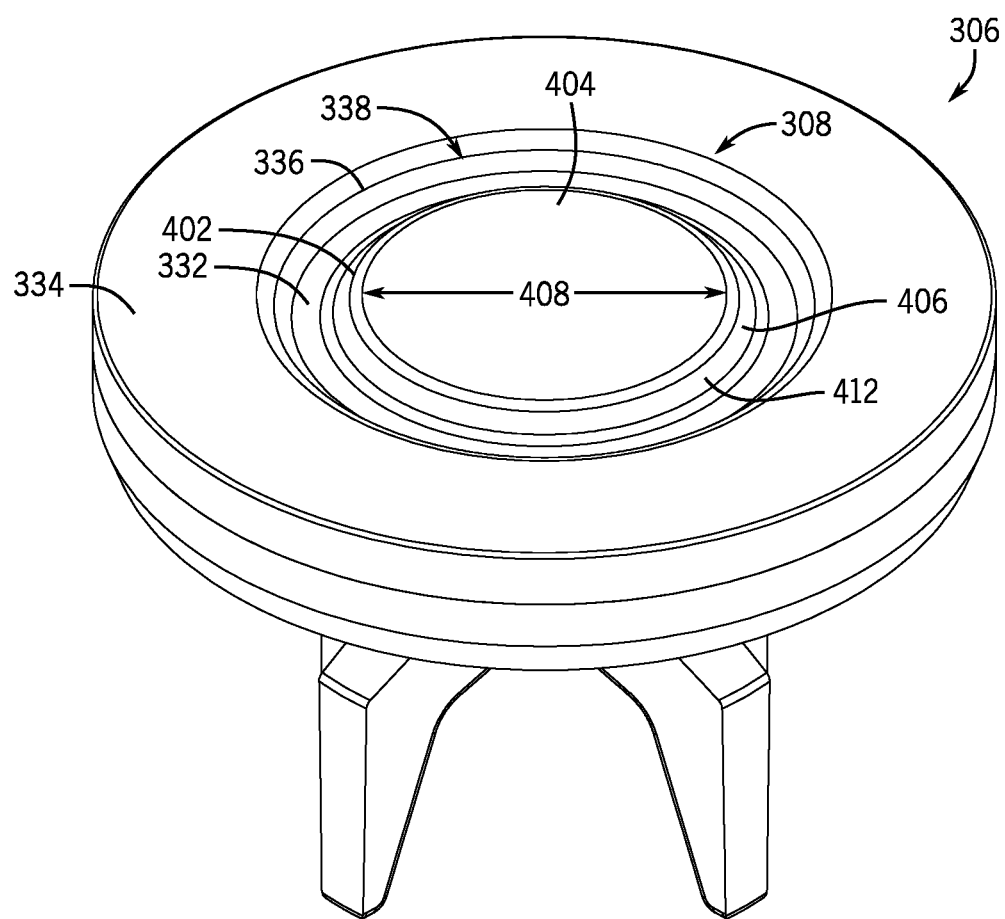
FIG. 4C is a perspective view of an embodiment of a valve member, in accordance with embodiments of the present disclosure.

FIG. 4C is a perspective view of an embodiment of the valve member 306 in which the spring 310 has been removed. This configuration illustrates the centered position of the spring recess 308, which as noted above may be changed based on expected operating conditions. Further illustrated is the outer continuous wall 336, the curved edge 338, and the inner wall 406 of the boss 402. The curved edge 338 is shown by way of example and may by a squared edge, a sloped edge, or any other reasonable geometry. Additionally, a similar curved edge 412, or just an edge with a variety of potential configurations, may be associated with the inner wall 406. Furthermore, the curved edges 338, 412 may be an overlap or an overhang such that, when compressed, the spring 310 may extend radially toward the walls 336, 406 in a position where the edges 338, 412 overhang the spring 310 (e.g., where axial movement of the spring 310 is blocked by one or more of the curved edges 338, 412). As shown, the recess base 332 may be a planar surface that is substantially parallel to the top surface 334. Similarly, the boss surface 404 may also be substantially planar and parallel to the top surface 334. In various embodiments, one or more features may be positioned to extend axially away from the recess base 332 and/or the boss surface 404.

In this configuration the boss 402 extends axially away from the recess base 332 and includes the boss surface 404, which is substantially planar and shown as being flush with the top surface 334. In various embodiments, the boss 402 may be used to center the spring 310. As shown, the boss 402 includes a boss diameter that corresponds to the inner diameter 408 of the recess 308, in that the boss 402 forms the inner diameter 408 via the wall 406. It should be appreciated that a boss height may be particularly selected and modified based on operating conditions and, in various embodiments, the boss height may extend axially above the top surface 334.

Figure 4D:
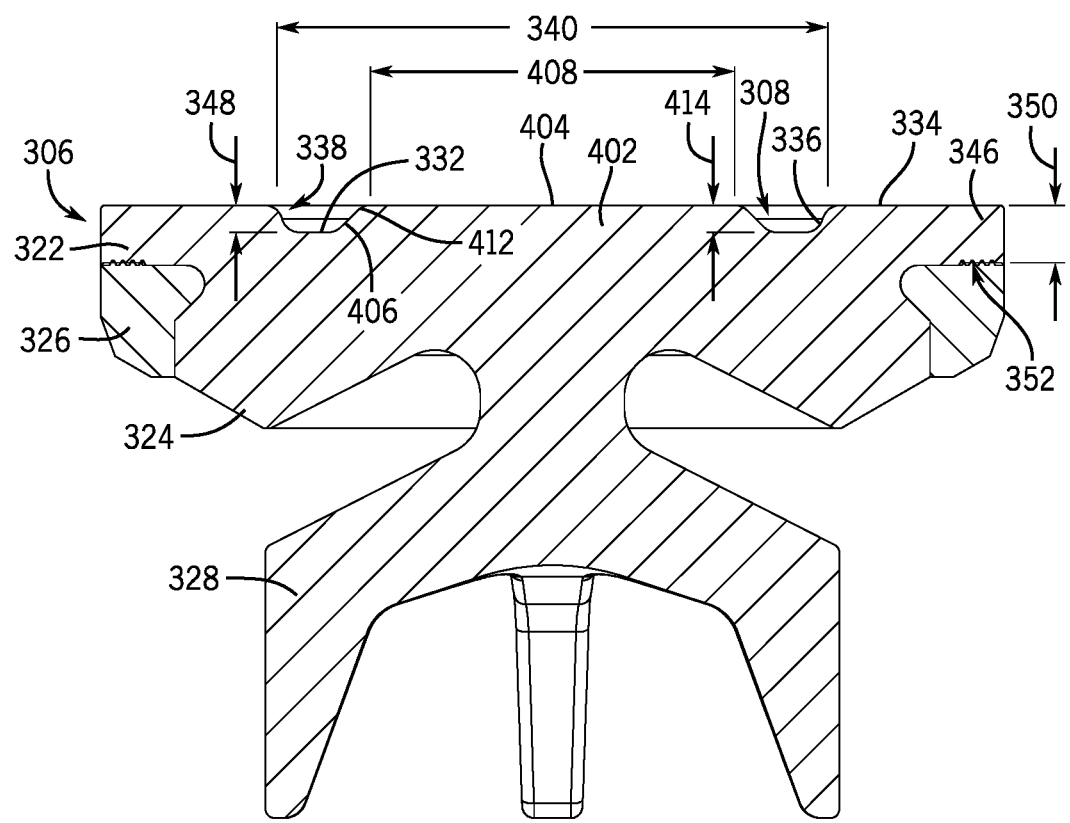
FIG. 4D is a cross-sectional view of an embodiment of a valve member, in accordance with embodiments of the present disclosure.

FIG. 4D is a cross-sectional view of an embodiment of the valve member 306 in which the spring 310 has been removed. This example shows the bottom portion 324 coupled to the top portion 322, which as noted above, may be represented by the area above the seal 326, such as the shoulder 346 positioned over the seal 326. In various embodiments, the top portion 322 may be a planar region extending across a bottom portion of the shoulder 346 at an interface between the seal 326 and the shoulder 346, but it should be appreciated that, in various embodiments, different portions may correspond to the top portion 322. The legs 328 are also illustrated coupled to the bottom portion 324.

The illustrated configuration shows the recess 308, which in this example may be referred to as a groove due to the position of the boss 402 forming the inner diameter 408 of the recess 308. That is, the illustrated recess 308 may correspond to a void or a removed portion that extends axially into the top portion 322. This example includes the wall 336 that extends circumferentially to form the recess 308 having the recess diameter 340 and the recess depth 348. Additionally, the inner wall 406 further defines the bounds of the recess such that an area in which the spring may be positioned is confined between the inner and outer diameters 408, 340. The recess depth 348 may correspond to a distance between the recess base 332 and the top surface 334 of the top portion 322 and/or the boss surface 404 in configurations where the boss surface 404 is flush with the top surface 334. The depth 348 may be approximately equal to a thickness of one coil of the spring, but it should be appreciated that other depths 348 may be used in various embodiments and the coil thickness may be one factor utilized to determine the depth 348. The wall 336 includes the curved edge 338, which as noted above may be a variety of different shapes, such as planar, slanted, or the like. Furthermore, the edge 338 may overhang over the recess 308 such that an edge diameter is less than a recess diameter 340. Similarly, the inner wall 406 may also have the curved edge 412 that may be different shapes and/or overhang over the recess base 332.

In at least one embodiment, a boss height 414 is substantially equal to the recess depth 348. However, it should be appreciated that the boss height 414 may be greater than or less than the recess depth 348. The boss height 414 may correspond to a distance between the recess base 332 and the boss surface 404. However, it should be appreciated that reference to the boss height 414 may be made with respect to the top surface 334, such regarding a difference in axial distance between the boss surface 404 and the top surface 334.

Further illustrated is the shoulder thickness 350, which may correspond to a distance between an interface 352 between the seal 326 and the top surface 334. It should be appreciated that various features may be included at the interface, such as teeth or the like to facilitate gripping the seal 326, and that the distance described above corresponds to a lowest point of the interface 352. In this example, the thickness 350 may be larger than a thickness of a corresponding valve member that does not include the recess 308. For example, in various embodiments, a top surface of a valve member, or features along the top surface, may act as a hard stop for valve member movement. For example, a traditional valve configuration may include a boss that extends from the top surface of the valve member, rather than from a recessed location. As a result, an axial height of the top portion may be limited or restricted. This axial height may be measured from a location where the spring contacts the valve member. Accordingly, the inclusion of the boss 402 may not affect the axial height of the top of the valve, and/or, may enable inclusion of a larger boss due to positioning of the boss 402 within the recess 308. By adding the depth 348 of the recess, which lowers the contact point of the spring, the thickness 350 may be increased, thereby providing additional support at the seal 326, which is the region that contacts the seat sealing surface 314 (FIG. 4A). Accordingly, heat dissipation from the seal 326 may be improved, thereby increasing the useful life of the seal 326. In this manner, a time may be extended between maintenance intervals due to the improved life of the spring and also the improved life of the seal 326. As a result, systems and methods of the present disclosure may reduce costs for pump operators and provide improved operations.

FIGS. 5A-5D illustrate embodiments of a valve assembly 500 that may be utilized to overcome one or more deficiencies of prior art valve assemblies. As will be described below, one or more embodiments may include a recess (e.g., a pocket, a groove, etc.) to receive at least a portion of a spring base to prevent the spring base from walking out. Furthermore, arrangements may provide for a thicker shoulder over a sealing element for improved heat dissipation, among other benefits. It should be appreciated that various features of the embodiments described herein may be incorporated with one another and are not limited to the arrangements shown. For example, the valve assembly 500 may include features described with other valve assemblies disclosed herein. It should be appreciated that certain like features are referred to with like numerals for convenience purposes and are not intended to limit the scope of the present disclosure.

Figure 5A:
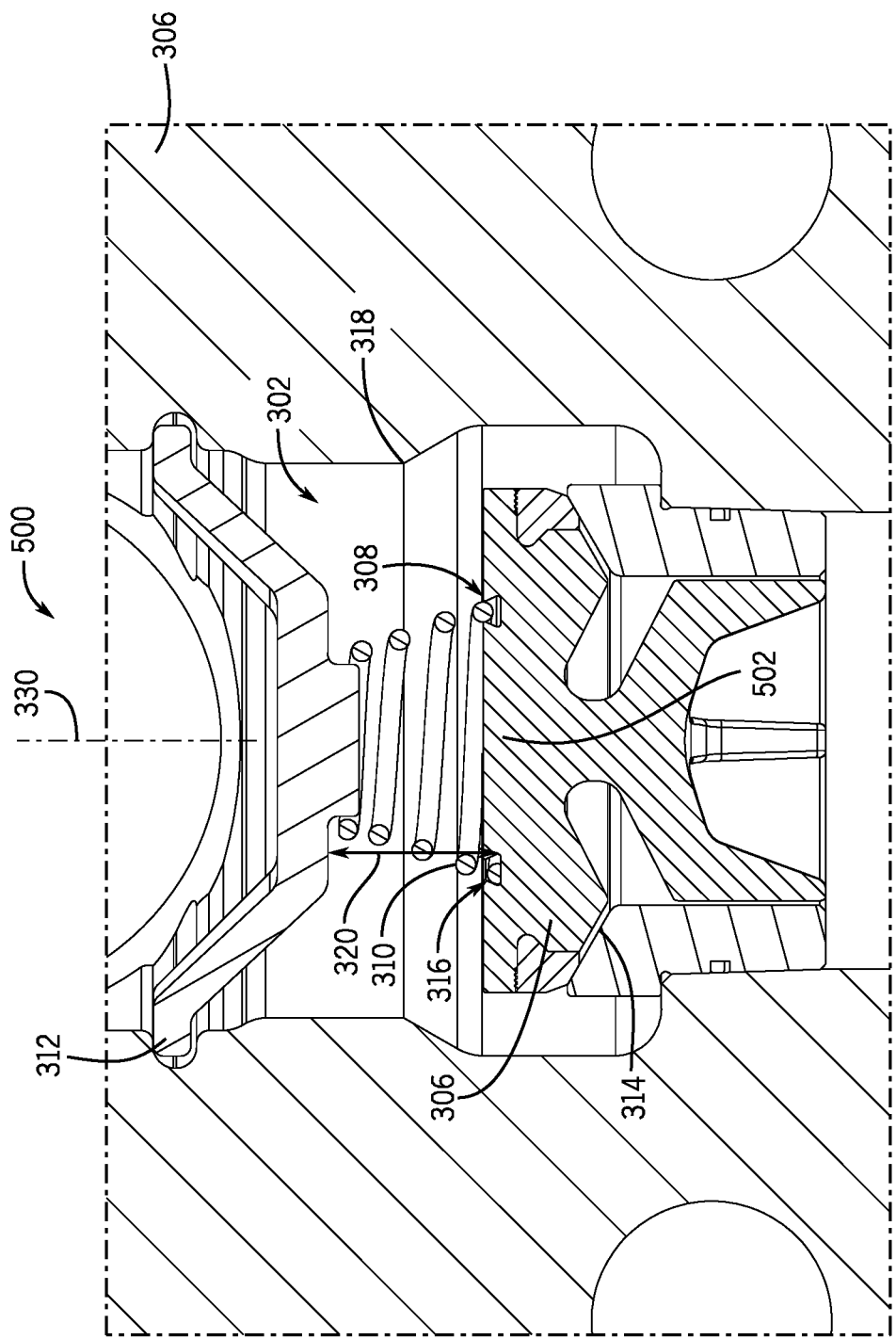
FIG. 5A is a cross-sectional view of an embodiment of a fluid end including a valve assembly, in accordance with embodiments of the present disclosure.

FIG. 5A is a cross-sectional view of a valve assembly 500 arranged within the bore 302 of the fluid end 304, which may share one or more features with the valve assemblies 122, 124, 200 and/or the fluid end 102. Moreover, various features of FIGS. 5A-5D may be common to FIGS. 3A-3D and 4A-4D. This example shows the valve assembly including the valve member 306 that has the spring recess 308, which in this example is a dovetail spring retaining groove. The illustrated embodiment includes the valve assembly 500 associated with a suction side of the fluid end 304, but it should be appreciated that various embodiments may also be used with different portions of the fluid end. Moreover, as noted with respect to FIGS. 3A and 4A, it should be appreciated that the spring 310 is show in an uncompressed state that is not representative of how it functions when installed. When the spring 310 is installed between the twist in retainer 312 and the valve member 306 the spring 310 has a residual crush force used to keep the valve member 306 in place and to keep the retainer 312 from rotating. As shown, the lowest coils sit in the spring recess 308 of the valve member 306 and are retained in place based upon the geometry of the spring recess 308. It should be appreciated, and will be described below, that a depth of the recess 308 may be particularly selected to accommodate one or more coils of the spring 310.

As noted above, as the fluid end 304 operates and the valve member 302 moves in and out of contact with the sealing surface 314, pressures may cause forces to act on the spring 310, where the compression of the spring 310 will drive the spring base 316 radially outward (e.g., toward walls 318 of the bore 302 to increase a base diameter of the spring 310). As the spring base 316 moves outward, or "walks out," a reduced closing force may be produced by the spring 310. For example, the spring height 320 may decrease, which may cause, as least in part, the reduced closing force. This is undesirable in that it may cause the valve member 306 to not fully close or to close at the wrong time. Embodiments of the present disclosure overcome this problem by utilizing the spring recess 308 to restrict radial movement of the spring 310 such that the base 316 cannot move radially outward toward the walls 318. In other words, the walking out of the spring base 316 may be blocked due to contact at the recess 308, which prevents further radial or outward movement of the spring base 316. In at least one embodiment, a base diameter may be known and, based on the springs 310 intended for different operations, a recess diameter may be particularly selected to permit at least some expansion and/or to block expansion entirely, based on the desired or expected operating conditions. Accordingly, spring life may be improved due to the reduced likelihood of a reduction in spring height due to radial movement of the spring base.

In this example, a solid region 502, which may be a boss, is shown within the spring recess 308 and extending in an axially upward direction along the axis 330. The solid region 502 may form an inner barrier with respect to the spring base 316 such that the spring base 316 is blocked from both radially inward movement and radially outward movement beyond certain predetermined positions. Additionally, in various embodiments, the solid region 502 may be used to center the spring 310 and/or as a handle during installation and removal. As noted above, in various embodiments, the solid region 502 may be considered a boss, such as the boss 402 in FIGS. 4A-4D. However, in certain embodiments, the solid region 502 may be an integrally formed portion of the top portion 322 and the recess 308 may be machined out of the top portion 322, thereby leaving the recess 308.

Figure 5B:
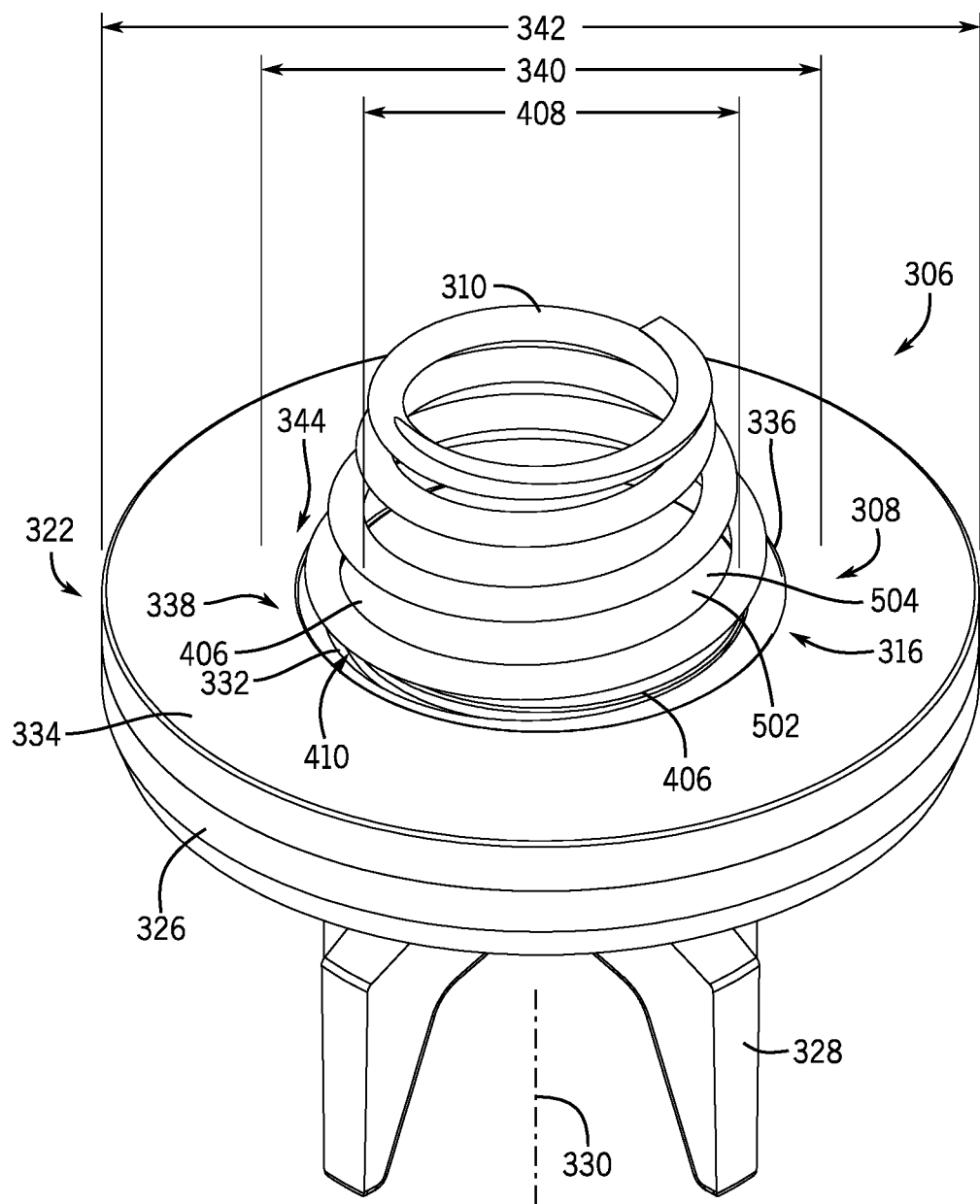
FIG. 5B is a perspective view of an embodiment of a valve member and a spring, in accordance with embodiments of the present disclosure.

FIG. 5B is a perspective view of the valve member 306 including the spring 310 positioned within the spring recess 308. The illustrated valve member 306 includes the top portion 322 and the bottom portion 324 (not visible due to the sealing element 326) which further includes legs 328 extending from the bottom portion 324. In this example, the top portion 322 may correspond to the region axially higher than the seal 326 along the axis 330.

The spring recess 308 is shown extending into the top portion 322 along the axis 330 such that the recess base 332 is axially lower than the top surface 334 of the top portion 322. That is, the recess base 332 is axially closer to the seal 326 than the top surface 334. The recess base 332 is also axially closer to the seal 326 than a region surface 504, which in this configuration, is substantially flush with the top surface 334. As noted above, because the recess 308 may be machined into the top surface 334, the surfaces 334, 504 may be substantially level. The recess 308 includes the continuous wall 336 (e.g., continuous outer wall) that has the round edge 338 and the inner continuous wall 406 formed by the solid region 502. As a result, the recess 308 has both the outer diameter 340 (e.g., recess diameter) and the inner diameter 408 to effectively form a cylinder-shaped cutout or void into the top surface 334. As shown, the outer diameter 340 is greater than the inner diameter 408. In this example, the outer diameter 340 is less than the top portion diameter 342. It should be appreciated that the outer diameter 340 may be particularly selected based, at least in part, on one or more spring characteristics. For example, the outer diameter 340 may correspond to approximately a spring resting diameter. In this example, the spring base 316 is positioned within the recess 308 such that the space 344 is shown between the wall 336 and the spring base 316, and moreover, such that the inner space 410 is shown between the spring base 316 and the inner wall 406. As such, at least some radial expansion (e.g., movement outward) and/or radial compression (e.g., movement inward) of the spring base 316 may be permitted. It should be appreciated that adjustments to the outer diameter 340 may control or otherwise limit a permitted expansion. Moreover, the spaces 344, 410 may allow for easier installation by providing some give or degrees of freedom during installation while still restricting movement of the spring base 316 in operation. Furthermore, as noted above, it should be appreciated that the illustrated example is in a non-compressed position and that, at installation, the spring 310 is compressed by the retainer 312. Accordingly, the spaces 344, 410 may be sized such that the spring base 316 expands upon installation and may reduce a size of or eliminate the spaces 344, 410 upon installation. Compression of the spring 310 may drive one or more coils into the recess 308, but it should be appreciated that the recess 308 may be sized to receive a reasonable number of coils. In at least one embodiment, the spring recess 308 is centered along the axis 330, but in one or more embodiments, the spring recess 308 may be positioned at a different location or there may be multiple recesses 308 in embodiments where there are multiple springs.

Figure 5C:
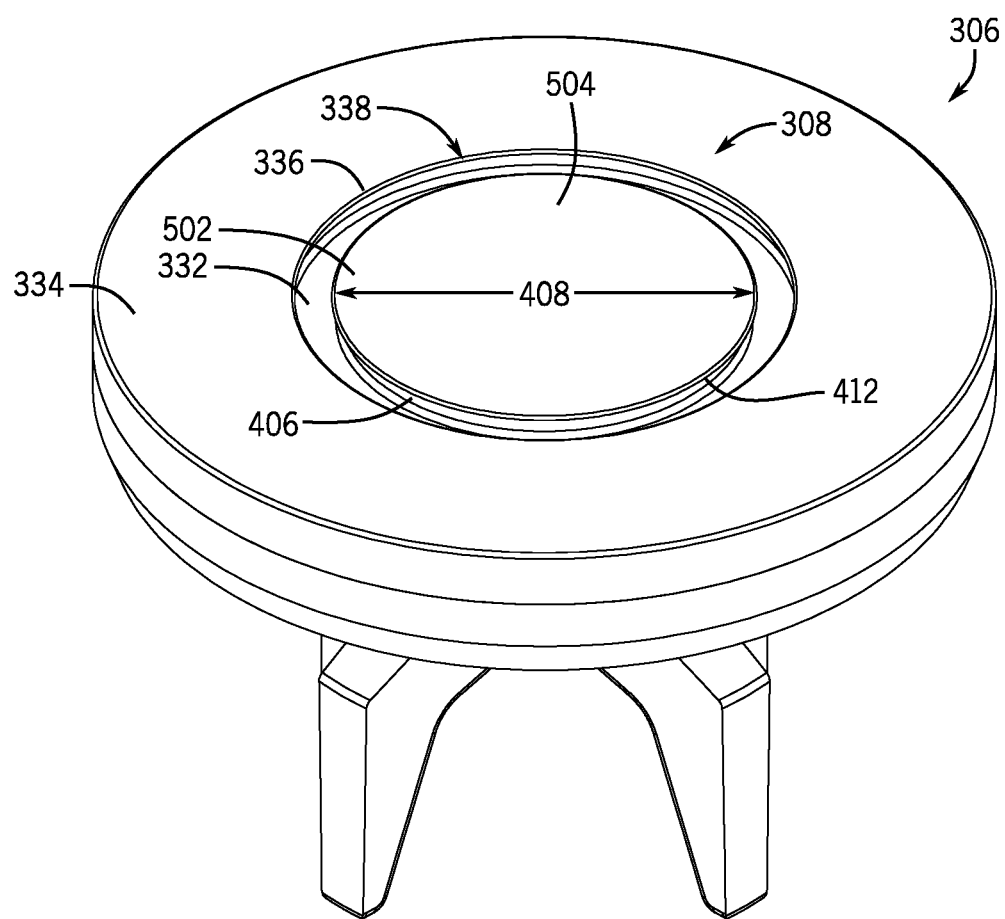
FIG. 5C is a perspective view of an embodiment of a valve member, in accordance with embodiments of the present disclosure.

FIG. 5C is a perspective view of an embodiment of the valve member 306 in which the spring 310 has been removed. This configuration illustrates the centered position of the spring recess 308, which as noted above may be changed based on expected operating conditions. Further illustrated is the outer continuous wall 336, the curved edge 338, and the inner wall 406 of the solid region 502. The curved edge 338 is shown by way of example and may by a squared edge, a sloped edge, or any other reasonable geometry. Moreover, only a portion of the edge 338 may be curved, such as a lip or a transition portion. Additionally, the edge 412 may be associated with the inner wall 406, which may also be curved, sloped, squared, or the like. Furthermore, the edges 338, 412 may be an overlap or an overhang such that, when compressed, the spring 310 may extend radially toward the walls 336, 406 in a position where the edges 338, 412 overhang the spring 310 (e.g., where axial movement of the spring 310 is blocked by one or more of the curved edges 338, 412). As shown, the recess base 332 may be a planar surface that is substantially parallel to the top surface 334 and to the region surface 504.

In this configuration the region 502 extends axially away from the recess base 332 and includes the surface 504, which is substantially planar and shown as being flush with the top surface 334. In various embodiments, the region 502 may be used to center the spring 310. As shown, the region 502 includes a region diameter that corresponds to the inner diameter 408 of the recess 308, in that the region 502 forms the inner diameter 408 via the wall 406.

Figure 5D:
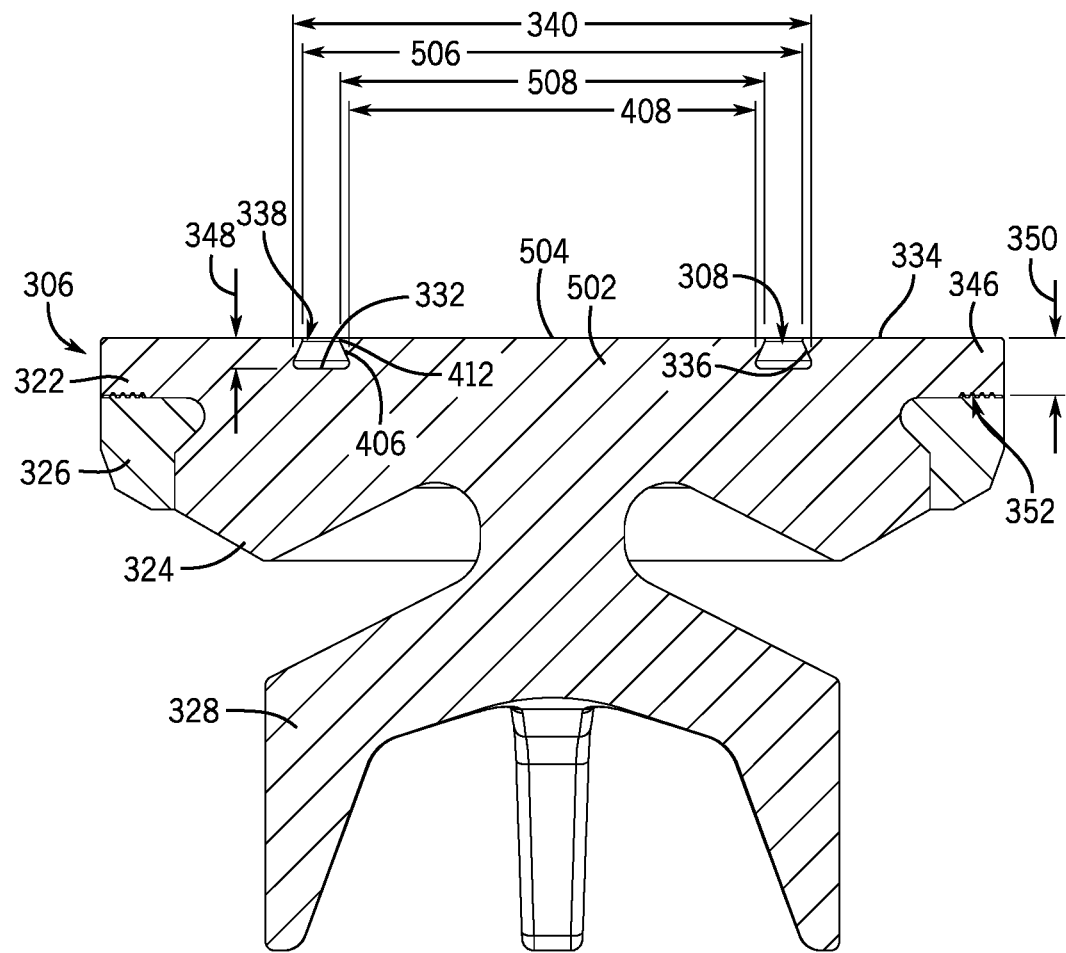
FIG. 5D is a cross-sectional view of an embodiment of a valve member, in accordance with embodiments of the present disclosure.

FIG. 5D is a cross-sectional view of an embodiment of the valve member 306 in which the spring 310 has been removed. This example shows the bottom portion 324 coupled to the top portion 322, which as noted above, may be represented by the area above the seal 326, such as the shoulder 346 positioned over the seal 326. In various embodiments, the top portion 322 may be a planar region extending across a bottom portion of the shoulder 346 at an interface between the seal 326 and the shoulder 346, but it should be appreciated that, in various embodiments, different portions may correspond to the top portion 322. The legs 328 are also illustrated coupled to the bottom portion 324.

The illustrated configuration shows the recess 308, which in this example may be referred to as a dovetail groove to its cross-sectional appearance. The illustrated recess 308 may correspond to a void or a removed portion that extends axially into the top portion 322. This example includes the wall 336 that extends circumferentially to form the recess 308 having the recess diameter 340 and the recess depth 348. Additionally, the inner wall 406 further defines the bounds of the recess 308 such that an area in which the spring may be positioned is confined between the inner and outer diameters 406, 340. The recess depth 348 may correspond to a distance between the recess base 332 and the top surface 334 of the top portion 322 and/or the region surface 504 in configurations where the region surface 504 is flush with the top surface 334. The depth 348 may be approximately equal to a thickness of one coil of the spring, but it should be appreciated that other depths 348 may be used in various embodiments and the coil thickness may be one factor utilized to determine the depth 348. The wall 336 includes the curved edge 338, which as noted above may be a variety of different shapes, such as planar, slanted, or the like. Furthermore, the edge 338 may overhang over the recess 308, as shown by the dovetail cross-section, such that an edge diameter 506 is less than the recess diameter 340. Similarly, the inner wall 406 may also have the edge 412 that may be different shapes and/or overhang over the recess base 332, as shown by the dovetail cross-section, such that an inner edge diameter 508 is greater than the inner diameter 408.

Further illustrated is the shoulder thickness 350, which may correspond to a distance between an interface 352 between the seal 326 and the top surface 334. It should be appreciated that various features may be included at the interface, such as teeth or the like to facilitate gripping the seal 326, and that the distance described above corresponds to a lowest point of the interface 352. In this example, the thickness 350 may be larger than a thickness of a corresponding valve member that does not include the recess 308. For example, in various embodiments, a top surface of a valve member, or features along the top surface, may act as a hard stop for valve member movement. For example, a traditional valve configuration may include a boss that extends from the top surface of the valve member, rather than from a recessed location. As a result, an axial height of the top portion may be limited or restricted. This axial height may be measured from a location where the spring contacts the valve member. By adding the depth 348 of the recess, which lowers the contact point of the spring, the thickness 350 may be increased, thereby providing additional support at the seal 326, which is the region that contacts the seat sealing surface 314 (FIG. 5A). Accordingly, heat dissipation from the seal 326 may be improved, thereby increasing the useful life of the seal 326. In this manner, a time may be extended between maintenance intervals due to the improved life of the spring and also the improved life of the seal 326. As a result, systems and methods of the present disclosure may reduce costs for pump operators and provide improved operations.

FIGS. 6A-6D illustrate embodiments of a valve assembly 600 that may be utilized to overcome one or more deficiencies of prior art valve assemblies. As will be described below, one or more embodiments may include a recess (e.g., a pocket, a groove, etc.) to receive at least a portion of a spring base to prevent the spring base from walking out. Furthermore, arrangements may provide for a thicker shoulder over a sealing element for improved heat dissipation, among other benefits. It should be appreciated that various features of the embodiments described herein may be incorporated with one another and are not limited to the arrangements shown. For example, the valve assembly 600 may include features described with other valve assemblies disclosed herein. It should be appreciated that certain like features are referred to with like numerals for convenience purposes and are not intended to limit the scope of the present disclosure.

Figure 6A:
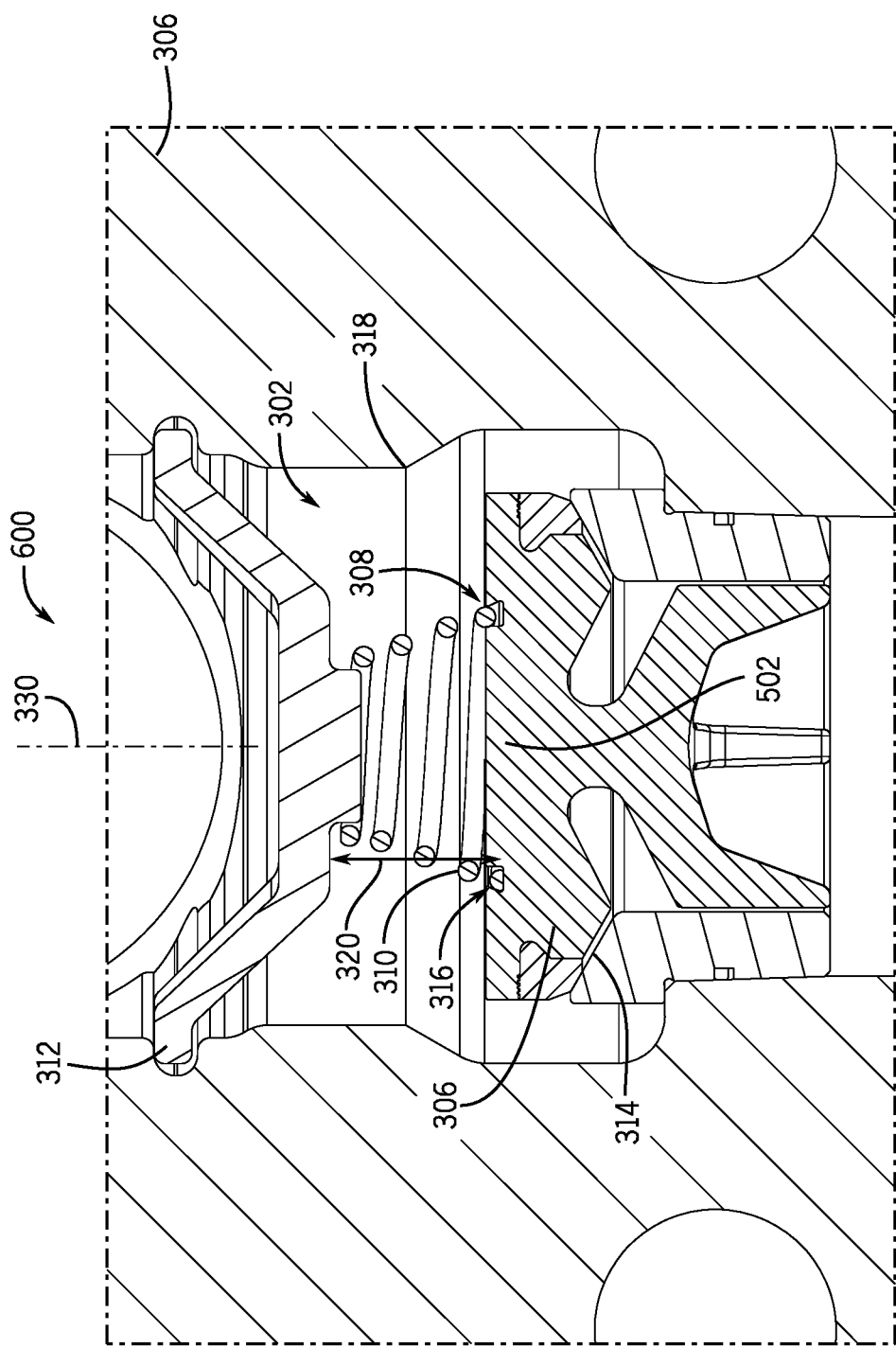
FIG. 6A is a cross-sectional view of an embodiment of a fluid end including a valve assembly, in accordance with embodiments of the present disclosure.

FIG. 6A is a cross-sectional view of the valve assembly 600 arranged within the bore 302 of the fluid end 304, which may share one or more features with the valve assemblies 122, 124, 200 and/or the fluid end 102. Moreover, various portions of FIGS. 6A-6D may share one or more components with FIGS. 3A-3D, 4A-4D, and 5A-5D. This example shows the valve assembly including the valve member 306 that has the spring recess 308, which in this example is a half dovetail spring retaining groove. The dovetail is shown along the outer edge of the groove. The illustrated embodiment includes the valve assembly 600 associated with a suction side of the fluid end 304, but it should be appreciated that various embodiments may also be used with different portions of the fluid end. Moreover, as noted with respect to FIGS. 3A, 4A, and 5A, it should be appreciated that a spring 310 is show in an uncompressed state that is not representative of how it functions when installed. When the spring 310 is installed between the twist in retainer 312 and the valve member 306 the spring 310 has a residual crush force used to keep the valve member 306 in place and to keep the retainer 312 from rotating. As shown, the lowest coils sit in the spring recess 308 of the valve member 306 and are retained in place based upon the geometry of the spring recess 308. It should be appreciated, and will be described below, that a depth of the recess 308 may be particularly selected to accommodate one or more coils of the spring 310.

As noted above, as the fluid end 304 operates and the valve member 302 moves in and out of contact with the sealing surface 314, pressures may cause forces to act on the spring 310, where the compression of the spring 310 will drive the spring base 316 radially outward (e.g., toward walls 318 of the bore 302 to increase a base diameter of the spring 310). As the spring base 316 moves outward, or "walks out," a reduced closing force may be produced by the spring 310. For example, the spring height 320 may decrease, which may cause, as least in part, the reduced closing force. This is undesirable in that it may cause the valve member 306 to not fully close or to close at the wrong time. Embodiments of the present disclosure overcome this problem by utilizing the spring recess 308 to restrict radial movement of the spring 310 such that the base 316 cannot move radially outward toward the walls 318. In other words, the walking out of the spring base 316 may be blocked due to contact at the recess 308, which prevents further radial or outward movement of the spring base 316. In at least one embodiment, a base diameter may be known and, based on the springs 310 intended for different operations, a recess diameter may be particularly selected to permit at least some expansion and/or to block expansion entirely, based on the desired or expected operating conditions. Accordingly, spring life may be improved due to the reduced likelihood of a reduction in spring height due to radial movement of the spring base.

In this example, a solid region 502, which may be a boss, is shown within the spring recess 308 and extending in an axially upward direction along the axis 330. The solid region 502 may form an inner barrier with respect to the spring base 316 such that the spring base 316 is blocked from both radially inward movement and radially outward movement beyond certain predetermined positions. Additionally, in various embodiments, the solid region 502 may be used to center the spring 310 and/or as a handle during installation and removal. As noted above, in various embodiments, the solid region 502 may be considered a boss, such as the boss 400 in FIGS. 4A-4D. However, in certain embodiments, the solid region 502 may be an integrally formed portion of the top portion 322 and the recess 308 may be machined out of the top portion 322, thereby leaving the recess 308, such as with respect to FIGS. 5A-5D.

Figure 6B:
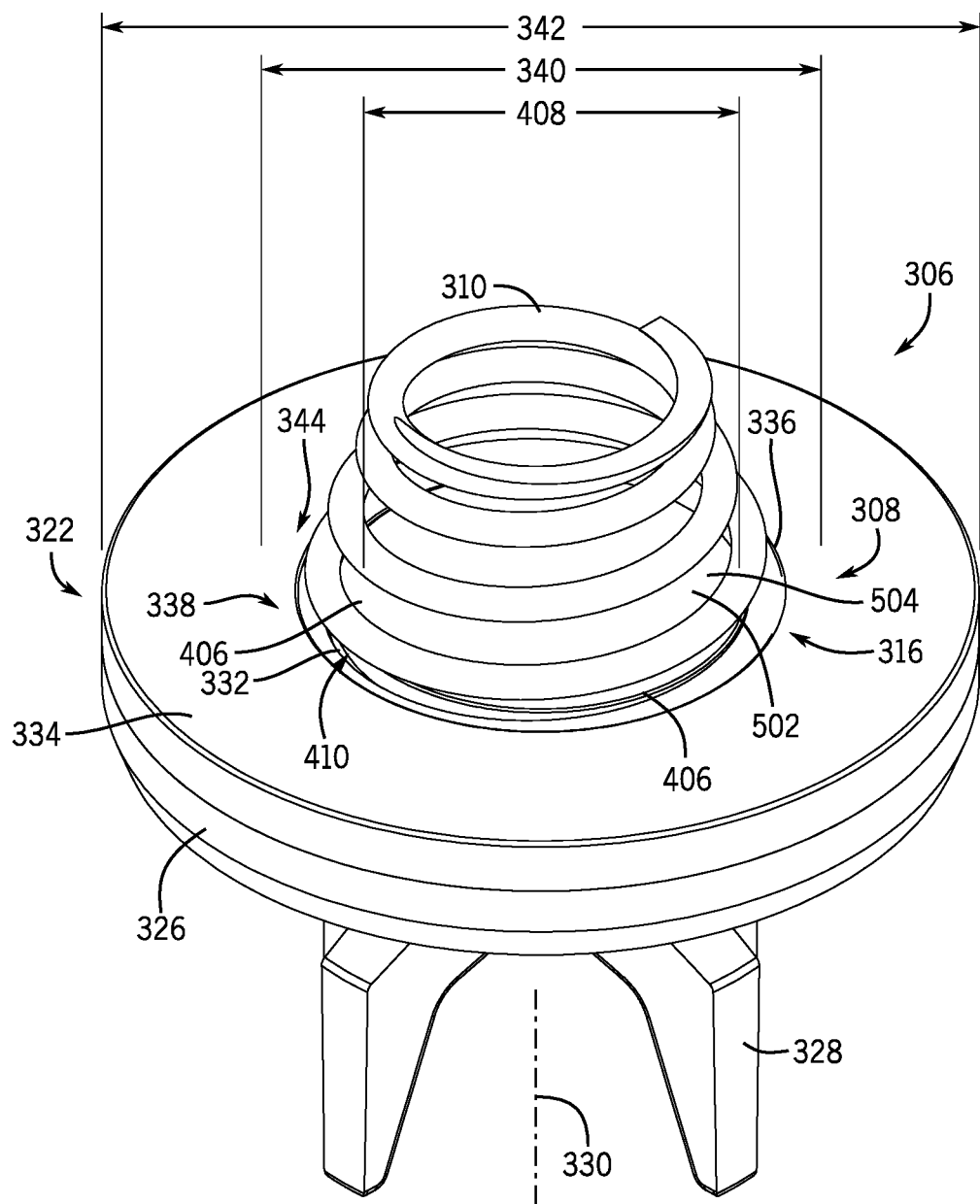
FIG. 6B is a perspective view of an embodiment of a valve member and a spring, in accordance with embodiments of the present disclosure.

FIG. 6B is a perspective view of the valve member 306 including the spring 310 positioned within the spring recess 308. The illustrated valve member 306 includes the top portion 322 and the bottom portion 324 (not visible due to the sealing element 326) which further includes legs 328 extending from the bottom portion 324. In this example, the top portion 322 may correspond to the region axially higher than the valve seal 326 along the axis 330.

The spring recess 308 is shown extending into the top portion 322 along the axis 330 such that the recess base 332 is axially lower than the top surface 334 of the top portion 322. That is, the recess base 332 is axially closer to the seal 326 than the top surface 334. The recess base 332 is also axially closer to the seal 326 than the region surface 504, which in this configuration, is substantially flush with the top surface 334. As noted above, because the recess 308 may be machined into the top surface 334, the surfaces 334, 504 may be substantially level. The recess 308 includes the continuous wall 336 (e.g., continuous outer wall) that has the round edge 338 and the inner continuous wall 406 formed by the solid region 502. As a result, the recess 308 has both the outer diameter 340 (e.g., recess diameter) and the inner diameter 408 to effectively form a cylinder-shaped cutout or void into the top surface 334. As shown, the outer diameter 340 is greater than the inner diameter 408. In this example, the outer diameter 340 is less than the top portion diameter 342. It should be appreciated that the outer diameter 340 may be particularly selected based, at least in part, on one or more spring characteristics. For example, the outer diameter 340 may correspond to approximately a spring resting diameter. In this example, the spring base 316 is positioned within the recess 308 such that the space 344 is shown between the wall 336 and the spring base 316, and moreover, such that the inner space 410 is shown between the spring base 316 and the inner wall 406. As such, at least some radial expansion (e.g., movement outward) and/or radial compression (e.g., movement inward) of the spring base 316 may be permitted. It should be appreciated that adjustments to the outer diameter 340 may control or otherwise limit a permitted expansion. Moreover, the spaces 344, 410 may allow for easier installation by providing some give or degrees of freedom during installation while still restricting movement of the spring base 316 in operation. Furthermore, as noted above, it should be appreciated that the illustrated example is in a non-compressed position and that, at installation, the spring 310 is compressed by the retainer 312. Accordingly, the spaces 344, 410 may be sized such that the spring base 316 expands upon installation and may reduce a size of or eliminate the spaces 344, 410 upon installation. Compression of the spring 310 may drive one or more coils into the recess 308, but it should be appreciated that the recess 308 may be sized to receive a reasonable number of coils. In at least one embodiment, the spring recess 308 is centered along the axis 330, but in one or more embodiments, the spring recess 308 may be positioned at a different location or there may be multiple recesses 308 in embodiments where there are multiple springs.

Figure 6C:
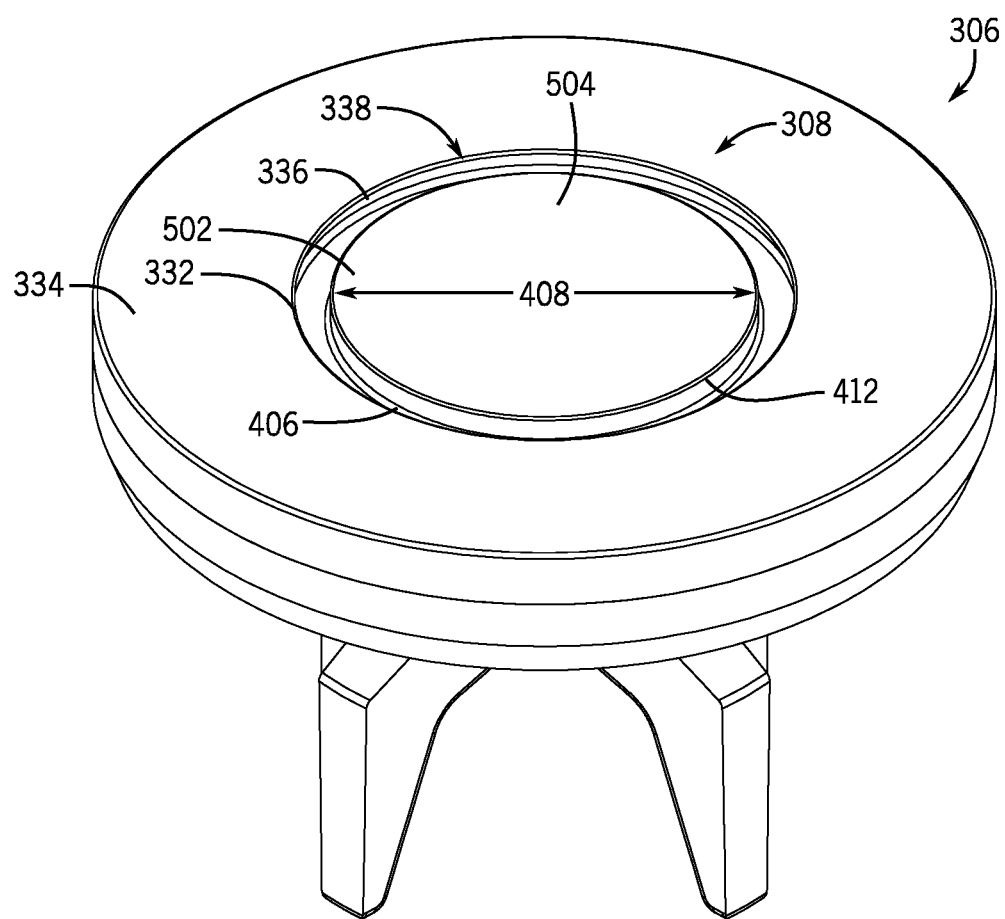
FIG. 6C is a perspective view of an embodiment of a valve member, in accordance with embodiments of the present disclosure.

FIG. 6C is a perspective view of an embodiment of the valve member 306 in which the spring 310 has been removed. This configuration illustrates the centered position of the spring recess 308, which as noted above may be changed based on expected operating conditions. Further illustrated is the outer continuous wall 336, the curved edge 338, and the inner wall 406 of the solid region 502. The curved edge 338 is shown by way of example and may by a squared edge, a sloped edge, or any other reasonable geometry. Moreover, only a portion of the edge 338 may be curved, such as a lip or a transition portion. Additionally, a similar edge 412 may be associated with the inner wall 406, where the edge 412 may also be curved, squared sloped, or any other reasonable geometry. Furthermore, the edges 338, 412 may be an overlap or an overhang such that, when compressed, the spring 310 may extend radially toward the walls 336, 406 in a position where the edges 338, 412 overhang the spring 310 (e.g., where axial movement of the spring 310 is blocked by one or more of the curved edges 338, 412), such as the half dovetail configuration shown in FIG. 6D. As shown, the recess base 332 may be a planar surface that is substantially parallel to the top surface 334 and to the region surface 504.

In this configuration the region 502 extends axially away from the recess base 332 and includes the surface 504, which is substantially planar and shown as being flush with the top surface 334. In various embodiments, the region 502 may be used to center the spring 310. As shown, the region 502 includes a region diameter that corresponds to the inner diameter 408 of the recess 308, in that the region 502 forms the inner diameter 408 via the wall 406.

Figure 6D:
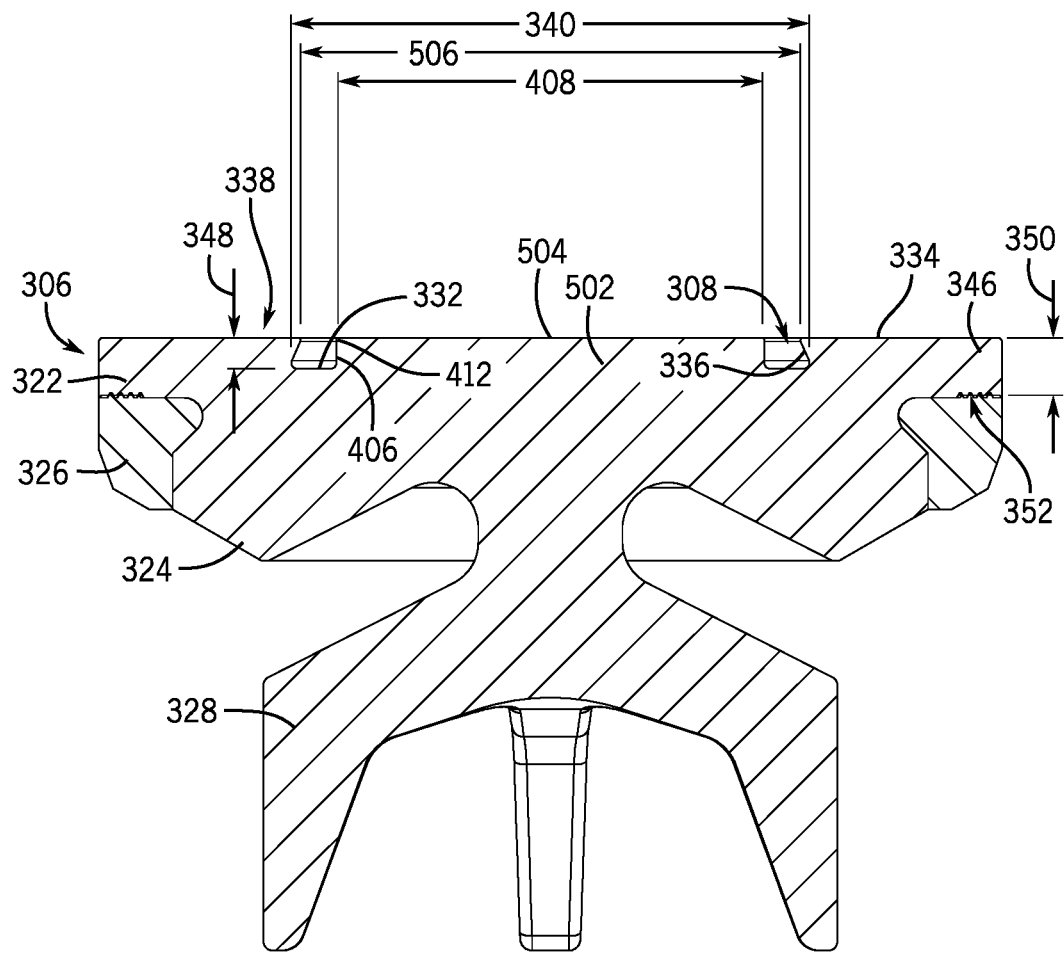
FIG. 6D is a cross-sectional view of an embodiment of a valve member, in accordance with embodiments of the present disclosure.

FIG. 6D is a cross-sectional view of an embodiment of the valve member 306 in which the spring 310 has been removed. This example shows the bottom portion 324 coupled to the top portion 322, which as noted above, may be represented by the area above the seal 326, such as the shoulder 346 positioned over the seal 326. In various embodiments, the top portion 322 may be a planar region extending across a bottom portion of the shoulder 346 at an interface between the seal 326 and the shoulder 346, but it should be appreciated that, in various embodiments, different portions may correspond to the top portion 322. The legs 328 are also illustrated coupled to the bottom portion 324.

The illustrated configuration shows the recess 308, which in this example may be referred to as a half dovetail groove due to its cross-sectional appearance. The dovetailed half is shown along the outer diameter of the recess 308, but it should be appreciated that the inner diameter may include the dovetailed portion. The illustrated recess 308 may correspond to a void or a removed portion that extends axially into the top portion 322. This example includes the wall 336 that extends circumferentially to form the recess 308 having the recess diameter 340 and the recess depth 348. Additionally, the inner wall 406 further defines the bounds of the recess such that an area in which the spring may be positioned is confined between the inner and outer diameters 408, 340. The recess depth 348 may correspond to a distance between the recess base 332 and the top surface 334 of the top portion 322 and/or the region surface 504 in configurations where the region surface 504 is flush with the top surface 334. The depth 348 may be approximately equal to a thickness of one coil of the spring, but it should be appreciated that other depths 348 may be used in various embodiments and the coil thickness may be one factor utilized to determine the depth 348. The wall 336 includes the curved edge 338, which as noted above may be a variety of different shapes, such as planar, slanted, or the like. Furthermore, the edge 338 may overhang over the recess 308, as shown by the half dovetail appearance, such that the edge diameter 506 is less than the recess diameter 340. In this configuration, the inner wall 406 is substantially planar/vertical, and as a result, the inner diameter 408 is shown as being consistent along the inner wall 406.

Further illustrated is the shoulder thickness 350, which may correspond to a distance between an interface 352 between the seal 326 and the top surface 334. It should be appreciated that various features may be included at the interface, such as teeth or the like to facilitate gripping the seal 326, and that the distance described above corresponds to a lowest point of the interface 352. In this example, the thickness 350 may be larger than a thickness of a corresponding valve member that does not include the recess 308. For example, in various embodiments, a top surface of a valve member, or features along the top surface, may act as a hard stop for valve member movement. For example, a traditional valve configuration may include a boss that extends from the top surface of the valve member, rather than from a recessed location. As a result, an axial height of the top portion may be limited or restricted. This axial height may be measured from a location where the spring contacts the valve member. By adding the depth 348 of the recess, which lowers the contact point of the spring, the thickness 350 may be increased, thereby providing additional support at the seal 326, which is the region that contacts the seat sealing surface 314 (FIG. 6A). Accordingly, heat dissipation from the seal 326 may be improved, thereby increasing the useful life of the seal 326. In this manner, a time may be extended between maintenance intervals due to the improved life of the spring and also the improved life of the seal 326. As a result, systems and methods of the present disclosure may reduce costs for pump operators and provide improved operations.

FIGS. 7A-7D illustrate embodiments of a valve assembly 700 that may be utilized to overcome one or more deficiencies of prior art valve assemblies. As will be described below, one or more embodiments may include a recess (e.g., a pocket, a groove, etc.) to receive at least a portion of a spring base to prevent the spring base from walking out. Furthermore, arrangements may provide for a thicker shoulder over a sealing element for improved heat dissipation, among other benefits. It should be appreciated that various features of the embodiments described herein may be incorporated with one another and are not limited to the arrangements shown. For example, the valve assembly 700 may include features described with other valve assemblies disclosed herein. It should be appreciated that certain like features are referred to with like numerals for convenience purposes and are not intended to limit the scope of the present disclosure.

Figure 7A:
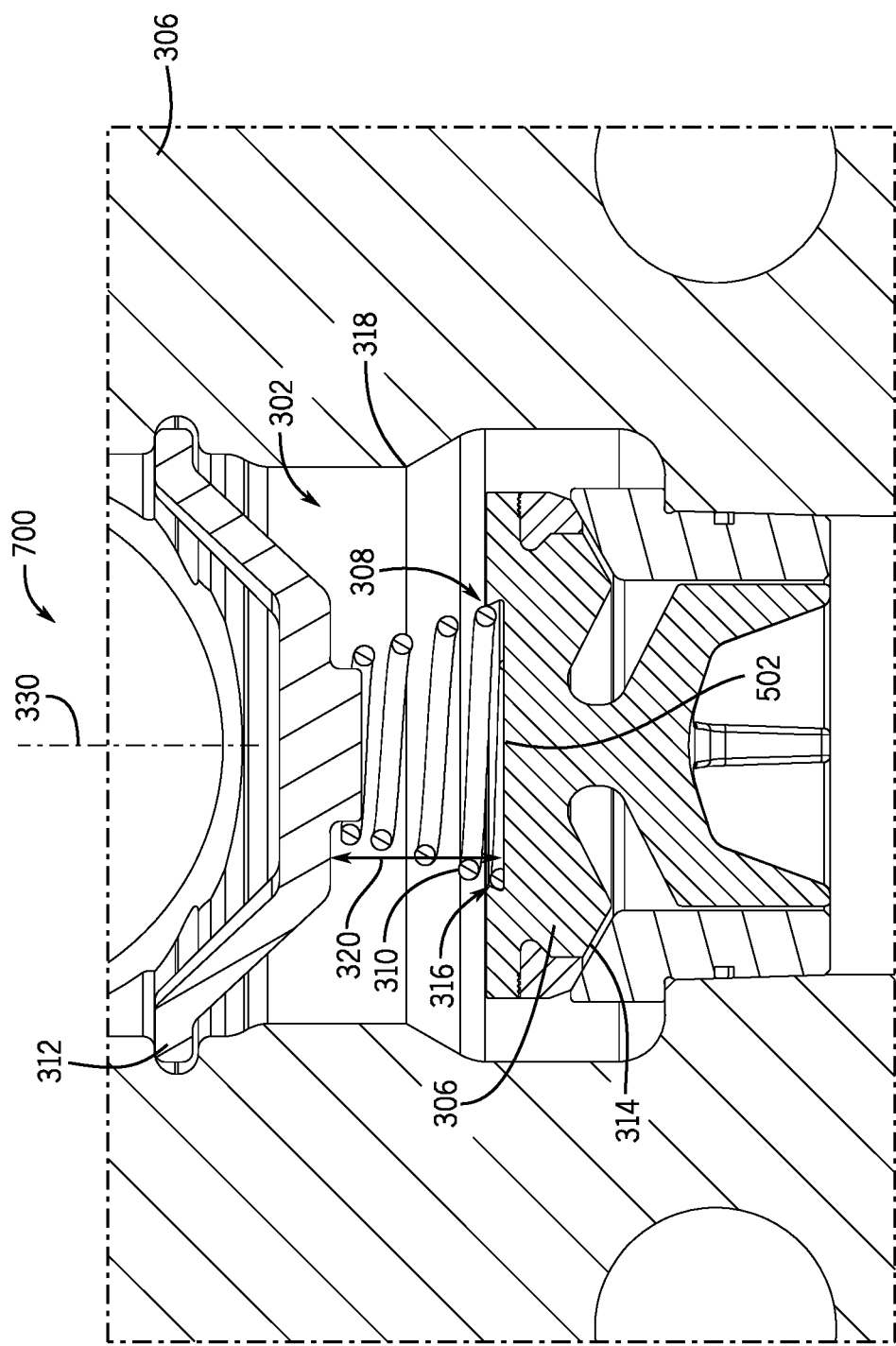
FIG. 7A is a cross-sectional view of an embodiment of a fluid end including a valve assembly, in accordance with embodiments of the present disclosure.

FIG. 7A is a cross-sectional view of the valve assembly 700 arranged within the bore 302 of the fluid end 304, which may share one or more features with the valve assemblies 122, 124, 200 and/or the fluid end 102. Moreover, various portions of FIGS. 7A-7D may share one or more components with FIGS. 3A-3D, 4A-4D, 5A-5D, and 6A-6D. This example shows the valve assembly including the valve member 306 that has the spring recess 308, which in this example is a half dovetail spring retaining pocket. The dovetail is shown along the outer edge of the pocket. The illustrated embodiment includes the valve assembly 700 associated with a suction side of the fluid end 304, but it should be appreciated that various embodiments may also be used with different portions of the fluid end. Moreover, as noted with respect to FIGS. 3A, 4A, 5A, and 6A, it should be appreciated that the spring 310 is show in an uncompressed state that is not representative of how it functions when installed. When the spring 310 is installed between the twist in retainer 312 and the valve member 306 the spring 310 has a residual crush force used to keep the valve member 306 in place and to keep the retainer 312 from rotating. As shown, the lowest coils sit in the spring recess 308 of the valve member 306 and are retained in place based upon the geometry of the spring recess 308. It should be appreciated, and will be described below, that a depth of the recess 308 may be particularly selected to accommodate one or more coils of the spring 310.

As noted above, as the fluid end 304 operates and the valve member 302 moves in and out of contact with the sealing surface 314, pressures may cause forces to act on the spring 310, where the compression of the spring 310 will drive the spring base 316 radially outward (e.g., toward walls 318 of the bore 302 to increase a base diameter of the spring 310). As the spring base 316 moves outward, or "walks out," a reduced closing force may be produced by the spring 310. For example, the spring height 320 may decrease, which may cause, as least in part, the reduced closing force. This is undesirable in that it may cause the valve member 306 to not fully close or to close at the wrong time. Embodiments of the present disclosure overcome this problem by utilizing the spring recess 308 to restrict radial movement of the spring 310 such that the base 316 cannot move radially outward toward the walls 318. In other words, the walking out of the spring base 316 may be blocked due to contact at the recess 308, which prevents further radial or outward movement of the spring base 316. In at least one embodiment, a base diameter may be known and, based on the springs 310 intended for different operations, a recess diameter may be particularly selected to permit at least some expansion and/or to block expansion entirely, based on the desired or expected operating conditions. Accordingly, spring life may be improved due to the reduced likelihood of a reduction in spring height due to radial movement of the spring base.

Figure 7B:
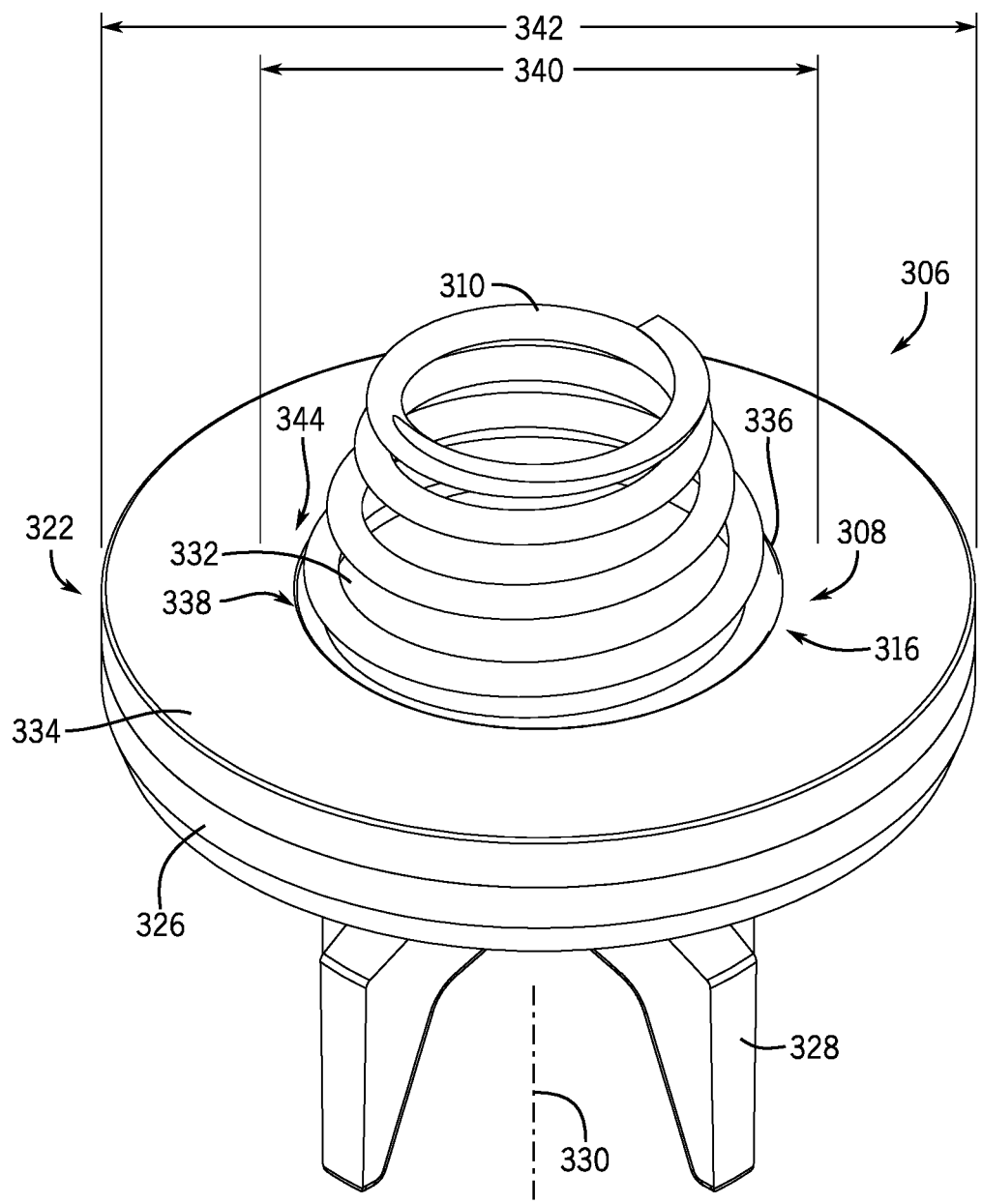
FIG. 7B is a perspective view of an embodiment of a valve member and a spring, in accordance with embodiments of the present disclosure.

FIG. 7B is a perspective view of the valve member 306 including the spring 310 positioned within the spring recess 308. The illustrated valve member 306 includes the top portion 322 and the bottom portion 324 (not visible due to the sealing element 326) which further includes legs 328 extending from the bottom portion 324. In this example, the top portion 322 may correspond to the region axially higher than the valve seal 326 along the axis 330.

The spring recess 308 is shown extending into the top portion 322 along the axis 330 such that the recess base 332 is axially lower than the top surface 334 of the top portion 322. That is, the recess base 332 is axially closer to the seal 326 than the top surface 334. The recess base 332 is also axially closer to the seal 326 than the top surface 334. As noted above, the recess 308 may be machined into the top surface 334. The recess 308 includes the continuous wall 336 (e.g., continuous outer wall) that has the round edge 338 representative of the outer diameter 340 (e.g., recess diameter). In this example, the outer diameter 340 is less than the top portion diameter 342. It should be appreciated that the outer diameter 340 may be particularly selected based, at least in part, on one or more spring characteristics. For example, the outer diameter 340 may correspond to approximately a spring resting diameter. In this example, the spring base 316 is positioned within the recess 308 such that the space 344 is shown between the wall 336 and the spring base 316. As such, at least some radial expansion (e.g., movement outward) of the spring base 316 may be permitted. It should be appreciated that adjustments to the outer diameter 340 may control or otherwise limit a permitted expansion. Moreover, the space 344 may allow for easier installation by providing some give or degrees of freedom during installation while still restricting movement of the spring base 316 in operation. Furthermore, as noted above, it should be appreciated that the illustrated example is in a non-compressed position and that, at installation, the spring 310 is compressed by the retainer 312. Accordingly, the space 344 may be sized such that the spring base 316 expands upon installation and may reduce a size of or eliminate the space 344 upon installation. Compression of the spring 310 may drive one or more coils into the recess 308, but it should be appreciated that the recess 308 may be sized to receive a reasonable number of coils. In at least one embodiment, the spring recess 308 is centered along the axis 330, but in one or more embodiments, the spring recess 308 may be positioned at a different location or there may be multiple recesses 308 in embodiments where there are multiple springs.

Figure 7C:
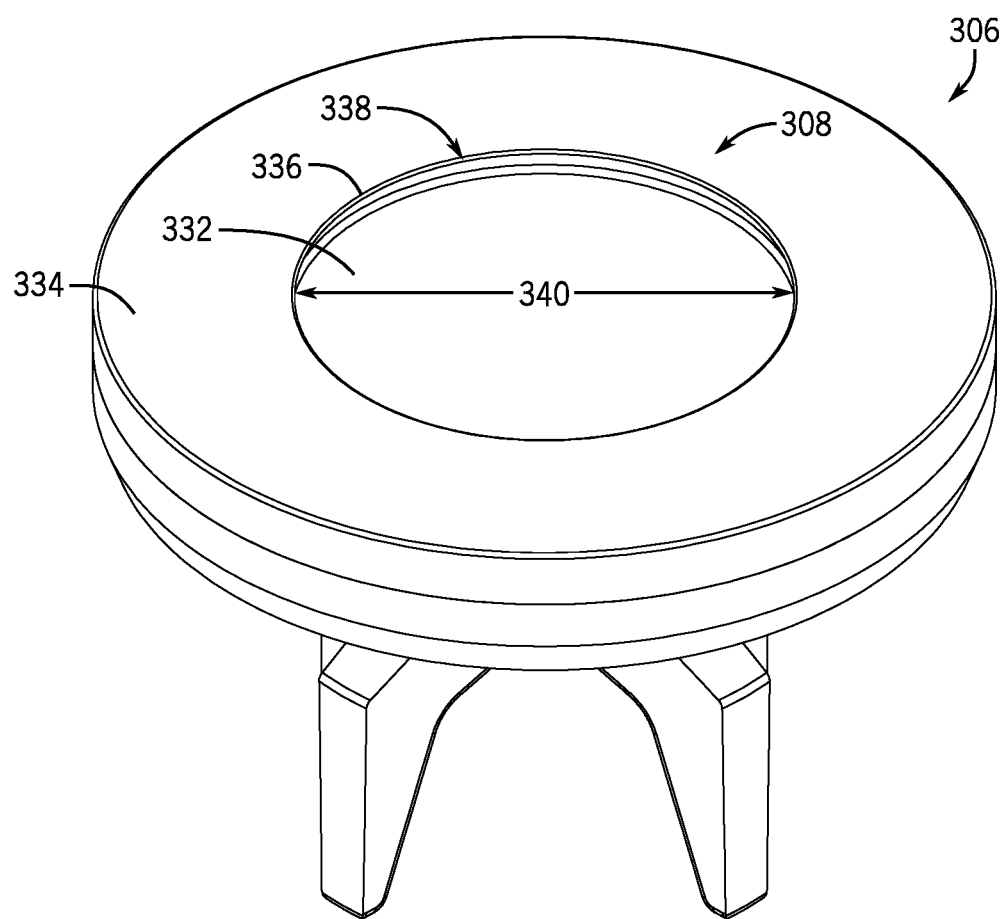
FIG. 7C is a perspective view of an embodiment of a valve member, in accordance with embodiments of the present disclosure.

FIG. 7C is a perspective view of an embodiment of the valve member 306 in which the spring 310 has been removed. This configuration illustrates the centered position of the spring recess 308, which as noted above may be changed based on expected operating conditions. Further illustrated are the outer continuous wall 336 and the curved edge 338 forming the recess diameter 340. The curved edge 338 is shown by way of example and may by a squared edge, a sloped edge, or any other reasonable geometry. Moreover, only a portion of the edge 338 may be curved, such as a lip or a transition portion. Furthermore, the curved edges 338 may be an overlap or an overhang such that, which compressed, the spring 310 may extend radially toward the wall 336 in a position where the edge 338 overhangs the spring 310 (e.g., where axial movement of the spring 310 is blocked by the curved edge 338), such as the dovetail configuration shown in FIG. 7D. As shown, the recess base 332 may be a planar surface that is substantially parallel to the top surface 334.

Figure 7D:
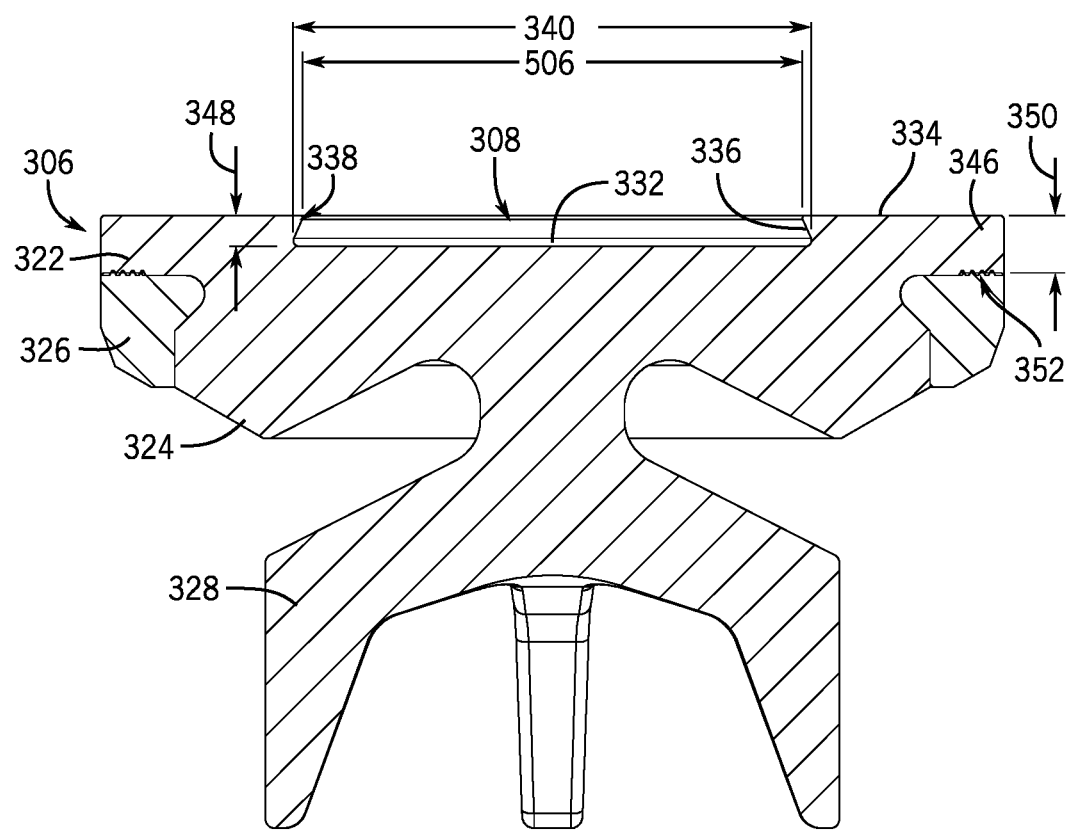
FIG. 7D is a cross-sectional view of an embodiment of a valve member, in accordance with embodiments of the present disclosure.

FIG. 7D is a cross-sectional view of an embodiment of the valve member 306 in which the spring 310 has been removed. This example shows the bottom portion 324 coupled to the top portion 322, which as noted above, may be represented by the area about the seal 326, such as the shoulder 346 positioned over the seal 326. In various embodiments, the top portion 322 may be a planar region extending across a bottom portion of the shoulder 346 at an interface between the seal 326 and the shoulder 346, but it should be appreciated that, in various embodiments, different portions may correspond to the top portion 322. The legs 328 are also illustrated coupled to the bottom portion 324.

The illustrated configuration shows the recess 308, which in this example may be referred to as a half dovetail pocket due to its cross-sectional appearance. The dovetailed half is shown along the outer diameter of the recess 308. The illustrated recess 308 may correspond to a void or a removed portion that extends axially into the top portion 322. This example includes the wall 336 that extends circumferentially to form the recess 308 having the recess diameter 340 and the recess depth 348. The recess depth 348 may correspond to a distance between the recess base 332 and the top surface 334 of the top portion 322. The depth 348 may be approximately equal to a thickness of one coil of the spring, but it should be appreciated that other depths 348 may be used in various embodiments and the coil thickness may be one factor utilized to determine the depth 348. The wall 336 includes the curved edge 338, which as noted above may be a variety of different shapes, such as planar, slanted, or the like. Furthermore, the edge 338 may overhang over the recess 308, as shown by the half dovetail cross-section, such that the edge diameter 506 is less than the recess diameter 340.

Further illustrated is the shoulder thickness 350, which may correspond to a distance between an interface 352 between the seal 326 and the top surface 334. It should be appreciated that various features may be included at the interface, such as teeth or the like to facilitate gripping the seal 326, and that the distance described above corresponds to a lowest point of the interface 352. In this example, the thickness 350 may be larger than a thickness of a corresponding valve member that does not include the recess 308.

For example, in various embodiments, a top surface of a valve member, or features along the top surface, may act as a hard stop for valve member movement. For example, a traditional valve configuration may include a boss that extends from the top surface of the valve member, rather than from a recessed location. As a result, an axial height of the top portion may be limited or restricted. This axial height may be measured from a location where the spring contacts the valve member. By adding the depth 348 of the recess, which lowers the contact point of the spring, the thickness 350 may be increased, thereby providing additional support at the seal 326, which is the region that contacts the seat sealing surface 314 (FIG. 7A). Accordingly, heat dissipation from the seal 326 may be improved, thereby increasing the useful life of the seal 326. In this manner, a time may be extended between maintenance intervals due to the improved life of the spring and also the improved life of the seal 326. As a result, systems and methods of the present disclosure may reduce costs for pump operators and provide improved operations.

FIGS. 8A-8D illustrate embodiments of a valve assembly 800 that may be utilized to overcome one or more deficiencies of prior art valve assemblies. As will be described below, one or more embodiments may include a recess (e.g., a pocket, a groove, etc.) to receive at least a portion of a spring base to prevent the spring base from walking out. Furthermore, arrangements may provide for a thicker shoulder over a sealing element for improved heat dissipation, among other benefits. It should be appreciated that various features of the embodiments described herein may be incorporated with one another and are not limited to the arrangements shown. For example, the valve assembly 800 may include features described with other valve assemblies disclosed herein. It should be appreciated that certain like features are referred to with like numerals for convenience purposes and are not intended to limit the scope of the present disclosure.

Figure 8A:
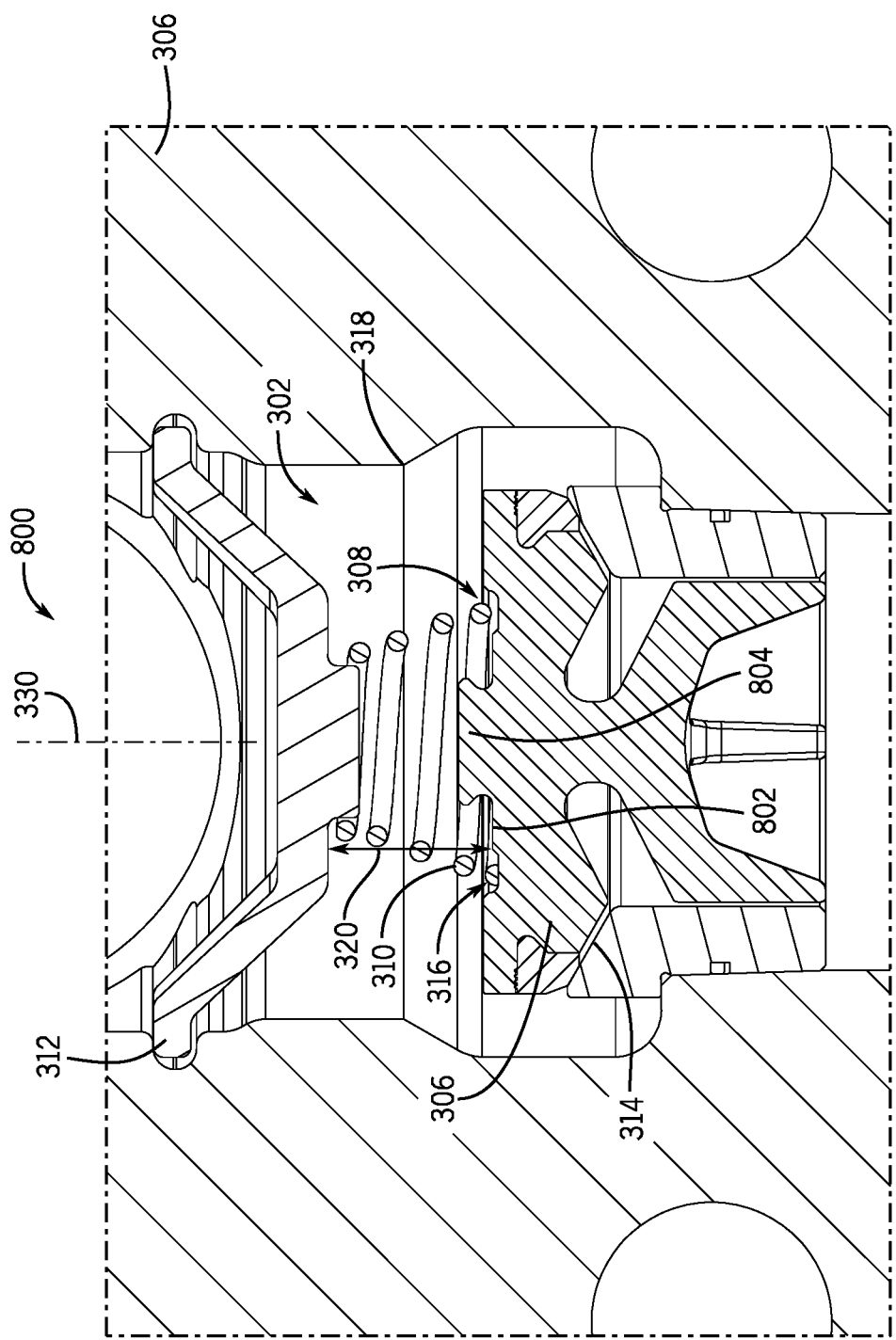
FIG. 8A is a cross-sectional view of an embodiment of a fluid end including a valve assembly, in accordance with embodiments of the present disclosure.

FIG. 8A is a cross-sectional view of the valve assembly 800 arranged within the bore 302 of the fluid end 304, which may share one or more features with the valve assemblies 122, 124, 200 and/or the fluid end 102. Moreover, various components of FIGS. 8A-8D may be shared by one or more components of FIGS. 3A-3D, 4A-4D, 5A-5D, 6A-6D, and 7A-7D. This example shows the valve assembly including the valve member 306 that has the spring recess 308, which in this example is a spring retaining pocket with various platform features. The illustrated embodiment includes the valve assembly 800 associated with the suction side of the fluid end 304, but it should be appreciated that various embodiments may also be used with different portions of the fluid end. Moreover, as noted with respect to FIGS. 3A, 4A, 5A, 6A, and 7A, it should be appreciated that the spring 310 is show in an uncompressed state that is not representative of how it functions when installed. When the spring 310 is installed between the twist in retainer 312 and the valve member 306 the spring 310 has a residual crush force used to keep the valve member 306 in place and to keep the retainer 312 from rotating. As shown, the lowest coils sit in the spring recess 308 of the valve member 306 and are retained in place based upon the geometry of the spring recess 308. It should be appreciated, and will be described below, that a depth of the recess 308 may be particularly selected to accommodate one or more coils of the spring 310.

As noted above, as the fluid end 304 operates and the valve member 302 moves in and out of contact with the sealing surface 314, pressures may cause forces to act on the spring 310, where the compression of the spring 310 will drive the spring base 316 radially outward (e.g., toward walls 318 of the bore 302 to increase a base diameter of the spring 310). As the spring base 316 moves outward, or "walks out," a reduced closing force may be produced by the spring 310. For example, the spring height 320 may decrease, which may cause, as least in part, the reduced closing force. This is undesirable in that it may cause the valve member 306 to not fully close or to close at the wrong time. Embodiments of the present disclosure overcome this problem by utilizing the spring recess 308 to restrict radial movement of the spring 310 such that the base 316 cannot move radially outward toward the walls 318. In other words, the walking out of the spring base 316 may be blocked due to contact at the recess 308, which prevents further radial or outward movement of the spring base 316. In at least one embodiment, a base diameter may be known and, based on the springs 310 intended for different operations, a recess diameter may be particularly selected to permit at least some expansion and/or to block expansion entirely, based on the desired or expected operating conditions. Accordingly, spring life may be improved due to the reduced likelihood of a reduction in spring height due to radial movement of the spring base.

In this example, the recess 308 includes a platform 802, which may be similar to a boss, and a knob 804 extending from the platform 802. The knob 804 is shown extending along the axis 330 and beyond the top surface of the top portion, as will be described below.

Figure 8B:
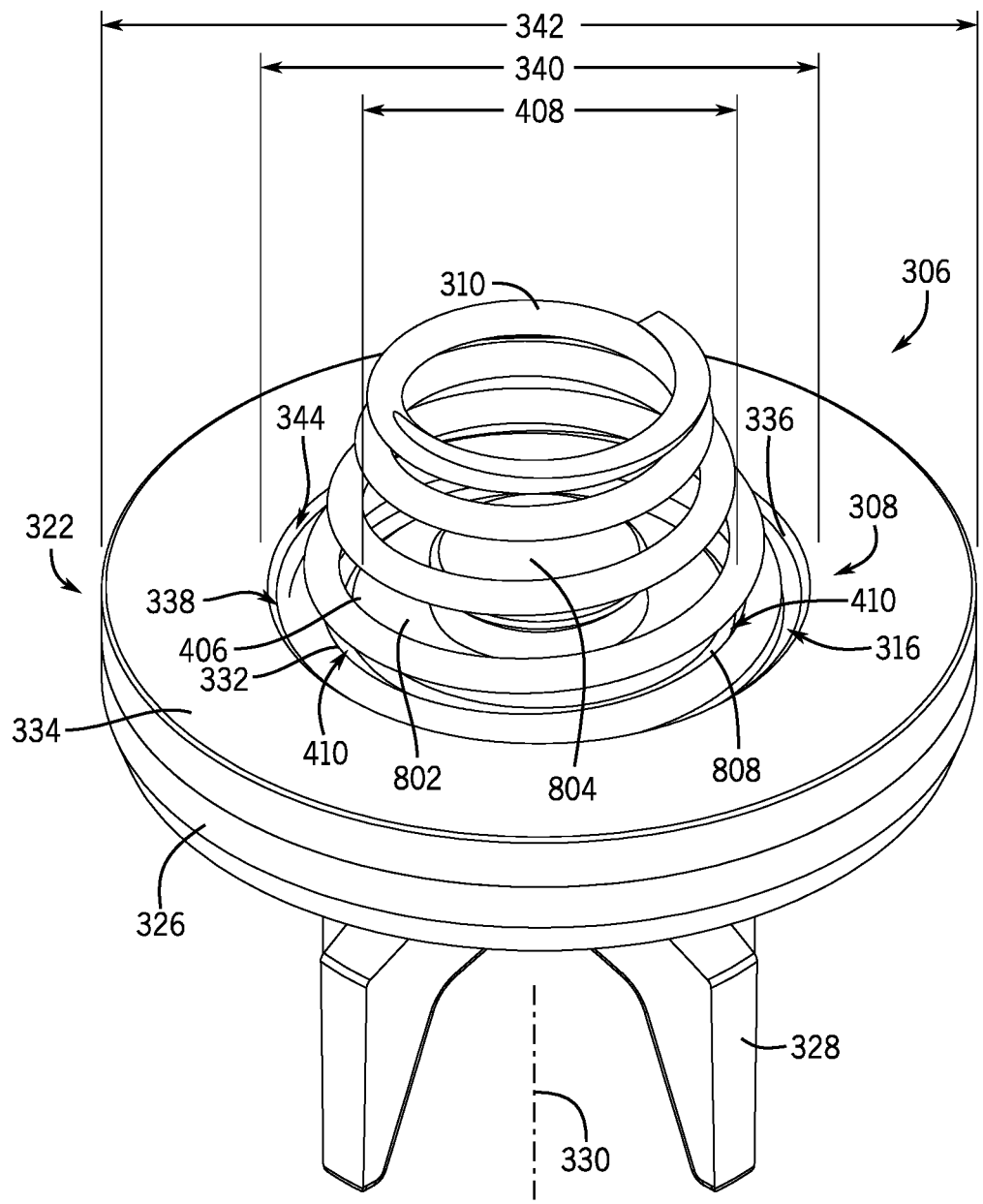
FIG. 8B is a perspective view of an embodiment of a valve member and a spring, in accordance with embodiments of the present disclosure.

FIG. 8B is a perspective view of the valve member 306 including the spring 310 positioned within the spring recess 308. The illustrated valve member 306 includes the top portion 322 and the bottom portion 324 (not visible due to the sealing element 326) which further includes legs 328 extending from the bottom portion 324. In this example, the top portion 322 may correspond to the region axially higher than the valve seat 326 along the axis 330.

The spring recess 308 is shown extending into the top portion 322 along the axis 330 such that the recess base 332 is axially lower than the top surface 334 of the top portion 322. That is, the recess base 332 is axially closer to the seal 326 than the top surface 334. In other words, the recess base 332 is positioned, at least in part, between the top surface 334 and the seal 326. As noted above, the recess 308 may be machined into the top surface 334. The recess 308 includes the continuous wall 336 (e.g., continuous outer wall) that has the round edge 338 representative of the outer diameter 340 (e.g., recess diameter). In this example, the outer diameter 340 is less than the top portion diameter 342. It should be appreciated that the outer diameter 340 may be particularly selected based, at least in part, on one or more spring characteristics. For example, the outer diameter 340 may correspond to approximately a spring resting diameter. Further illustrated is the platform 802 having a platform diameter, which is smaller than the outer diameter 340. In at least one embodiment, the platform diameter may correspond to the inner diameter 408 of the recess 308 and may, in various embodiments, include the inner wall 406 that may radially constrain the spring base 316.

In this example, the spring base 316 is positioned within the recess 308 such that the space 344 is shown between the wall 336 and the spring base 316 and the inner space 410 is shown between the wall 806 and the spring base 316. As such, at least some radial expansion (e.g., movement outward) of the spring base 316 may be permitted. It should be appreciated that adjustments to the outer diameter 340 may control or otherwise limit a permitted expansion. Moreover, the spaces 344, 410 may allow for easier installation by providing some give or degrees of freedom during installation while still restricting movement of the spring base 316 in operation. Furthermore, as noted above, it should be appreciated that the illustrated example is in a non-compressed position and that, at installation, the spring 310 is compressed by the retainer 312. Accordingly, the space 344 may be sized such that the spring base 316 expands upon installation and may reduce a size of or eliminate the space 344 upon installation. Compression of the spring 310 may drive one or more coils into the recess 308, but it should be appreciated that the recess 308 may be sized to receive a reasonable number of coils. In at least one embodiment, the spring recess 308 is centered along the axis 330, but in one or more embodiments, the spring recess 308 may be positioned at a different location or there may be multiple recesses 308 in embodiments where there are multiple springs.

Figure 8C:
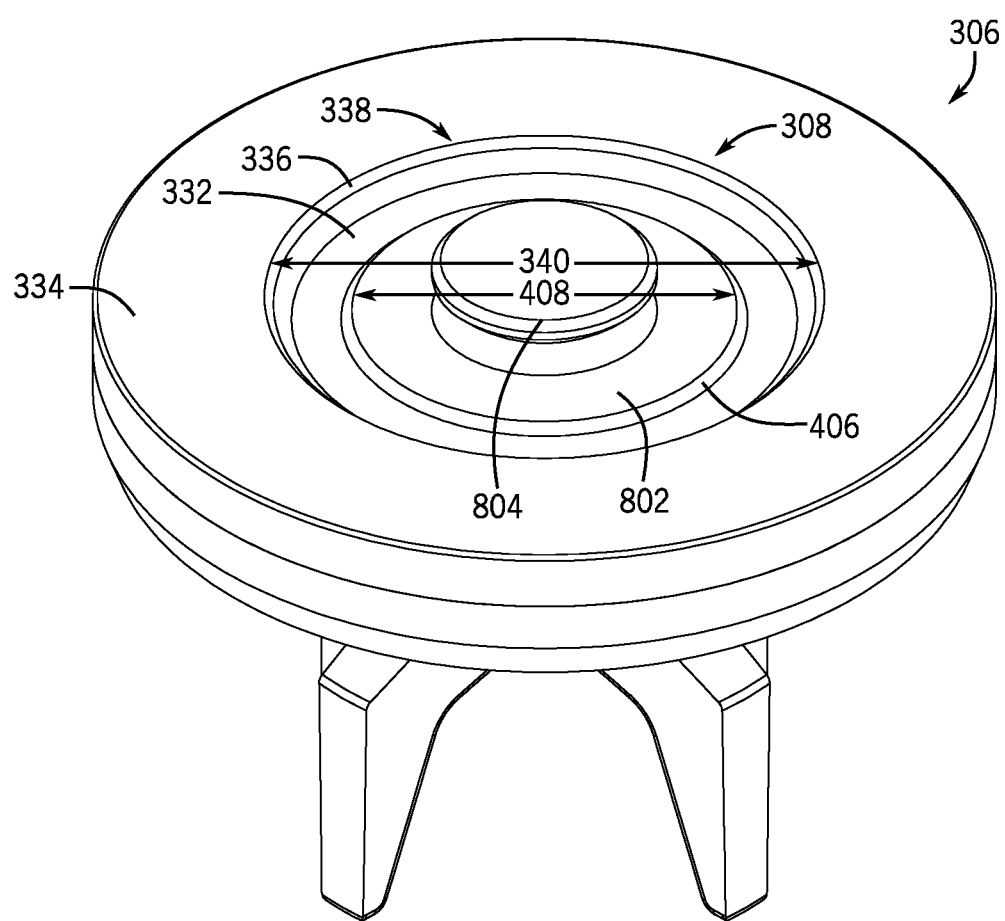
FIG. 8C is a perspective view of an embodiment of a valve member, in accordance with embodiments of the present disclosure.

FIG. 8C is a perspective view of an embodiment of the valve member 306 in which the spring 310 has been removed. This configuration illustrates the centered position of the spring recess 308, which as noted above may be changed based on expected operating conditions. Further illustrated are the outer continuous wall 336 and the curved edge 338 along with the platform 802 and the inner wall 406. The curved edges 338, 412 are shown by way of example and may by a squared edge, a sloped edge, or any other reasonable geometry. Moreover, only a portion of the edges 338, 412 may be curved, such as a lip or a transition portion. Furthermore, the curved edges 338, 412 may be an overlap or an overhang such that, which compressed, the spring 310 may extend radially toward the walls 336, 406 in a position where the edges 338, 410 overhang the spring 310 (e.g., where axial movement of the spring 310 is blocked by the curved edge 338), such as the dovetail configuration shown in FIG. 7D. As shown, the recess base 332 may be a planar surface that is substantially parallel to the top surface 334.

The platform 802 is shown elevated above the recess base 332 and further includes the knob 804 extending axially upward from the platform 802. In various embodiments this forms a two-tier structure within the recess 332 such that the platform 802 may be associated with spring movement while the knob 804 is associated with installation/removal and/or providing a hard stop during operation of the valve member 306.

Figure 8D:
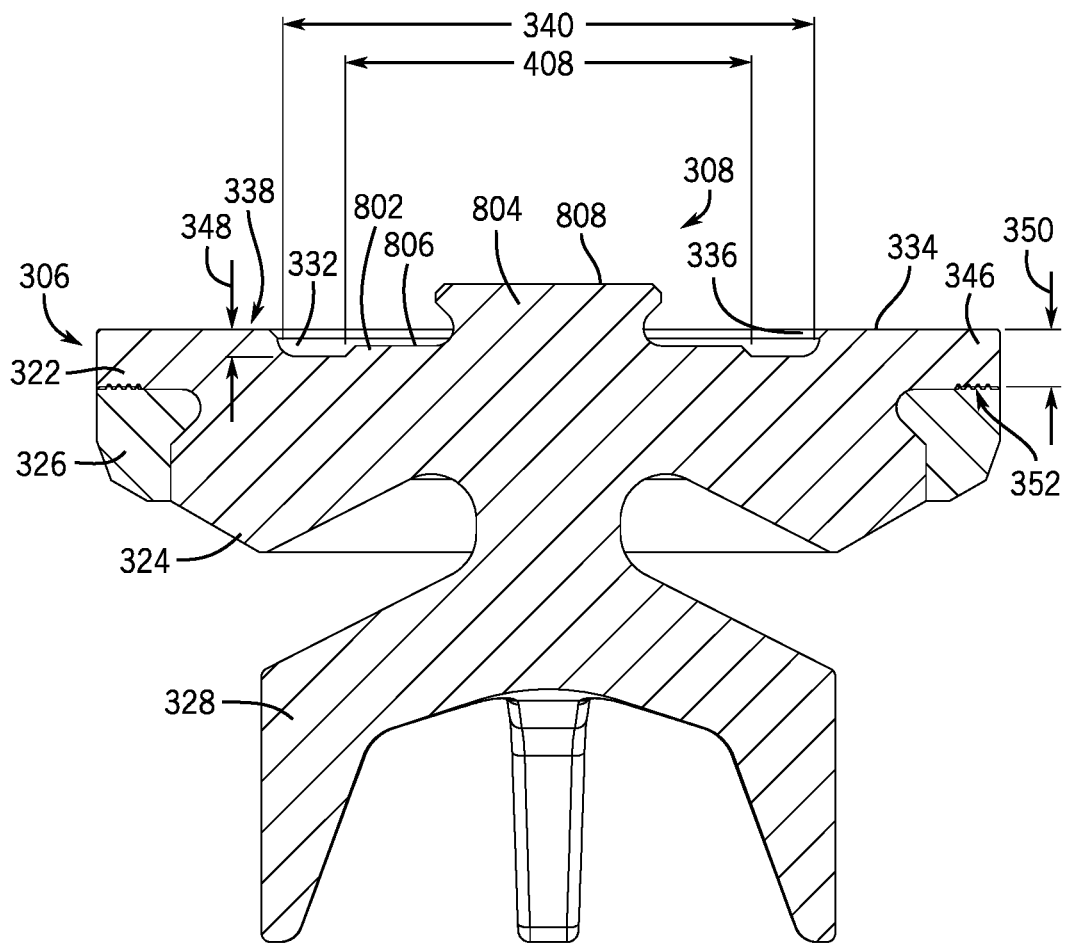
FIG. 8D is a cross-sectional view of an embodiment of a valve member, in accordance with embodiments of the present disclosure.

FIG. 8D is a cross-sectional view of an embodiment of the valve member 306 in which the spring 310 has been removed. This example shows the bottom portion 324 coupled to the top portion 322, which as noted above, may be represented by the area above the seal 326, such as the shoulder 346 positioned over the seal 326. In various embodiments, the top portion 322 may be a planar region extending across a bottom portion of the shoulder 346 at an interface between the seal 326 and the shoulder 346, but it should be appreciated that, in various embodiments, different portions may correspond to the top portion 322. The legs 328 are also illustrated coupled to the bottom portion 324.

The illustrated configuration shows the recess 308, which in this example may be referred to as a pocket due to its cross-sectional appearance. The illustrated recess 308 may correspond to a void or a removed portion that extends axially into the top portion 322. This example includes the wall 336 that extends circumferentially to form the recess 308 having the recess diameter 340 and the recess depth 348. The recess depth 348 may correspond to a distance between the recess base 332 and the top surface 334 of the top portion 322. The depth 348 may be approximately equal to a thickness of one coil of the spring, but it should be appreciated that other depths 348 may be used in various embodiments and the coil thickness may be one factor utilized to determine the depth 348. The wall 336 includes the curved edge 338, which as noted above may be a variety of different shapes, such as planar, slanted, or the like. Furthermore, the edge 338 may overhang over the recess 308, as shown by the half dovetail cross-section, such that an edge diameter 506 is less than a recess diameter 340.

In at least one embodiment, the platform 802 is shown having a platform surface 806 that is axially higher than the recess base 332. Additionally, extending in an axially upward direction from the platform 802 is the knob 804. In this configuration, a knob surface 808 is axially higher than the top surface 334. In at least one embodiment, the knob 804 may be utilized for installation and removal to provide an area for operations to grip and manipulate the valve member 306. In various embodiments, the knob 804 may also serve as a hard stop during operations.

Further illustrated is the shoulder thickness 350, which may correspond to a distance between an interface 352 between the seal 326 and the top surface 334. It should be appreciated that various features may be included at the interface, such as teeth or the like to facilitate gripping the seal 326, and that the distance described above corresponds to a lowest point of the interface 352. In this example, the thickness 350 may be larger than a thickness of a corresponding valve member that does not include the recess 308. For example, in various embodiments, a top surface of a valve member, or features along the top surface, may act as a hard stop for valve member movement. For example, a traditional valve configuration may include a boss that extends from the top surface of the valve member, rather than from a recessed location. As a result, an axial height of the top portion may be limited or restricted. This axial height may be measured from a location where the spring contacts the valve member. By adding the depth 348 of the recess, which lowers the contact point of the spring, the thickness 350 may be increased, thereby providing additional support at the seal 326, which is the region that contacts the seat sealing surface 314 (FIG. 8A). Accordingly, heat dissipation from the seal 326 may be improved, thereby increasing the useful life of the seal 326. In this manner, a time may be extended between maintenance intervals due to the improved life of the spring and also the improved life of the seal 326. As a result, systems and methods of the present disclosure may reduce costs for pump operators and provide improved operations.

The foregoing disclosure and description of the disclosed embodiments is illustrative and explanatory of the embodiments of the disclosure. Various changes in the details of the illustrated embodiments can be made within the scope of the appended claims without departing from the true spirit of the disclosure. The embodiments of the present disclosure should only be limited by the following claims and their legal equivalents. As will be described above, in one or more embodiments the packing sleeve 220 is secured to the block 104 using one or more fasteners that may extend through one or more intermediate components. In at least one embodiment, a retaining system may not include a preload element.

The invention claimed is:

1. A valve member for a spring-loaded valve assembly in a reciprocating pump assembly, comprising:
    a top portion having a spring retaining recess, the spring retaining recess extending into the top portion to form a void space, the void space to receive at least one coil of a spring, the spring retaining recess having a recess diameter that is smaller than a top portion diameter, wherein the recess diameter is larger than a rest diameter of a spring base including the coil, the spring retaining recess blocking expansion of the at least one coil when the spring is compressed, and the spring retaining recess having a dovetail cross-section;
a bottom portion coupled to the top portion;
a sealing element positioned axially below a shoulder of the top portion; and
legs coupled to the bottom portion.

2. The valve member of claim 1, further comprising:
a boss extending axially upward from a recess base, the boss having a boss height and an inner wall, the inner wall forming an inner diameter of the spring retaining recess.

3. The valve member of claim 2, wherein the boss has a boss surface flush with a top surface of the top portion.

4. The valve member of claim 2, wherein the boss has a boss surface axially lower than a top surface of the top portion.

5. The valve member of claim 4, further comprising:
a knob mounted on the boss surface, the knob extending axially beyond the top surface.

6. The valve member of claim 1, wherein the spring retaining recess is centered on the top portion.

7. A valve assembly, comprising:
a valve seat having a strike face; and
a valve member configured to reciprocate such that a sealing element of the valve member moves into contact with the strike face and out of contact with the strike face, wherein movement of the valve member is driven, at least in part, by a spring biasing the valve member toward the valve seat, the valve member comprising:
a bottom portion;
legs coupled to the bottom portion; and
a top portion coupled to the bottom portion, the sealing element being positioned, at least partially, between the top portion and the bottom portion, wherein a spring retaining recess is formed in the top portion along a top surface with a dovetail cross-section, the spring retaining recess having a depth that extends axially lower than the top surface to receive at least a portion of the spring such that a contact area between the spring and the top portion is axially lower than the top surface, and an outer diameter of the spring retaining recess being selected based, at least in part, on a spring base diameter to block expansion of a spring base beyond a predetermined position.

8. The valve assembly of claim 7, further comprising:
a boss extending from a recess base, the boss forming an inner diameter of the spring retaining recess.

9. The valve assembly of claim 8, wherein the boss is one of flush with the top surface, axially lower than the top surface, or axially higher than the top surface.

10. The valve assembly of claim 7, wherein the outer diameter is formed by a continuous wall.

11. The valve assembly of claim 7, wherein the spring is a conical spring and the depth is equal to one coil depth.

12. The valve assembly of claim 7, further comprising:
a shoulder region of the top portion, the shoulder region corresponding to a thickness between the top surface and an interface between the top portion and the sealing element.

13. A pump assembly, comprising:
a fluid end block having a first bore, a second bore, a third bore, and a fourth bore, the first bore extending from an external surface to an internal chamber, and the second bore extending from an opposite external surface to the internal chamber, the third and fourth bore extending independently toward the internal chamber, the internal chamber connecting each of the first bore, the second bore, the third bore, and the fourth bore; and
a valve assembly arranged in at least one of the first bore or the second bore, the valve assembly comprising:
a valve member having a bottom portion, legs coupled to the bottom portion, and a top portion coupled to the bottom portion, wherein a spring retaining recess is formed in the top portion along a top surface, the spring retaining recess having a depth that extends axially lower than the top surface to receive at least a portion of a spring such that a contact area between the spring and the top portion is axially lower than the top surface, and a diameter of the spring retaining recess being selected based, at least in part, on a spring base diameter to block expansion of a spring base beyond a predetermined position, and the spring retaining recess having a dovetail cross-section; and
a valve seat arranged within at least one of the first bore or the second bore and positioned to receive contact from the valve member responsive to movement of the valve member.

14. The pump assembly of claim 13, further comprising:
a boss extending axially upward from a recess base, the boss having a boss height and an inner wall, the inner wall forming an inner diameter of the spring retaining recess.

15. The pump assembly of claim 14, further comprising:
a knob mounted on the boss, the knob extending axially beyond the top surface.

16. The pump assembly of claim 13, further comprising:
a shoulder positioned axially above a seal element coupled to the valve member.

17. A valve member for a reciprocating pump assembly, comprising:
a valve body comprising a frustoconical surface, the valve body defining an outside annular cavity adjacent to the frustoconical surface and bounded by a top surface of the valve;
a seal arranged in the outside annular cavity, the seal positioned such that the seal is not on the top surface of the valve;
a recessed pocket sitting below the top surface of the valve, wherein the recessed pocket includes a dovetail cross-sectional shape; and
a conical spring retained in the recessed pocket.

18. The valve member of claim 17, wherein the recessed pocket includes a first diameter and a second diameter, the first diameter being larger than the second diameter.

19. The valve member of claim 17, wherein at least a portion of the frustoconical surface is axially lower than the seal, relative to a plane extending along and parallel to the top surface.

* * * * *